(12) United States Patent
Pauly

(10) Patent No.: US 8,738,608 B2
(45) Date of Patent: May 27, 2014

(54) APPARATUS, SYSTEMS AND METHODS FOR DATA STORAGE AND/OR RETRIEVAL BASED ON A DATABASE MODEL-AGNOSTIC, SCHEMA-AGNOSTIC AND WORKLOAD-AGNOSTIC DATA STORAGE AND ACCESS MODELS

(75) Inventor: Duncan G. Pauly, Bristol (GB)

(73) Assignee: Justone Database, Inc., Madison, CT (US)

( * ) Notice: Subject to any disclaimer, the term of this patent is extended or adjusted under 35 U.S.C. 154(b) by 220 days.

(21) Appl. No.: 13/080,988

(22) Filed: Apr. 6, 2011

(65) Prior Publication Data

US 2011/0252073 A1    Oct. 13, 2011

Related U.S. Application Data

(60) Provisional application No. 61/321,374, filed on Apr. 6, 2010.

(51) Int. Cl.
*G06F 17/30* (2006.01)

(52) U.S. Cl.
USPC ............ 707/716; 707/602; 707/720; 711/204

(58) Field of Classification Search
USPC ............................ 707/716, 602, 720; 711/204
See application file for complete search history.

(56) References Cited

U.S. PATENT DOCUMENTS

| | | | | |
|---|---|---|---|---|
| 4,796,218 A | * | 1/1989 | Tanaka et al. | 708/495 |
| 5,555,392 A | * | 9/1996 | Chaput et al. | 711/118 |
| 6,202,128 B1 | * | 3/2001 | Chan et al. | 711/131 |
| 7,035,998 B1 | * | 4/2006 | Nemirovsky et al. | 712/215 |
| 7,546,312 B1 | | 6/2009 | Xu et al. | |
| 2002/0152457 A1 | * | 10/2002 | Jahnke | 717/139 |
| 2004/0001498 A1 | | 1/2004 | Chen et al. | |
| 2004/0002993 A1 | | 1/2004 | Toussaint et al. | |
| 2004/0059743 A1 | | 3/2004 | Burger | |
| 2007/0192863 A1 | | 8/2007 | Kapoor et al. | |
| 2009/0043733 A1 | | 2/2009 | Kingsford et al. | |
| 2010/0082898 A1 | * | 4/2010 | Mangold et al. | 711/113 |

FOREIGN PATENT DOCUMENTS

| | | | |
|---|---|---|---|
| EP | 2 040 180 A1 | 3/2009 | |
| WO | WO 00/58871 | * 10/2000 | G06F 17/30 |

OTHER PUBLICATIONS

PCT Search Report for application No. PCT/US11/31405 dated Jun. 9, 2011, 37 pages.
Singapore Office Search Report and Written Opinion for Application No. 201207444-9, issued Sep. 19, 2013. (10 Pages).

* cited by examiner

*Primary Examiner* — Hosain Alam
*Assistant Examiner* — Bruce Witzenburg
(74) *Attorney, Agent, or Firm* — Nutter McClennen & Fish LLP; David J. Powsner

(57) ABSTRACT

A database access model and storage structure that efficiently support concurrent OLTP and OLAP activity independently of the data model or schema used, are described. The storage structure and access model presented avoid the need to design schemas for particular workloads or query patterns and avoid the need to design or implement indexing to support specific queries. Indeed, the access model presented is independent of the database model used and can equally support relational, object and hierarchical models amongst others.

84 Claims, 14 Drawing Sheets

FIG. 22

| Cell Size | Path | Domain | Byte Sequence |
|---|---|---|---|

FIG. 23

| Cell Size | Path | Domain | Sign | Exponent | Significand |
|---|---|---|---|---|---|

FIG. 24

| Cell Size | Path | Domain | Property Size | Property Byte Sequence | ... |
|---|---|---|---|---|---|

FIG. 25

| Cell Size | Path | Domain | Element Size | Link |
|---|---|---|---|---|

FIG. 26

| Inverted Frame Number | Inverted Tunnel Number | Inverting Tunnel Number |
|---|---|---|

FIG. 27

| Cell Size | Digest | Tunnel Number |
|---|---|---|

FIG. 28

| Digest Cell | Digest Cell | Digest Cell | ... |
|---|---|---|---|

FIG. 29

| Cell Count | Cell Count | Cell Count | ... |
|---|---|---|---|

FIG. 30

| Digest Tunnel Number | Digest Tunnel Number | Digest Tunnel Number | ... |
|---|---|---|---|

FIG. 31

| Rank Cell | Rank Cell | Rank Cell | ... |
|---|---|---|---|

FIG. 32

| Cell Count | Cell Count | Cell Count | ... |
|---|---|---|---|

FIG. 33

| Cell Count | Cell Count | Cell Count | ... |
|---|---|---|---|

APPARATUS, SYSTEMS AND METHODS FOR DATA STORAGE AND/OR RETRIEVAL BASED ON A DATABASE MODEL-AGNOSTIC, SCHEMA-AGNOSTIC AND WORKLOAD-AGNOSTIC DATA STORAGE AND ACCESS MODELS

CROSS-REFERENCE TO RELATED APPLICATIONS

This application claims the benefit of priority of U.S. Provisional Patent Application No. 61/321,374, filed on Apr. 6, 2010, the entire contents of which are incorporated herein by reference.

BACKGROUND OF THE INVENTION

The invention pertains to digital data processing and, more particularly, to apparatus, systems and methods for data storage and retrieval. The invention has application, by way of non-limiting example, in the creation, updating and access of operational and analytic databases.

Databases store data within a framework known as a data model. Current data models include the network model, hierarchical model, object model, key-value model, graph model, document model and the relational model amongst others. The relational model is by far the most popular and ubiquitous in its use.

The relational model views data as relations or tables containing multiple rows and columns. Each relation stores information about a particular type of entity, such as employees and departments, with each row in a table storing information about one instance of the entity to which the table relates. Each column in the table is an attribute for the entity and contains a value in each row that corresponds to an entity instance. The set of table and column definitions is known as the database schema.

The following are example tables for Employees, Departments and Regions.

TABLE 1

Employees Table

| Name | Employee Number | Salary | Commission Rate | Department Number |
|------|-----------------|--------|-----------------|-------------------|
| Simon Smith | 10 | 10000 | | 100 |
| John Jones | 20 | 20000 | 10.00% | 200 |
| Bob Brown | 30 | 30000 | 15.00% | 200 |

TABLE 2

Departments Table

| Name | Department Number | Region Number |
|------|-------------------|---------------|
| Administration | 100 | 2000 |
| Sales | 200 | 1000 |
| Support | 300 | 3000 |

TABLE 3

Regions Table

| Name | Region Number |
|------|---------------|
| North | 1000 |
| East | 2000 |
| South | 3000 |
| West | 4000 |

SQL is a language used with relational databases to both define database schemas and to manipulate data stored within those schemas. The SQL statements to define the example tables above might be as follows:

```
create table Employees
    (Name varchar(64) not null,
        EmployeeNumber number primary key,
        Salary number(8,2) not null,
        CommissionRate number(4,2),
        DepartmentNumber number references
        Departments(DepartmentNumber));
create table Departments
    (Name varchar(64) not null,
        DepartmentNumber number primary key,
        RegionNumber number references
        Regions(RegionNumber));
create table Regions
    (Name varchar(64) not null,
        RegionNumber number primary key);
```

Each employee has a name and a unique employee number that are used to identify them; each employee has a salary and a commission plan and is employed by a single department. Each of these attributes for an employee are stored in a separate column in the table.

Similarly, each department has a name and number and is located in one region; each region has a name and number that identifies it.

Thus the "Smith" employee belongs to the "Administration" department which is in the "East" region. This is discerned from the department and region numbers that are common across the tables. These relationships are indicated by 'primary key' and 'foreign key' constraints in the above SQL statements, Relational tables are typically normalized to remove any duplication of data contained within them. In the above example, it would be possible to rearrange the data into a single table such that a department's information is duplicated against every employee that belongs to that department. Such duplication is sub-optimal from both a storage size and update overhead perspective because every item of department data has to be stored and updated in multiple locations. The process of normalization moves groups of columns with duplicate data into a single row into a separate table.

Relational databases support the concept of a table join whereby rows from separate tables are joined together by a common column value such that all rows with a corresponding join column are correlated together. In the example above, the employee table may be joined to the department table by the department number column in both tables. Normalized data requires a join at query time to reproduce de-normalized data.

Relational databases are often used in two distinct ways—as an operational or analytical database. An operational (OLTP) database records and manages business process transactions. It provides a detailed and reliable reference for business procedures. Each transaction in an operational system is only likely to be interested in a handful of entity instances at any given time. In contrast, an analytical (OLAP) database provides a broad analysis across a large body of data. Conventionally, the data retained by an analytical system is less detailed than the operational system to assist with the performance of analytical queries.

When considered in a relational database context, an operational transaction or query is likely to touch a large proportion of columns across a very small proportion of rows; conversely, an analytical query is likely to touch a small proportion of columns in a very large proportion of rows. This has led to a trend in relational databases to organize operational databases in row orientation (complete rows stored together) and to organize analytical databases in column orientation (complete columns stored together). These approaches attempt to co-locate data in storage according to anticipated access patterns so that retrieval requests from storage are kept to a minimum.

Conventional operational and analytical databases are typically highly normalized and highly de-normalized respectively. Operational databases are highly normalized to avoid the overheads associated with the update of duplicated data; whereas analytical database are often de-normalized to avoid the overhead of joins at query time. This difference in approach to normalization creates a difference in the database schemas because different table definitions are required.

Therefore conventional relational databases are organized differently depending on whether an operational or analytical workload is anticipated. A highly normalized schema stored in row orientation is considered sub-optimal for analytical queries because the analytical queries are forced to process entire rows and perform extensive join processing; while a highly de-normalized schema in column orientation is considered sub-optimal for operational systems because of the spread of individual rows across multiple storage areas and the overhead of updating duplicated data.

With the flat table structure (row and column) so far described, is only possible to find a row that contains a specific column by scanning a whole table in a row store, or a whole column in column store. With very large sets this becomes a resource and time consuming process. To assist with this process, indexes are layered on top of the flat table structure to enable fast navigation to specific rows by column value. Indexes can take many forms and include mechanisms such as B-Trees, hashing, bit maps and partitioning amongst others. However, regardless of the form of indexing used, it is effectively performing part of the query processing work ahead of query time. In effect, indexing moves the overhead of query processing to data update time. This may be reasonable if the volume of query activity is much greater that update activity such as an analytical system—but this is not the case in operational systems or even in analytical systems that require constant updates.

Hence conventional operational and analytical databases are designed differently and while a single relational database can support operational or analytical workloads efficiently it typically cannot support both workloads at the same time within the same database instance. This often leads to the use of multiple database instances to support common data sets with each database designed differently to support different workloads. This creates complexity involving integration and data transformation activities, latency in data availability and additional capital and operational expenditure.

When considering the performance of a database architecture it is important to understand the hardware context in which it operates.

Current computer architectures consist of CPU, memory and storage components which operate at vastly different speeds. A contemporary CPU contains one or more CPU caches that have a limited size but operate at near CPU clock speed; main memory is typically much larger but operates at lower speeds because of the cost of fabrication of fast memory. Storage will typically operate at several orders of magnitude slower speed because of the different technologies used. Even flash storage typically operates at two orders of magnitude slower than main memory. The speed of these components can be expressed in fetch frequencies which measure the rate at which data fetch operations can be requested and fulfilled. The fetch frequency of a component is an inverse measure of its access latency.

As shown in FIG. 1, data is fetched from storage into memory, then fetched from memory into CPU cache. Data also moves in the opposite direction between these components, as illustrated.

If the CPU requires data that is not currently available in the CPU cache, it must make a request to fetch it from memory and/or storage. The CPU must then wait for the slower components to service the request and this is commonly known as a CPU stall. During a CPU stall, the CPU is unable to perform any useful work and this has an adverse effect on processor throughput and overall performance.

While fetch frequencies are radically different across computer components, the rate at which data can be transferred in bulk between components is much more similar. Therefore, to minimize the number and the affect of CPU stalls, computer components will bulk fetch data that is near the explicitly requested data address in the hope that the unsolicited data is relevant to the following CPU operations and avoid immediately subsequent fetch requests.

The bulk fetch strategy will only amortize a CPU stall if the unsolicited data is indeed relevant and useful to subsequent CPU operations; if not, the CPU will be forced into another stall until useful data is explicitly fetched to replace the unsolicited data. Bulk fetched data that is not useful can be viewed as cache pollution and degrades performance by engendering CPU stalls. Cache pollution occurs both in the CPU cache and within main memory when irrelevant data is fetched from storage.

To avoid cache pollution, it is necessary to align storage structures with the storage address dimension so that each bulk fetch pulls in information relevant to the current access path. This is known as good spatial locality.

Row oriented relational databases are designed to reduce cache pollution in operational workloads where whole rows are being queried by ensuring the rows are aligned with the address dimension. However, with analytical workloads where only specific columns are required, this storage orientation causes cache pollution because irrelevant columns are also fetched into cache.

Conversely, column oriented relational databases are designed to reduce cache pollution in analytical workloads where specific columns are being queried by ensuring the columns are aligned with the address dimension. However, with operational workloads where only specific rows are required, this orientation causes cache pollution because irrelevant rows are also fetched into cache.

For both row and column orientated storage, cache will always be polluted by irrelevant rows where non-consecutive rows are required by a query.

Moreover, the use of hierarchical block structures, such as a B-Tree index, to navigate to rows also pollutes cache. Typically, only a part of each block fetched from the higher levels of a hierarchy will be relevant to a query, while the remainder of the block pollutes the cache. This is exacerbated by navigating down such hierarchies causing cache pollution at each step.

These hierarchical structures are routinely used in databases of both storage orientations.

An object of the invention is to provide improved apparatus, systems and methods for digital data processing.

A further object of the invention is to provide such apparatus, systems and methods as can be used for data storage and retrieval.

Yet a still further object of the invention is to provide such apparatus, systems and methods as can be utilized in support of legacy and new database models, schemas and workloads.

Yet a still further object of the invention is to provide such apparatus, systems and methods as support OLTP and OLAP activity independently of the data model, schema and/or workload.

Yet a still further object of the invention is to provide such apparatus, systems and methods as support such activity with improved efficiency and speed.

SUMMARY OF THE INVENTION

The foregoing are among the objects attained by the invention, which provides improved systems for data storage and/or retrieval aspects as characterized in the attached claims In one aspect, a data storage and/or retrieval system implemented on one or more digital data processing systems is provided that includes storage media including a plurality of data tunnels for each entity type and a fixed plurality of data tunnels for each attribute, one or more of which data tunnels comprise a plurality of data cells. Each of the data cells contain data associated with a respective instance of an attribute for a respective instance of an entity type. For one or more of the data tunnels, the data cells in each of which have data for which a respective operator evaluates to a boolean result indicating either the likely possibility or the impossibility of a respective instance of an attribute being characterised by said operator for a given set of one or more operands. The system also includes a storage engine that is in communications coupling with the storage media and that accesses one or more data tunnels based on one or more of said operators and a given set of one or more operands.

Related aspects of the invention provide a system, e.g., as described above, that includes storage media including a plurality of connective data tunnels for each entity type and a fixed plurality of connective data tunnels for each attribute, one or more of which connective data tunnels comprise a plurality of connective data cells. Each of the connective data cells contain data associated with a respective instance of an attribute for a respective instance of an entity type and each respective instance of an attribute has one respective connective data cell in only one respective connective data tunnel. For one or more of the connective data tunnels, the connective data cells in each of which have data for which a respective equivalence operator evaluates to a boolean result which indicates either the likely possibility or impossibility of a respective instance of an attribute being equivalent for a given set of one or more operands. The system also includes a storage engine that is in communications coupling with the storage media and that accesses one or more connective data tunnels based on one or more of said equivalence operators and a given set of one or more operands.

Related aspects of the invention provide a system, e.g., as described above, that includes storage media including a plurality of connective data tunnels for each entity type and a fixed plurality of connective data tunnels for each attribute, one or more of which connective data tunnels comprise a plurality of connective data cells. Each of the connective data cells contain data associated with a respective instance of an attribute for a respective instance of an entity type. For one or more of the connective data tunnels, the connective data cells in each of which have data for which a respective equivalence operator evaluates to a boolean result which indicates either the likely possibility or impossibility of a respective instance of an attribute being equivalent for a given set of one or more operands and where the majority of connective data cells yield a like result for a given set of one or more operands. The system also includes a storage engine that is in communications coupling with the storage media and that accesses one or more connective data tunnels based on one or more of said equivalence operator and a given set of one or more operands.

Related aspects of the invention provide a system, e.g., as described above, in which the connective data cell contains a digest of the respective instance of the attribute and the respective connective data tunnel is chosen from a defined hash encoding of the respective instance of the attribute and by applying a modulo of the number of the plurality of connective data tunnels to said hash encoding.

Related aspects of the invention provide a system, e.g., as described above, in which the digest of the respective instance of the attribute is the value of the respective instance itself when the size of the respective instance is sufficiently small, whereby the equivalence operator can be certain of equivalence.

Related aspects of the invention provide a system, e.g., as described above, that includes storage media comprising a plurality of combinative data tunnels for each entity type and a fixed plurality of combinative data tunnels for each attribute, one or more of which data tunnels comprise a plurality of combinative data cells. Each of the combinative data cells contain data associated with a respective instance of an attribute for a respective instance of an entity type and each respective instance of an attribute has one respective combinative data cell in all respective combinative data tunnels. For one or more of the combinative data tunnels, the combinative cells in each of which have data for which a respective bounding operator evaluates to a boolean result which indicates either the likely possibility or the impossibility of a respective instance of an attribute being bounded for a given set of one or more operands. The system also includes a storage engine that is in communications coupling with the storage media and that accesses one or more combinative data tunnels based on one or more of said bounding operator and a given set of one or more operands.

Related aspects of the invention provide a system, e.g., as described above, in which each instance of a respective attribute is expressed in unitary scale and as a significand with respect to a fixed radix point, each combinative data tunnels is respective to part of the said significand, all combinative data tunnels are mutually exclusive in respect of the said significand, and all combinative data tunnels enclose the whole of the said significand.

Related aspects of the invention provide a system, e.g., as described above, in which the further improvement for the evaluation of a bounding operator during the read access of said combinative tunnels of said attribute of said storage system, includes the steps of converting each respective boundary operand in the said bounding operator to a significand of unitary scale with a fixed radix point and comparing the significand bits of respective boundary operands in descending significance order to find the first significand bit that differs between said operands and taking all prior common bits as a determinant data value. The improvement also includes the steps of finding the combinative data tunnel of lowest significance that comprises a strict subset of the significance of said determinant value and taking said combinative data tunnel as the determinant data tunnel, accessing the said determinant data tunnel first before other combinative data tunnels respective of said attribute, and inspecting all combinative data cells of said determinant data tunnel and deeming the relevance of each respective entity instance as impossible for said bounding operator where said combinative data cell is not equal to the said determinant data value. Only combinative data cells, respective of entity instances not deemed of impossible relevance, in combinative data tunnels other than said determinant data tunnel need be inspected for the purposes of determining relevance of respective entity instances to the respective bounding operator and its respective operands.

Related aspects of the invention provide a system, e.g., as described above, that includes storage media comprising a plurality of characteristic data tunnels for each entity type and a fixed plurality of characteristic data tunnels for each attribute, one or more of which characteristic data tunnels comprise a plurality of data cells. Each of the characteristic data cells contain data associated with a respective instance of an attribute for a respective instance of an entity type and each respective instance of an attribute has one respective characteristic data cell in all respective characteristic data tunnels. For one or more of the characteristic data tunnels, the characteristic data cells in each of which have data for which a respective possessive operator evaluates to a boolean result which indicates either the likely possibility or the impossibility of a respective instance of an attribute possessing a property for a given set of one or more operands. The system also includes a storage engine that is in communications coupling with the storage media and that accesses one or more characteristic data tunnels based on one or more of said possessive operator and a given set of one or more operands.

Related aspects of the invention provide a system, e.g., as described above, in which each characteristic data tunnel is respective of one or more properties and a characteristic data cell contains a boolean indication of possession of a respective property by the respective instance of the attribute.

Related aspects of the invention provide a system, e.g., as described above, in which a characteristic tunnel is chosen to be respective of a property by hash encoding the property identity and applying a modulo of the number of plurality of characteristic data tunnels to said hash encoding.

Related aspects of the invention provide a system, e.g., as described above, in which a characteristic tunnel is chosen to be respective of a property by assigning a strictly monotonically increasing ordinal to each unique property identity and applying a modulo of the number of plurality characteristic data tunnels to said ordinal. The possessive operator can be certain of possession if $(M-T)<P<2T$ where P is the ordinal of the property; M is the maximum ordinal assigned and T is the number of characteristic tunnels.

Related aspects of the invention provide a system, e.g., as described above, in which a characteristic tunnel is chosen to be respective of a property by assigning a strictly monotonically increasing ordinal to each unique property identity for the respective attribute and applying a modulo of the number of plurality characteristic data tunnels to said ordinal. The possessive operator can be certain of possession if $(M-T)<P<2T$ where P is the ordinal of the property; M is the maximum ordinal assigned for the respective attribute and T is the number of characteristic tunnels.

Related aspects of the invention provide a system, e.g., as described above, that includes storage media comprising a plurality of collective data tunnels for each entity type, one or more of which collective data tunnels comprise a plurality of collective data cells. Each collective data tunnel contains data associated with a respective instance of an entity type and each of the collective data cells contain data associated with a respective instance of an attribute for a respective instance of an entity type. Each of the collective data cells contain data which is characterised as one of identity, measurement, enumeration or opacity.

Related aspects of the invention provide a system, e.g., as described above, in which a collective data cell characterised as one of identity comprises of a sequence of bits that denote the identity such that certainty of equivalence of identity for the respective instance of the respective attribute can be determined by comparison of said bits in like sequence order.

Related aspects of the invention provide a system, e.g., as described above, in which a collective data cell characterised as one of measurement comprises of a sign bit, a plurality of significand bits and a plurality of exponent bits such that certainty of a respective instance of the respective attribute being bounded by a range can be determined by comparison of the respective sign, significand and exponent bits.

Related aspects of the invention provide a system, e.g., as described above, in which a collective data cell characterised as one of enumeration comprises of a plurality of properties wherein each property is comprised of a sequence of bits such that certainty of possession of a property by the respective instance of the respective attribute can be determined by a comparison of said bits in like sequence order for one or more respective properties.

Related aspects of the invention provide a system, e.g., as described above, in which each data tunnel is individually encrypted during write access to storage and individually decrypted during read access from storage.

Related aspects of the invention provide a system, e.g., as described above, in which each data cell is individually encrypted during write access to storage and individually decrypted during read access from storage.

Related aspects of the invention provide a system, e.g., as described above, in which a specific set of one or more tunnels are accessed for each of the said operators and their respective operands, that comprise a query.

Related aspects of the invention provide a system, e.g., as described above, in which one or more data tunnels are accessed independently and simultaneously for the evaluation of each said operators and their respective operands Related aspects of the invention provide a system, e.g., as described above, in which each operator evaluation includes a boolean indication of certainty or uncertainty for each respective instance deemed likely possible.

Related aspects of the invention provide a system, e.g., as described above, in which operator evaluations are combined conjunctively for a common respective entity type such that some uncertain respective entity instances may be discarded from operator evaluations.

Related aspects of the invention provide a system, e.g., as described above, in which subsequent materialisation of an operator evaluation can resolve any uncertainty by inspecting the respective collective data cell for the respective instance of an attribute deemed uncertain.

Related aspects of the invention provide a system, e.g., as described above, in which data tunnels are read accessed in bulk from storage media for the evaluation of each said operators and their respective operands.

Related aspects of the invention provide a system, e.g., as described above, in which distinct attributes may be correlated by the equivalence of their respective instances by comparison of their respective data cells in corresponding data tunnels.

Related aspects of the invention provide a system, e.g., as described above, in which distinct attributes may be correlated by the equivalence of their respective instances by comparison of their respective connective data cells in corresponding connective data tunnels.

Related aspects of the invention provide a system, e.g., as described above, in which a plurality of data tunnels and respective operators relate to instances of entities of arbitrary structure.

Related aspects of the invention provide a system, e.g., as described above, in which a plurality of connective data tunnels and respective operators relate to instances of entities of arbitrary structure.

Related aspects of the invention provide a system, e.g., as described above, in which a plurality of combinative data tunnels and respective operators relate to instances of entities of arbitrary structure.

Related aspects of the invention provide a system, e.g., as described above, in which a plurality of characteristic data tunnels and respective operators relate to instances of entities of arbitrary structure.

Related aspects of the invention provide a system, e.g., as described above, in which a plurality of data tunnels and respective operators relate to instances of an entity type wherein distinct instances of said entity type differ in structure.

Related aspects of the invention provide a system, e.g., as described above, in which a plurality of connective data tunnels and respective operators relate to instances of an entity type wherein distinct instances of said entity type differ in structure.

Related aspects of the invention provide a system, e.g., as described above, in which a plurality of combinative data tunnels and respective operators relate to instances of an entity type wherein distinct instances of said entity type differ in structure.

Related aspects of the invention provide a system, e.g., as described above, in which a plurality of characteristic data tunnels and respective operators relate to instances of an entity type wherein distinct instances of said entity type differ in structure.

Related aspects of the invention provide a system, e.g., as described above, in which data cells consist of data independent of the domain and the encoding for the respective attribute whereby distinct instances of said attribute may differ in domain or encoding.

Related aspects of the invention provide a system, e.g., as described above, in which connective data cells consist of data independent of the domain and the encoding for the respective attribute whereby distinct instances of said attribute may differ in domain or encoding.

Related aspects of the invention provide a system, e.g., as described above, in which combinative data cells consist of data independent of the domain and the encoding for the respective attribute whereby distinct instances of said attribute may differ in domain or encoding.

Related aspects of the invention provide a system, e.g., as described above, in which characteristic data cells consist of data independent of the domain and the encoding for the respective attribute whereby distinct instances of said attribute may differ in domain or encoding.

Related aspects of the invention provide a system, e.g., as described above, in which the further improvement for discerning from a database schema the operators and respective data tunnels that are applicable to a respective attribute includes the steps of discerning an applicability of an equivalence operator from relationship constraints for said attribute such that data for instances of said attribute are stored in connective data cells within connective data tunnels respective of said attribute and discerning the applicability of a bounding operator from the numerical or time domain or arithmetic domain constraints for said attribute such that data for instances of said attribute are stored in combinative data cells within combinative data tunnels respective of said attribute. The improvement also includes the steps of discerning the applicability of a possessive operator from the character domain or enumeration domain constraints for said attribute such that data for instances of said attribute are stored in characteristic data cells within characteristic data tunnels respective of said attribute and discerning the inapplicability of said operators from the object or binary domain or external reference for said attribute such that data for instances of said attribute are not stored in any connective, combinative or characteristic data tunnels respective of said attribute.

Related aspects of the invention provide a system, e.g., as described above, in which the further improvement for discerning from a relational database schema the operators and respective data tunnels that are applicable to a respective attribute includes the steps of discerning an applicability of an equivalence operator from primary key and foreign key constraints for said attribute such that data for instances of said attribute are stored in connective data cells within connective data tunnels respective of said attribute and discerning the applicability of a bounding operator from the numerical or time domain or arithmetic check constraints for said attribute such that data for instances of said attribute are stored in combinative data cells within combinative data tunnels respective of said attribute. The improvement also includes the steps of discerning the applicability of a possessive operator from the character domain or enumeration check constraints for said attribute such that data for instances of said attribute are stored in characteristic data cells within characteristic data tunnels respective of said attribute and discerning the inapplicability of said operators from the large object domain or external reference for said attribute such that data for instances of said attribute are not stored in any connective, combinative or characteristic data tunnels respective of said attribute.

Related aspects of the invention provide a system, e.g., as described above, in which the further improvement for accessing data tunnels for the purpose of materialising a query result includes the steps of re-factoring the query expression to produce a disjunctive normal form expression of operators and their respective operands and removing each operator and respective operands from each conjunctive term of said disjunctive normal form expression where the outcome of said operator is implied by one or more other operators in the same said conjunctive term. The improvement also includes the steps of removing each conjunctive term from said disjunctive normal form expression where said conjunctive term contains an operator and respective operands that is deemed to be always false; evaluating each operator of said disjunctive normal form expression where said operator is respective of a single entity type to produce a separate relevant set of entity instances for each said operator independently and simultaneously for each said operator, for storage in computer memory; reducing said relevant sets of entity instances where said sets are respective of a common entity type such that members of said sets not respective to every said set for said entity are discarded to produce a common set of entity instances for said entity type independently and simultaneously for each respective entity type in each conjunctive term of said disjunctive normal form, for storage in computer memory; and correlating said common sets of entity instances for said entity types paired by binding operators in a sequence to produce a correlated set of entity instances for each respective entity type independently and simultaneously for each said conjunctive term, for storage in computer memory. The improvement also includes the steps of accessing data tunnels respective to each said correlated set of entity instances to produce a set of query result instances independently and separately for each respective entity type independently and simultaneously for each said conjunctive term, for storage in computer memory; marking query result instances as void where query result instances conflict with the respective conjunctive term independently and simultaneously for each said conjunctive term, for storage in computer memory; and merging said sets of query result instances for each said conjunctive term such that respective query result instances from each said set are combined into a single set of query result instances, for storage in computer memory;

Related aspects of the invention provide a system, e.g., as described above, in which the further improvement for correlating said common sets of entity instances within said conjunctive term for the purpose of producing a correlated set of entity instances includes the steps of correlating pairs of common sets of entity instances across a mutually respective bind operator in a defined visit sequence of bind operators, for storage in memory and updating the cardinality of entity instances in respective correlated sets of entity instances in reverse order of said visit sequence, for storage in memory.

Related aspects of the invention provide a system, e.g., as described above, in which the further improvement for deciding said visit sequence of said bind operators with said conjunctive term includes the steps of selecting a common set of entity instances with the least number of respective entity instances within said conjunctive term as the origin set of entity instances; selecting one of the said bind operators respective to the said origin set of entity instances as the first bind operator in the said visit sequence; selecting a subsequent bind operator from those bind operators respective to the same common set of entity instances as the bind operator most recently visited and which have not appeared in the said visit sequence or which have already appeared in said visit sequence but have been affected by a bind operator subsequently visited; and repeating the prior step until no more bind operators are available to be selected; such that correlated sets of entity instances are produced in the said visit sequence for storage in computer memory.

Related aspects of the invention provide a data storage and/or retrieval system implemented on one or more digital data processing systems that includes storage media comprising a plurality of data segments for each instance of an entity type manipulated by a database operation in a respective database transaction. All data segments are maintained within a contiguous data heap of arbitrary size and all new data segments are appended to the data heap and assigned to respective transactions and respective entity instances in arbitrary order. The system also includes a storage engine that is in communications coupling with the storage media and writes said data heap to storage media in a minimal number of storage write operations when any one of said transactions commits its state.

Related aspects of the invention provide a system, e.g., as described above, in which storage write operations are performed such that all said data segments within said data heap are written to storage in a minimum of storage write requests.

Related aspects of the invention provide a system, e.g., as described above, in which storage write operations for said data heap only occur at prefined regular intervals, such that transactions committing their state cannot complete said commit until the next storage write operation for said data heap has successfully completed.

Related aspects of the invention provide a system, e.g., as described above, in which an instance of a entity type is logically deleted by appending an inversion of the respective instance. Said inversion appears identical to the respective instance in all respective connective, combinative and characteristic data tunnels and a single inversion data tunnel for each entity type contains a plurality of data cells wherein a data cell denotes an inversion of a respective instance of said entity type.

Related aspects of the invention provide a system, e.g., as described above, in which append access to data tunnels and data heaps occurs in chronological order, read access to data tunnels and data heaps occurs in reverse chronological order, and read access resolves entity instance inversion by accumulating inversions and discounting corresponding entity instances as they are encountered.

Related aspects of the invention provide a system, e.g., as described above, in which a plurality of the cells of at least one said tunnel are grouped in frames based on common characteristics of their respective entity instances.

Related aspects of the invention provide a system, e.g., as described above, in which a plurality of the cells of at least one said tunnel are grouped in frames based on common characteristics of the respective entity instances such that cells across all tunnels respect common frame boundaries.

Related aspects of the invention provide a system, e.g., as described above, that includes a database engine that is coupled to the storage engine and that manages a retention of cells in the storage media with respect to the age of the data retained.

Related aspects of the invention provide a system, e.g., as described above, that includes a database engine that is coupled to the storage engine and that eliminates frames from read access during a query with respect to a time threshold expressed within said query.

Related aspects of the invention provide a system, e.g., as described above, in which said common characteristic is volume of respective entity instances.

Related aspects of the invention provide a system, e.g., as described above, that includes a database engine that is coupled to the storage engine and that manages a retention of cells in the storage media with respect to the volume of the data retained.

Related aspects of the invention provide a system, e.g., as described above, in which a plurality of data cells respective of a plurality of data tunnels respective of a plurality of frames are accumulated within a single logical storage system file of a plurality of logical storage system files.

Related aspects of the invention provide a system, e.g., as described above, that includes a database engine that is coupled to the storage engine and that manages a retention of cells in the storage media.

Related aspects of the invention provide a system, e.g., as described above, in which a common characterisation of respective cells within a plurality of frames is maintained across a plurality of frame intervals and across a plurality of frame interval sizes whereby a plurality of frames and respective data cells may be eliminated from consideration by a respective operator and its operands.

Related aspects of the invention provide a system, e.g., as described above, in which a plurality of bit sequences common to all respective instances of attributes for data cells within a plurality of frames is maintained across a plurality of frame intervals and across a plurality of frame interval sizes whereby a plurality of frames and respective data cells may be eliminated from consideration by a respective equivalence operator and its operands.

Related aspects of the invention provide a system, e.g., as described above, in which bounds common to all respective instances of attributes for data cells within a plurality of frames is maintained across a plurality of frame intervals and across a plurality of frame interval sizes whereby a plurality of frames and respective data cells may be eliminated from consideration by a respective bounding operator and its operands.

Related aspects of the invention provide a system, e.g., as described above, in which properties common to all respective instances of attributes for data cells within a plurality of frames is maintained across a plurality of frame intervals and across a plurality of frame interval sizes whereby a plurality of frames and respective data cells may be eliminated from consideration by a respective possessive operator and its operands.

Related aspects of the invention provide a system, e.g., as described above, in which a plurality of said data segments are grouped in frames based on common characteristics of their respective entity instances.

Related aspects of the invention provide a system, e.g., as described above, in which said common characteristic is time period.

Related aspects of the invention provide a system, e.g., as described above, in which said common characteristic is volume of respective entity instances.

Related aspects of the invention provide a system, e.g., as described above, that includes a storage engine that appends data cells to respective data tunnels for instances of respective entities contained in data segments that comprise a complete frame.

Related aspects of the invention provide a system, e.g., as described above, that includes a storage engine and that appends data cells to respective data tunnels for instances of respective entities contained in data segments that comprise a complete frame, as and when each frame becomes complete.

Related aspects of the invention provide a system, e.g., as described above, that includes a storage engine and that appends data cells to respective data tunnels for instances of respective entities contained in data segments that comprise a plurality of complete frames, as and when said plurality of frames become complete.

Related aspects of the invention provide a system, e.g., as described above, in which a complete definition of respective entity types and respective attributes is stored within distinct storage system file identified by a unique version identity whenever said definition is changed.

Related aspects of the invention provide a system, e.g., as described above, in which each distinct entity type definition is assigned a unique ordinal identity from a single monotonically increasing ordinal number sequence.

Related aspects of the invention provide a system, e.g., as described above, in which each distinct attribute definition is assigned a unique ordinal identity from a monotonically increasing ordinal number sequence for the respective entity type.

Related aspects of the invention provide a system, e.g., as described above, in which each complete definition is assigned a unique version identity from a single monotonically increasing version number sequence.

Related aspects of the invention provide a system, e.g., as described above, in which each complete definition is assigned the identity of the respective frame in which said definition is created.

Further aspects of the invention provide methods for data storage and/or retrieval paralleling operation of the systems characterized in the attached claims.

Still further aspects of the invention provide apparatus for data storage and/or retrieval operating in accord with the aforementioned systems and methods.

Yet still further aspects of the invention are evident in the text and drawings that follow.

BRIEF DESCRIPTION OF THE DRAWINGS

FIG. 22 illustrates that an identification cell can be a sequence of bytes with a preceding cell size, path and domain in a system according to one practice of the invention;

FIG. 23 illustrates that a measurement cell can hold a cell length, domain, sign indicator, an exponent and a significand that represent the magnitude of an element in a system according to one practice of the invention;

FIG. 24 illustrates that an enumeration cell can be a sequence of property identifiers a preceded by a property size and an enumeration sequence preceded by a cell size, path and domain in a system according to one practice of the invention;

FIG. 25 illustrates that an opaque cell can contain a cell size, path, domain, opaque element size and a link to where opaque data is stored in a system according to one practice of the invention;

FIG. 26 illustrates that an inversion cell can contain fixed size frame and tunnel numbers in a system according to one practice of the invention;

FIG. 27 illustrates that a digest cell can contain a cell size, digest and fixed size tunnel number in a system according to one practice of the invention;

FIG. 28 illustrates that a digest tunnel can be arranged with cells appended in strict chronological order within a tunnel in a system according to one practice of the invention;

FIG. 29 illustrates that a frame can also contain a cell count per digest tunnel number which is a one-dimensional array addressed by tunnel number (1 . . . N) to yield a count of cells in that tunnel in a system according to one practice of the invention;

FIG. 30 illustrates that a digest tunnel map can be a one-dimensional array addressed by collection tunnel number to yield a corresponding digest tunnel number in a system according to one practice of the invention;

FIG. 31 illustrates that a rank tunnel can be arranged with cells appended in strict chronological order within a tunnel in a system according to one practice of the invention;

FIG. 32 illustrates that a frame can contain a one-dimensional array per rank tunnel addressed by byte value (0 . . . 255) to yield the count of cells in that rank tunnel that contain the corresponding cell value in a system according to one practice of the invention;

FIG. 33 illustrates that a frame can contain a one-dimensional array addressed by property tunnel number (1 . . . N) to yield the count of TRUE cells in that tunnel in a system according to one practice of the invention;

DETAILED DESCRIPTION OF THE ILLUSTRATED EMBODIMENT

Figure 1:
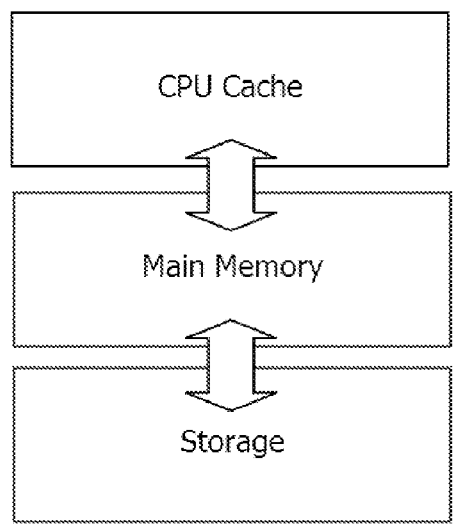
FIG. 1 is a schematic diagram of an exemplary computer architecture.
Figure 2:
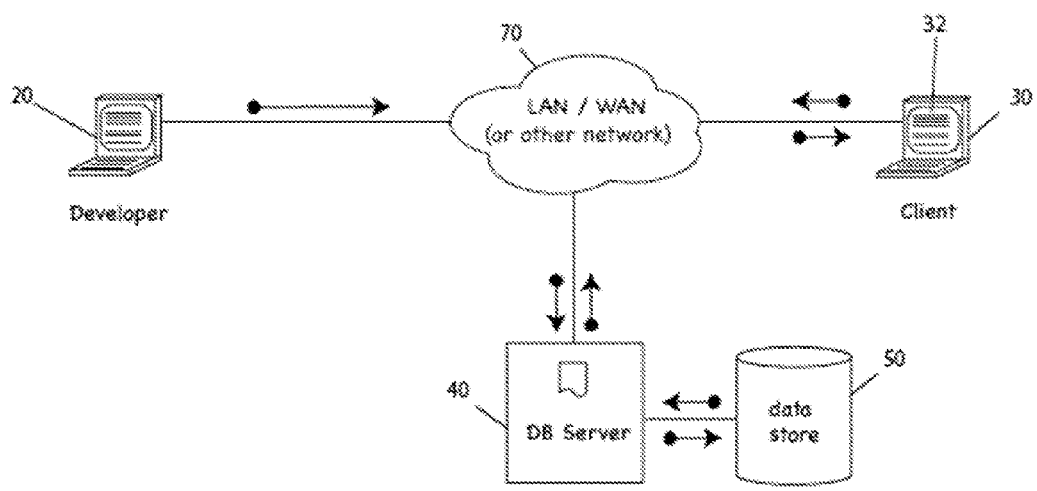
FIG. 2 depicts a digital data processing system and environment according to one practice of the invention that supports OLTP and OLAP activity independently of the data model or schema.

FIG. 2 depicts a digital data processing system and environment according to one practice of the invention that supports OLTP and OLAP activity independently of the data model or schema. This can include, for example, persisting and retrieving data in the storage layer of a database system that supports any of a number of data models, e.g., relational or hierarchical data models, and their concomitant query languages and, yet, that is independent of those models and languages.

In the illustrated embodiment, the system includes digital data processors 20-40, which may be personal computers, workstations, mainframes, or other digital data processing apparatus of the type known in the art capable of executing applications, programs and/or processes. Although three digital data processors 20-40 are shown here, those skilled in the art will appreciate that the functionality attributed to them herein may be combined onto a lesser number of such digital data processors or distributed onto a greater number, all consistent with the teachings hereof. Illustrated digital data processors 20-40 are coupled for communication in the conventional manner known in the art, here, for example, via a network 70, such as the Internet, a local-area network (LAN), wide-area network (WAN), or otherwise, that may be public, private, IP-based, etc.

Illustrated digital data processor 20 comprises a personal computer, workstation, mainframe, or other digital data processing apparatus, as discussed above, and is used by a developer to build, test, and deploy a database system in accord with the teachings hereof. To that end, the digital data processor 20 executes a variety of applications for creating such a system, including, for example, a computer language compiler.

Illustrated digital data processor 30 comprises a personal computer, workstation, mainframe, or other digital data processing apparatus, as discussed above, and is employed by a user to persist and/or retrieve information from the database system and more particularly, for example, from a data store 50. To this end, the digital data processor 30 provides an interface 32 (e.g., graphical, textual, batch-oriented or otherwise) that accepts user requests for data storage and retrieval—and, more specifically, for example, requests for creating, reading, updating and deleting data in the database system—and that generates corresponding notifications, data records or other information of the type conventionally known in the art as adapted in accord with the teachings hereof. In typical applications, requests by the user and information generated by the interface 32 are made with respect to relational or hierarchical data model or schema and, more generally, with respect to a data model or schema around which the user perceives the database system to be organized. Accordingly, digital data processor 30 may execute any variety of conventional database application, including, for example, a relational database, all as adapted in accord with the teachings hereof.

Illustrated digital data processor 40 comprises a personal computer, workstation, mainframe, server, or other digital data processing apparatus, that executes a digital data information storage and retrieval application (e.g., a database server) in accord with the teachings hereof that stores, retrieves, updates, deletes, and otherwise manages data maintained on networked attached storage device 50, which may be a hard disk drive and/or other persistent storage device of the type known in the art. The digital data processor 40 and data store 50 operate in the conventional manner known in the art as adapted in accord with the teachings hereof to persist and retrieve data using storage and access models heretofore unknown in the art.

Figure 3:
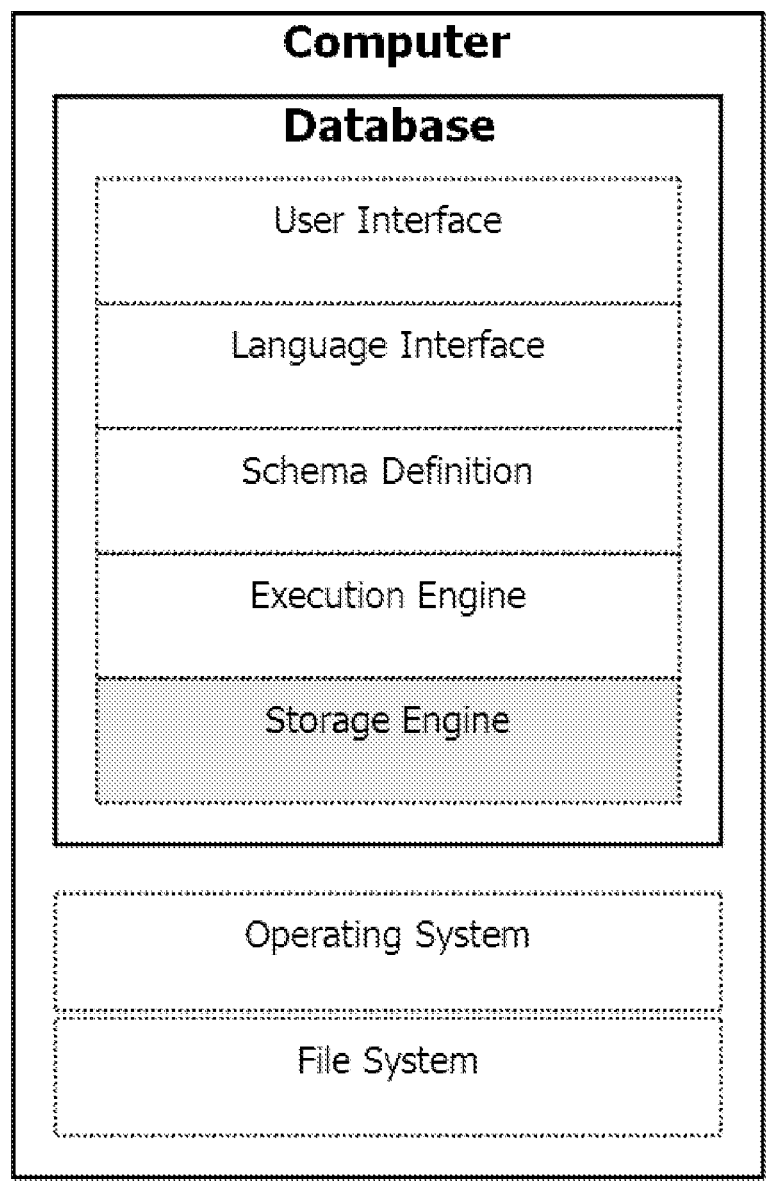
FIG. 3 depicts a software architecture for a database server in a system according to one practice of the invention.

FIG. 3 depicts a software architecture for database server 40. As shown in the drawing, it includes database management software (labelled "Database") that includes user interface functionality, language interface functionality, schema definition functionality and an execution engine, all of the type known in the art as adapted in accord with the teachings hereof. The software architecture further includes an operation system and file systems, again, of the type known in the art as adapted in accord with the teachings hereof. Construction and operation of a storage engine of the type illustrated here are detailed below. The storage engine is alternatively referred to herein as "the database system," "the illustrated database system," "digital data storage system," "digital data retrieval system" and the like, as will be evident in context in the following.

The illustrated database system supports a particular data model such as the relational or hierarchical data model and provides a query language to the users of the database to support data definition, data manipulation and data retrieval. The data model defines the semantics of the data stored within the database while the query language defines the syntax for using the data model.

Discussed herein is an access model and storage model that support the data model used—yet are independent of it such that virtually any data model can be efficiently supported. The access model defines the primitive operations required to efficiently support the data model; while the storage model defines the storage structures required to sufficiently support the access model.

Figure 4:
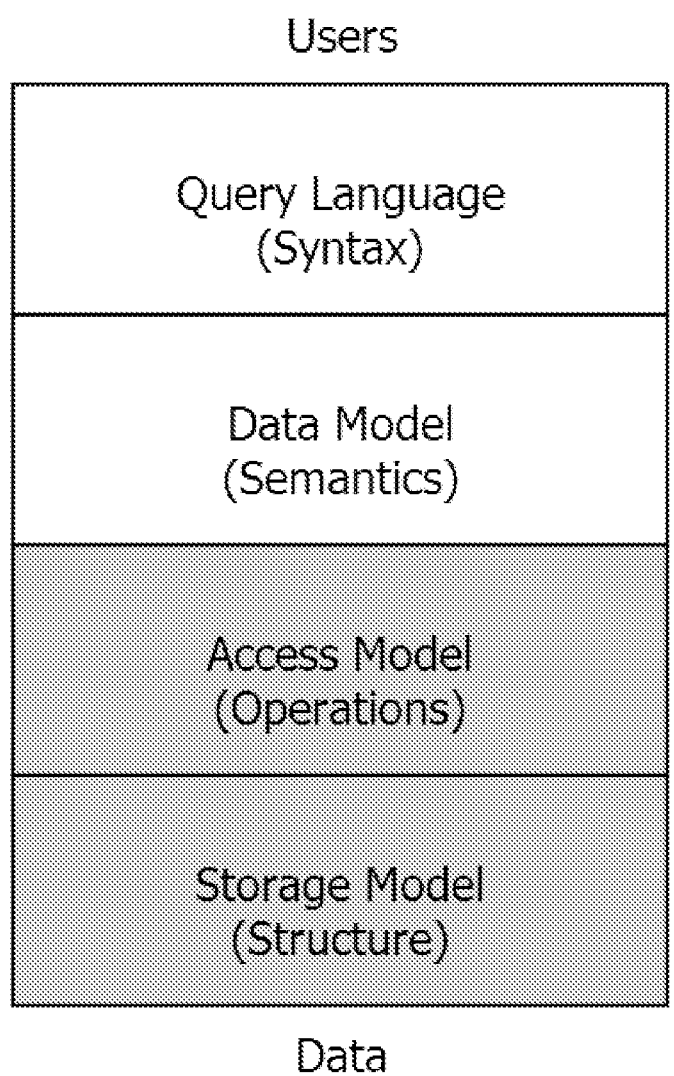
FIG. 4 illustrates how an access model and a storage model relate to a query syntax and a data model employed by users in a system according to one practice of the invention.

FIG. 4 illustrates how that access model and storage model relate to the query syntax and data model employed by users.

Access Model

For the purpose of independence from a data model, the access model views the data population as collections of atomic elements wherein a collection instance is just a bundle of element instances with no inherent structure and an element instance is a pairing of a distinguishing reference path and a data value associated with it. All collection instances are referenced by a unique collection path that distinguishes between collection instances of differing characteristics.

Figure 5:
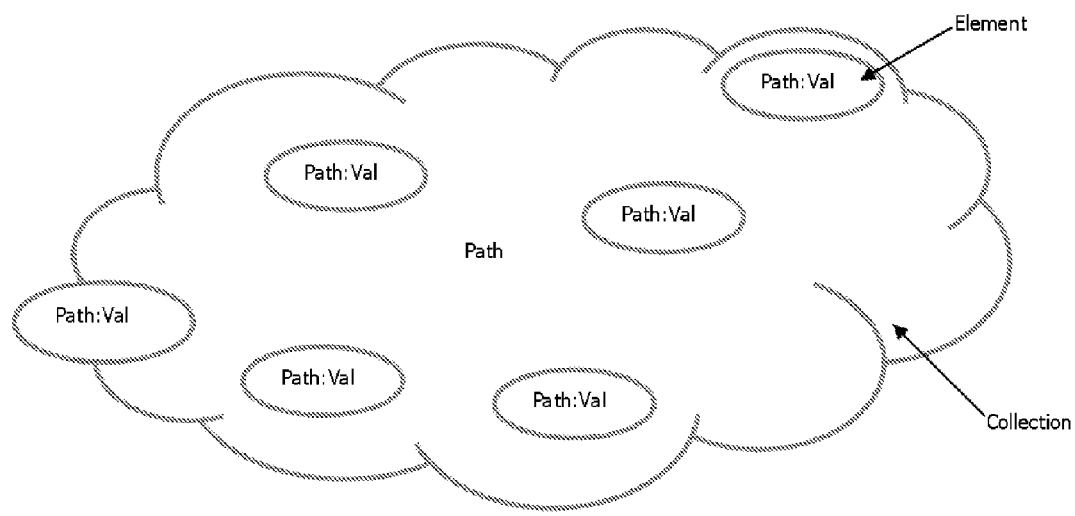
FIG. 5 illustrates a logical collection and logical elements within it in a system according to one practice of the invention.

Collection instances may be inserted and deleted in their entirety; they may also be updated (by adding and removing element instances within them). Therefore a collection instance is viewed as a cloud of element instances which can be added or removed at will. FIG. 5 illustrates a logical collection and logical elements within it.

In FIG. 5, the path at the centre of the cloud represents a logical collection path while the path in each logical element represents an element path. These collection and element paths define the meta-data for the collection instances that might appear in this collection path.

Notice that this model knows nothing about any logical relationships that might exist between element paths or relationships between element instances within a collection instance or any relationships that might exist between element instances across collection instances.

Figure 6:
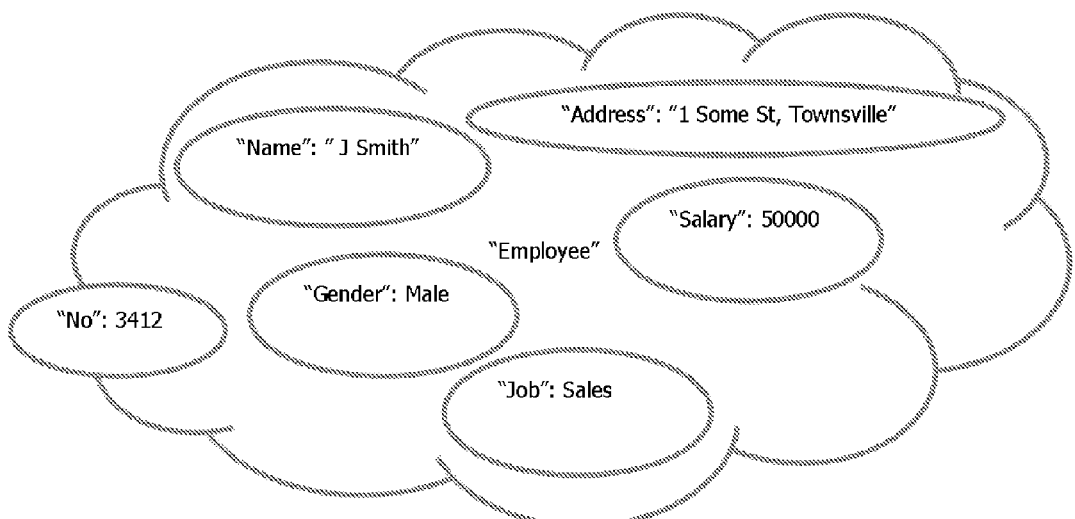
FIG. 6 illustrates that a collection path is equivalent to a table name and an element path corresponds to the column name in a system according to one practice of the invention.

When compared to the relational model, a collection instance is analogous to a table row and each element instance corresponds to a table column value. The collection path is equivalent to the table name and the element path corresponds to the column name. This is illustrated in FIG. 6.

The non-existence of an element instance is analogous to a null column value in a row. The insertion and deletion of table rows corresponds to the insertion and deletion of whole collection instances. The update of a row is modelled as the removal and/or addition of one or more element instances to an existing collection instance.

In view of the above it will be appreciated that the access model supports a relational data structure.

Figure 7:
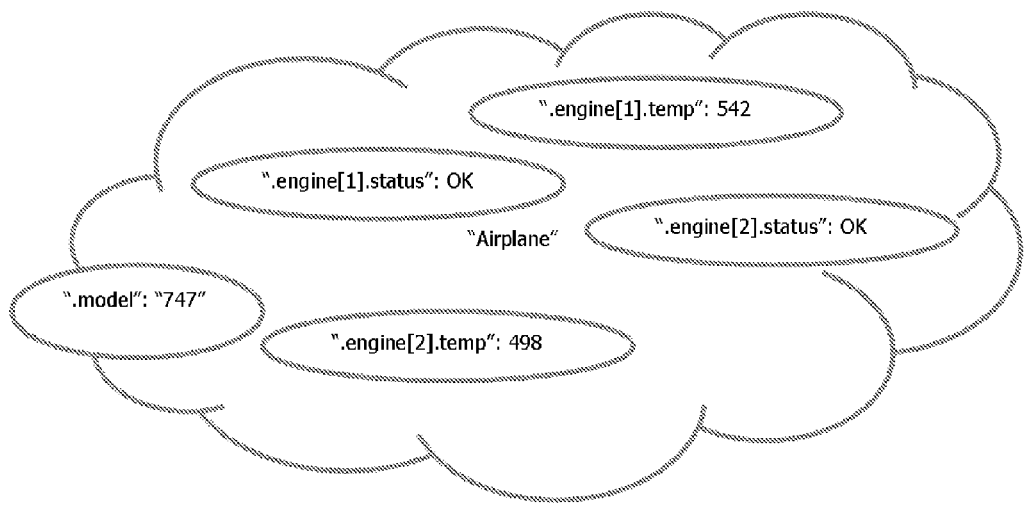
FIG. 7 illustrates that, for example, an element path may model a nested object structure in a system according to one practice of the invention.

When compared to the object model, a collection instance is analogous to an object instance and each element instance corresponds to an atomic field within the object instance. Notice however, that the structure of the object (which may be an aggregate of other objects) is not reflected in the collection instance but is reflected in the element path reference. In other words, the collection instance flattens out the object structure while the element paths preserve it. For example an element path may model a nested object structure such as ".Object.Array[N].Field". See the example in FIG. 7.

In view of the above it will be appreciated that the access model supports an object data structure.

Figure 8:
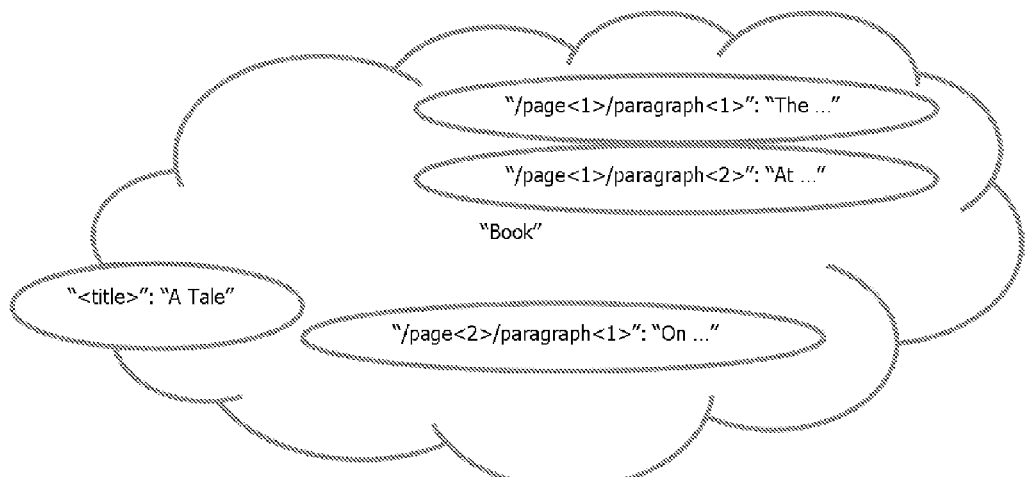
FIG. 8 illustrates that, for example, an element path may preserve an XML hierarchy in a system according to one practice of the invention.

When compared to the hierarchical model, a collection instance is analogous to the root of the hierarchy and the element instances correspond to the atomic attributes stored within the hierarchy. Much like the object model, the hierarchy is flattened out by the collection instance, but preserved by the element paths. For example an element path may preserve an XML hierarchy such as "book/page/paragraph". See the example in FIG. 8.

In view of the above it will be appreciated that the access model supports a hierarchical data structure.

Notice that in each case an element instance is a simple scalar data type while its associated path preserves any complex structure around it and, in essence, the element path performs a structure serialisation function.

In view of the above it will be appreciated that structure of a data model is preserved by the access model meta data paths.

All non-scalar data structures are resolved into multiple reference paths with associated values of scalar number, scalar text or scalar object. For example, a composite coordinate structure (X, Y) will be resolved into path and scalar number pairs (element instances) of ("X": number) and ("Y": number) respectively. Thus arbitrarily complex data types can be resolved into multiple scalar element instances with their element paths preserving the structure of the complex data type.

In view of the above it will be appreciated that the access model can support arbitrarily complex data structures.

In view of the above it will be appreciated that the access model is independent of any specific data model.

For the purpose of clarity, collections and elements relate to entities and attributes as recognised in standard Entity Relationship Modelling as follows,

TABLE 4

| ERM Concept | Access Model Concept |
| --- | --- |
| Entity Type | Collection Path |
| Entity Instance | Collection Instance |
| Attribute | Element Path |
| Attribute Instance | Element Instance |

This access model allows for an arbitrary set of element instances to be included in a collection instance at any time. This fluidity allows the access model to accept any schema changes supported by the native data model without imposing constraints unrelated to the native data model.

In view of the above, it will be appreciated that the access model does not unnecessarily constrain the native data model.

In view of the above, it will be appreciated that the access model allows collection paths and element paths to be arbitrarily and dynamically created at will.

The access model requires that a collection path is unique. Therefore, a collection path must contain sufficient information to resolve its identity. The access model requires that an element path is unique within a collection path; but need not be unique across collection paths. Therefore, an element path must always be qualified by the collection path to which it belongs to resolve its identity.

For example, in a relational context, a column named 'C' (element path) may appear in multiple distinct tables (collection paths). Therefore, the identity of element path 'C' can only be resolved by the context of the collection path to which it belongs.

The access model does not consider that the data type, domain, encoding or size of an element instance to be significant. Instead, element intent is regarded as significant wherein the intent defines the purpose of the element path in providing information pertaining to the collection. The intent of an element path is categorised as exactly one of the following: (Identification Intent, Measurement Intent, Enumeration Intent, and Opaque Intent)

Identification Intent. The element path is used as an identifier. Such an element path is only used in whole to reference a collection instance or parts of it. For example, an 'employee number' element path has identification intent and is used to reference a particular employee instance and has no other significance. An identification element instance can only possess one value at any one time within a collection instance and that value is only meaningful in its entirety and has no implied ordering or merit in comparison to any other identifier values within the same element path. For example, an employee number may only have one value for a particular employee at any one time; and the entire employee number is used to identify the employee; and furthermore, a comparison of employee numbers yields no useful information.

Measurement Intent. The element path is used as a measure of some property. Such an element path supports comparisons between element instances to determine an order of merit. For example, an 'employee salary' element path has measurement intent and may be used to compare employees—but would not be used to identify any particular employee. A measurement element instance can only possess one value at any one time and that value is only meaningful in its entirety (no meaningful information is provided by part of the value). For example, an employee salary only has one value for a particular employee at any one time; and the salary is specified by the entire salary value.

Enumeration Intent. The element path is used to express ownership of one or more discrete properties. For example, an 'employee gender' element path would be considered to be a singleton ownership of either a male or female property; and the 'employee address' element path would be considered to be an ownership of multiple word properties. Subsets of the properties within the enumeration element instance can impart useful information. For example, the city name property in an address instance can provide useful information independently of the other properties in the same address.

Opaque Intent. The element contains foreign information and it has no intent relevant to the access model. For example, an attached employee contract in a PDF document cannot be used for the identification, measurement or enumeration of the employee in any useful way.

The corollary to fully dynamic collection instances of element instances belonging to element paths with a specific intent is that the intent must be specified whenever a new element path is created. Therefore, in this embodiment, the creation of an element path must indicate its intent.

There is no direct analogy to element intent in a traditional data model. However, relationship and value domain constraints can be used to ascertain intent. The table below presents a summary of how intent may be discerned from fundamental data types in a native data schema. The table assumes that every element instance value can be expressed as a scalar number, scalar text or scalar object. For example, time data can be represented as a number of time units within an epoch.

TABLE 5

|  | Number | Text | Object |
|---|---|---|---|
| Is a relationship | Identity | Identity | N/A |
| Is not a relationship | Measure | Enumeration | Opaque |

In view of the above, it will be appreciated that the only information needed to be known about an element path is its canonical name and intent which are readily determined from the native data model.

The following table provides a list of rules for discerning element path intent in a relational database schema. The rules are applied in ascending order of precedence and when a condition is met the corresponding intent is used.

TABLE 6

| Precedence | Condition | Intent |
|---|---|---|
| 1 | Has a primary key constraint | Identification |
| 2 | Has a foreign key constraint | Identification |
| 3 | Has a unique constraint | Identification |
| 4 | Has an enumerated check constraint | Enumeration |
| 5 | Has an arithmetic check constraint | Measurement |
| 6 | Has an inverted-list index | Enumeration |
| 7 | Has a bit-map index | Enumeration |
| 8 | Has a B-tree index | Identification |
| 9 | Is a time data type | Measurement |
| 10 | Is a boolean data type | Enumeration |
| 11 | Is a numeric data type | Measurement |
| 12 | Is a character type | Enumeration |
| 13 | Is a large object data type | Opaque |
| 14 | Is an external link | Opaque |

Using these rules, the table definitions given in the earlier example would yield the following intents

```
create table Employees
  (Name varchar(64) not null, => Enumeration
   EmployeeNumber number primary key, => Identification
   Salary number(8,2) not null, => Measurement
   CommissionRate number(4,2), => Measurement
   DepartmentNumber number references
   Departments(DepartmentNumber)); => Identification
create table Departments
  (Name varchar(64) not null, => Enumeration
   DepartmentNumber number primary key, => Identification
   RegionNumber number references
   Regions(RegionNumber)); => Identification
create table Regions
  (Name varchar(64) not null, => Enumeration
   RegionNumber number primary key); => Identification
```

In view of the above, it will be appreciated that the only information needed to be known about an element path within a relational model is easily determined from the relational schema.

Access Model Operations

The data manipulation operations that this access model supports are as follows.

A) Add a whole new collection instance to a collection path. Every element instance contained within the collection instance is individually specified as an element path and value pair.

B) Drop a whole existing collection instance from a collection path. A whole collection instance is removed, including every element instance contained within it.

C) Add an element instance to an existing collection instance with a collection path. The element instance is specified as an element path and value pair.

D) Drop an element instance from an existing collection instance within a collection path. The element instance is specified by its path only.

E) Retrieve collection instances that match element instance criteria. The criteria include expressions for both the element path and element instances of interest.

A combination of these primitive operations is sufficient to support the data manipulation operations found in traditional database systems such as an RDBMS.

For a relational database system,

Inserting a new row with specific column values into table is implemented by

A) Inserting a new collection instance (row) that contains specific element instances (column values)

Querying rows from a table that match column criteria is implemented by

A) Retrieving collection instances (rows) that match the required element path (column) criteria Deleting rows from a table that match column criteria is implemented by A) Retrieving collection instances (rows) that match the required element path (column) criteria B) Dropping the retrieved collection instances.

Updating column values in a set of table rows is implemented by

A) Retrieving collection instances (rows) that match the required element path (column) criteria B) Removing predecessor element instances (column values) from each collection instance (row) retrieved C) Adding successor element instances (column values) to each collection instance retrieved In view of the above, it will be appreciated that the access model supports the fundamental data manipulation operations required by a relational database system.

This access model allows retrieval of collection instances by applying predicates to one or more element paths such that only collection instances that conform to the predicate criteria are retrieved. For example, it would be possible to retrieve an employee collection with a specific employee number by predicating that the employee number path contain the required employee number.

The nature of a predicate is inextricably linked with the intent of the element path against which it is expressed and the access model allows the following predicates for each intent, A) All intents. Collection instances can be predicated on the existence or non-existence of an element instance in an element path of any intent.

B) Identification intent. Collection instances can be predicated on the equivalence of identification element instances to a sought identity. There is no ordering or merit implicit to an identifier and therefore no other predicates apply. In reality, a real world identifier may contain some implied notion of ordering but this is not known or assumed by this access model.

C) Measurement intent. Collection instances can be predicated on measurement element instances falling within a bounded range. There can be no attempt to test part of a measurement value as it represents a single point on a spectrum of possible values and any attempt to match part of a measurement value implies some knowledge about the internal representation of the value—which is beyond this access model and is non-deterministic. The access model allows the bounded range to be reduced to a single point using a common boundary and also allows the lower bound to be expressed as negative infinity and/or the upper bound to be expressed as positive infinity.

D) Enumeration intent. Collection instances can be predicated on whether enumeration element instances contain one or more properties within them.

E) Opaque intent. Element instances of opaque intent offer no useful information other than their existence or non-existence.

Therefore, each intent is associated with specific predicate operators that pertains to it and the following predicate operators are provided, A) Operator 'is'. Predicates that an identification element instance 'is' equivalent to an identifier.

B) Operator 'in'. Predicates that a measurement element instance falls in a bounded range.

C) Operator 'has'. Predicates that an enumeration element instance 'has' ownership of one or more properties.

D) Operator 'exists'. Determines if an element instance 'exists' and can be used with an element path of any intent.

Each of the predicate operators returns a Boolean result for each collection instance as follows,

TABLE 7

| Operator | Returns | Notes |
| --- | --- | --- |
| exists(e) | TRUE if element instance in element path e exists; false otherwise | Requires only an element path as an operand |
| is(e, a) | TRUE if the element instance in element path e is equivalent to value a; false otherwise | Requires an element path and an identification constant as operands |
| in(e, $a_1$, $a_2$) | TRUE if the element instance in element path e is bounded by $a_1$ and $a_2$ | Requires an element path and exactly two measurement constants where $a_1 \leq a_2$. The first operand may be negative infinity and the second operand may be positive infinity to support open range boundaries. |
| has(e, $a_1$, $a_2$ ... ) | TRUE if the element instance in element path e contains all of the properties included in $a_1$, $a_2$ ... | Requires an element path and one or more identification constants. |

In the table above, each predicate operator is used in the context of an element path e which is fully qualified by its containing collection path.

The following relational examples illustrate the use of each predicate operator,

---

C is not null; translates to exists(C)
C = 123456; translates to is(C, 123456)
C BETWEEN 1 AND 10; translates to in(C, 1, 10)
C LIKE '%JOHN% SMITH%'; translates to has(C, 'JOHN', 'SMITH')

---

In the examples above, C is a column name (element path) which is assumed to be qualified by the table name (collection path) to which it belongs.

The criteria supported by the predicate operators in this access model may not be as rich as the native data model operators. For example, the expressiveness of the 'has' operator is more restricted than the SQL LIKE operator. However, these predicate operators provide sufficient expression to allow a strict superset of collection instances to be identified and retrieved and then reduced further by the native data model operators.

In one embodiment, the 'is' operator supports an arbitrary number of identification constants and predicates that the identification element instance is equivalent to any one of the constants.

In one embodiment, the 'in' operator supports left and right inclusive bounding indicators which specify whether the left bound and right bound should each be considered as inclusive or exclusive for determining the enclosure of a measurement element instance.

In one embodiment, the 'has' operator supports a regular expression operand which is applied to each enumeration element instance to determine its conformity.

In one embodiment, each element path may have more than one intent and every element path is assumed to have identification intent in addition to its measurement or enumeration intent.

In view of the above, it will be appreciated that the access model predicate operators support equivalence or useful near equivalence to the predicate criteria possible in the native data model.

Element paths with identification intent may be involved in expressing relationships between collection paths and another operator is provided to support the binding together of multiple collection instances through the equivalence of their identification element instances. This operator is a bind operator which predicates the equivalence of element instances across two element paths. The bind operator is defined as

TABLE 8

| Operator | Returns | Notes |
| --- | --- | --- |
| bind(e1, e2) | TRUE if the element instances in element paths e1 and e2 are equivalent in value | Requires two element paths fully qualified by their collection paths |

This operator is equivalent to an inner equi-join in a relational data model. For example, a join in a SQL statement such as,
 where
Employees.DepartmentNo=Departments.DepartmentNo
 can be expressed by a bind operator as,
 bind('Employees.DepartmentNo','Department.DepartmentNo')
which returns TRUE for each combination of collection instances in the 'Employees' and 'Departments' collection paths where they have equivalent element instances in the 'DepartmentNo' element path.

In view of the above, it will be appreciated that the access model supports the common predicate and equijoin conditions in the relational model.

Clearly, the bind operator can be extended to include options whereby bind operations equivalent to relational outer-joins, cross-joins and self-joins are supported. For outer joins, one or both collection paths can be associated with an outer-join indicator. For cross-joins, the element path operands can be omitted. For self-joins collection path alias operands are associated with each collection path so that the same collection path can appear under different aliases and be treated effectively as a separate collection path under each distinct alias. This is similar to the alias mechanism used in relational SQL.

In view of the above, it will be appreciated that the access model supports self-join, cross-join and outer-join conditions in the relational model.

In one embodiment, the 'bind' operator supports equi-joins between different element paths within common collection instances of a collection path to model the relation query where columns in the same table are compared for equality.

This access model requires that a relationship is implemented through the equivalence of identification element instances and allows relationships between collection paths to be established at retrieval time by binding their respective identity element paths. Any two element paths with identity intent may be bound together arbitrarily and this access model need not be aware that those separate element paths enforce a relationship until the element paths are explicitly bound together at query time. Note that the native database schema may be aware of explicit relationships between entities but that these need not be made apparent to this access model until query definition.

In view of the above, it will be appreciated that the access model does not require the definition of relationships between entities before they are expressed for the purpose of a query.

While this model assumes that any identity element path may be bound to any other identity element path, it requires that measurement, enumeration and opaque element paths will never be bound as they do not express equivalence for the purpose of equivalence binding.

This access model allows the combination of multiple predicate and bind operators using Boolean algebra to create compound expressions that incorporate multiple conditions and element paths.

Some statements in the native data model may combine together multiple queries in a single statement. In a relational context this occurs with sub-queries and set operations such as unions and intersections. The individual queries can be serviced by the access model operators as described above and the logic of the compound statement can be resolved by the query execution engine.

Bind Operator Resolution

The following describes a method for resolving bind operators across a compound Boolean expression whereby predicate operators may be evaluated independently and whereby bind conditions may be applied independently; allowing multiple CPU and storage resources to be applied simultaneously.

In this embodiment of resolving bind operators, it is required that a compound operator expression must be expressed in Disjunctive Normal Form (DNF), which is a disjunction of conjunctive terms each containing a conjunction of operator literals.

It has been mathematically proven elsewhere that every composite Boolean expression can be re-factored into a DNF by using Boolean axioms and laws such as associativity, distributivity and DeMorgan's Law. Methods for transforming Boolean expressions into DNF is extensively covered elsewhere and will not be considered further here.

In this embodiment of resolving bind operators, it is required that a conjunctive term contain at least one predicate operator for every collection path that appears anywhere within the same conjunctive term of the DNF. For this purpose, the following trivial predicate operator is provided by the access model.

TABLE 9

| Operator | Returns | i Notes |
| --- | --- | --- |
| true(c) | TRUE for all instances in collection path c | Requires a collection path as an operand |

In this embodiment of resolving bind operators, it is required that within each conjunctive term, any operators or conjunctive terms that universally equate to TRUE or FALSE respectively be removed as follows.

TABLE 10

| Expression | Reduction | Notes |
| --- | --- | --- |
| in(e, a, b) | Remove term | Where a > b |
| in(e, a, b) | Remove operator | Where a is negative infinity and b is positive infinity |

In this embodiment of resolving bind operators, it is required that within each conjunctive term, two or more operators against a common element path be reduced to a single operator to simplify the conjunctive term as follows.

TABLE 11

| Expression | Reduction | Notes |
| --- | --- | --- |
| exists(e) ^ !exists(e) | FALSE | An element instance cannot both exist and not exist at the same time |
| is(e,a) ^ is(e,b) | FALSE | An identity cannot have two values at the same time |
| is(e,a) ^ !is(e,b) | is(e,a) | The is(e,a) is sufficient and the !is(e,b) is redundant |
| is(e,a) ^ exists(e) | is(e,a) | The is(e,a) implies exists(e) |
| is(e,a) ^ !exists(e) | FALSE | An identity cannot have a value if it does not exist |
| !is(e,a) ^ !exists(e) | !exists(e) | If an identity does not exist it implies that it cannot have a value |
| in(e,a,b) ^ in(e,c,d) | in(e,g,h) | Where (a,b) and (c,d) overlap at (g,h) |
| in(e,a,b) ^ in(e,c,d) | FALSE | Where (a,b) and (c,d) do not overlap |
| in(e,a,b) ^ !in(e,c,d) | FALSE | Where (a,b) within (c,d) |
| in(e,a,b) ^ exists(e) | in(e,a,b) | The in(e,a,b) implies exists(e) |
| in(e,a,b) ^ !exists(e) | FALSE | A measurement cannot have a value if does not exist |
| !in(e,a,b) ^ !exists(e) | !exists(e) | If a measurement does not exist it cannot be fall within a range. |
| has(e,a) ^ exists(e) | has(e,a) | The has(e,a) implies exists(e) |
| has(e,a) ^ !exists(e) | FALSE | If an enumeration does not exist it implies that it cannot posses any properties |
| !has(e,a) ^ !exists(e) | !exists(e) | If an enumeration does not exist it implies that it cannot posses any properties |
| has(e,a) ^ has(e,b) | has(e,a,b) | The has( ) operator accepts an arbitrary number of operands. |
| bind(e,e) | TRUE | An element instance is always equivalent to itself. |

In this embodiment of resolving bind operators, the true( ) operator is removed from a conjunctive term where another predicate operator for the same collection path already exists within the same conjunctive term.

In this embodiment of resolving bind operators, the reduction rules are applied iteratively to simplify a conjunctive term as much as possible.

In this embodiment of resolving bind operators, the conjunctive terms are de-duplicated by removing conjunctions that contain combinations of operators and operands that are identical to other conjunctive terms in the same DNF.

The following illustrates the conversion of a SQL—where clause into a Boolean DNF of the access model operators described

```
...where (Employees.salary between 10000 and 35000)
and (Employees.Commission is not null)
and (Employees.DepartmentNo = Departments.DepartmentNo)
and (Departments.RegionNo = Regions.RegionNo)
and ((Regions.Name='North') or (Regions.Name='East'))
```

The above SQL clause becomes the following Boolean expression when using the access model operators described

```
in('Employees.Salary', 10000, 35000)
and exists('Employees.Commission')
and bind('Employees.DepartmentNo', 'Departments.DepartmentNo')
and bind('Departments.RegionNo', 'Regions.RegionNo')
and ((is('Regions.Name', 'North') or is('Regions.Name', 'East'))
```

When this Boolean expression is converted into DNF, it becomes

```
(in('Employees.Salary', 10000, 35000)
and exists('Employees.Commission')
and bind('Employees.DepartmentNo', 'Departments.DepartmentNo')
and bind('Departments.RegionNo', 'Regions.RegionNo')
and is('Regions.Name', 'North')
and true('Departments')
or
(in("Employees.Salary", 10000, 35000)
and exists('Employees.Commission')
and bind('Employees.DepartmentNo', 'Departments.DepartmentNo')
and bind('Departments.RegionNo', 'Regions.RegionNo')
and is('Regions.Name', 'East')
and true('Departments')
```

Notice that the true( ) operator has been introduced for the 'Departments' collection path in each conjunctive term because it appears within a bind operator but there are no predicate operators applied to it in same the conjunctive term.

In this embodiment of resolving bind operators, it is required that each predicate operator evaluates itself by generating a set of collection instances. This set is known as a collection set and contains one member for each collection instance where the predicate operator is TRUE. Each set member is a vector of the following information, Identity. This uniquely identifies the instance of a collection. For purposes of the present discussion this identity is assumed to be the ordinal position of a collection instance within the collection path Cardinality. This defines the number of times a member must be repeated within a bind. When a collection set is first generated by a predicate operator this cardinality is always 1.

Sequence. This defines the order in which the collection instances must be bound. When an collection set is first generated by a predicate operator this sequence is always 0.

Therefore, in the example above, the operator evaluation for in ("Employees.Salary", 10000, 35000) would be the following collection set

TABLE 12

| Identity | Cardinality | Sequence |
| --- | --- | --- |
| 1 | 1 | 0 |
| 2 | 1 | 0 |
| 3 | 1 | 0 |

While the operator evaluation for exists ('Employees.Commission') would be the following collection set

TABLE 13

| Identity | Cardinality | Sequence |
|---|---|---|
| 2 | 1 | 0 |
| 3 | 1 | 0 |

In this embodiment of resolving bind operators, it is required that collection sets that correspond to the same collection path within a conjunctive term are then combined whereby any members that do not appear in every set are discarded.

In the example, this yields the following collection set for the 'Employees' path when combined from the two collection sets above.

TABLE 14

| Identity | Cardinality | Sequence |
|---|---|---|
| 2 | 1 | 0 |
| 3 | 1 | 0 |

In one embodiment, the collection sets generated for each predicate operator can be shared (rather than regenerated) across conjunctive terms where the same operator and operand combination appears elsewhere.

In one embodiment, combined collection sets can also be shared where they combine exactly the same operators and operands. In this example, the combined collection set above can be shared across both conjunction terms as it has been generated from the same combination of operators and operands.

Based on the first conjunctive term in the example above, the collection set for the 'Employees', 'Department' and 'Regions' collection paths would be

TABLE 15

| Employees Collection Set | | |
|---|---|---|
| Identity | Cardinality | Sequence |
| 2 | 1 | 0 |
| 3 | 1 | 0 |

TABLE 16

| Departments Collection Set | | |
|---|---|---|
| Identity | Cardinality | Sequence |
| 1 | 1 | 0 |
| 2 | 1 | 0 |
| 3 | 1 | 0 |

TABLE 17

| Regions Collection Set | | |
|---|---|---|
| Identity | Cardinality | Sequence |
| 1 | 1 | 0 |

Note that in this example, the predicate operators ('in' and 'exists') against the 'Employee' collection path appear with the same operands in both conjunctive terms of the DNF expression and therefore the collection sets that are generated from them can be shared across both conjunctive terms. Similarly for the 'true' operator in the 'Departments' path; whereas the is operator for the 'Regions' path cannot be shared because it uses different operands.

In this embodiment of resolving bind operators, every collection set is then bound by the bind operators that appear within the same conjunctive term to update the bind sequences and cardinality for each collection path. The method for binding collection sets is described in detail later, but for the purpose of the present discussion the bind process would generate the following collection sets for each collection path.

TABLE 18

| Employees Collection Set | | |
|---|---|---|
| Identity | Cardinality | Sequence |
| 2 | 1 | 2 |
| 3 | 1 | 3 |

TABLE 19

| Departments Collection Set | | |
|---|---|---|
| Identity | Cardinality | Sequence |
| 1 | 0 | 1 |
| 2 | 2 | 2 |
| 3 | 0 | 3 |

TABLE 20

| Regions Collection Set | | |
|---|---|---|
| Identity | Cardinality | Sequence |
| 1 | 2 | 1 |

In this embodiment, after the bind process has completed, the collection instances can be retrieved for each collection set independently and in parallel to materialise the results required by the query. The collection instances for each collection set are returned in the order of the set sequence and each collection instance repeated according to its set cardinality. For a cardinality of N the collection instance appears exactly N times such that for a cardinality of 0 the collection instance is omitted entirely.

In this embodiment, any collection sets for collection paths that are not required in the final result, but appear only because of bind dependencies, can be discarded and need not be retrieved.

This example would yield the following results where only the 'Name' element path is required from the 'Employees' and 'Region' collection paths.

TABLE 21

| 'Employees.Name' | 'Regions.Name' |
|---|---|
| John Jones | North |
| Bob Brown | North (repeated) |

This example provides the required result for a single conjunctive term and the above process must be repeated for all conjunctive terms in the DNF expression.

In this embodiment, the results from each conjunctive term are generated independently and simultaneously and subsequently accumulated to provide the final and full result. There is a possibility that a result may be duplicated across conjunctive terms. Therefore, the results from each conjunctive term must be de-duplicated at accumulation time.

In one embodiment, this is done by generating a hash map of vectors of collection instance identities as conjunctive results are accumulated and any results that have a vector identity that corresponds with a previous result can be discarded.

In view of the above, it will be appreciated that this method of retrieval allows collection instances within each collection path and within each conjunctive term to be processed independently and in parallel allowing multiple hardware resources to be employed concurrently.

Bind Propagation

The following describes a method for binding collection sets within a conjunctive term wherein collection sets are combined prior to the query results being retrieved from storage; allowing the query results from each collection path to be retrieved independently.

As described above, the bind operator accepts two fully qualified element paths and is used within the context of a conjunction that forms part of the overall DNF expression. Each bind operator is coupled to exactly two collection sets within the same conjunctive term.

Within a bind operator, a 'correlated binding' occurs where a given element instance within a collection instance in the collection set on one side of the operator has at least one equivalent element instance in one or more collection instances in the collection set on the opposite side of the bind operator.

Consider bind('Employees.DepartmentNumber','Departments.DepartmentNumber') for the example collection sets above

TABLE 22

Employees Collection Set

| Identity | Cardinality | Sequence |
|---|---|---|
| 2 | 1 | 2 |
| 3 | 1 | 3 |

TABLE 23

Departments Collection Set

| Identity | Cardinality | Sequence |
|---|---|---|
| 1 | 1 | 1 |
| 2 | 1 | 2 |
| 3 | 1 | 3 |

TABLE 24

Employees Table

| Identity | Department Number |
|---|---|
| 1 | 100 |
| 2 | 200 |
| 3 | 200 |

TABLE 25

Departments Table

| Identity | Department Number |
|---|---|
| 1 | 100 |
| 2 | 200 |
| 3 | 300 |

It can be seen that collection identities 2 and 3 in the 'Employees' collection path have a 'DepartmentNumber' of 200 which have a correlated binding in the 'Departments' collection path at collection identity 2. However, in the 'Departments' collection path, collection identity 3 does not have a correlated binding.

Each correlated binding has a cardinality that reflects the number of matching element instances on each side of the binding. Thus for a given element instance on one side of a correlated bind there will be a number of equivalent element instances on the other side which defines the bind cardinality.

In the above example, the bind cardinality for collection identities 2 and 3 in the 'Employees' collection path have bind cardinality of 1; whereas in the 'Departments' collection path, collection identity 2 has a bind cardinality of 2 (in the opposite direction across the same correlated bind).

In this embodiment, the following method is used to implement the bind process within a single conjunctive term. The method assumes an arbitrary number of collection sets with an arbitrary number of bind operators coupling pairs of distinct collection sets in an arbitrary arrangement. A bind operator cannot bind a collection set to itself.

In this embodiment of the bind process, a visit ordinal attribute is included in the vector already described above for a member of a collection set. This visit ordinal is assigned a value of zero prior to binding.

Therefore a collection set with collection instances 11, 12, 13 would appear as follows prior to the binding process

TABLE 26

| Collection Identity | Visit Ordinal | Sequence | Cardinality |
|---|---|---|---|
| 11 | 0 | 0 | 1 |
| 12 | 0 | 0 | 1 |
| 13 | 0 | 0 | 1 |

Without any binding, this collection set would be used to fetch collection instances 11, 12, 13 in that order and without repetition.

In this embodiment, during the bind process, bind operators and collection sets are visited in a specific order and each bind operator is assigned a unique Visit Ordinal and each collection set is assigned a unique Visit Ordinal and a Propagation Count.

In this embodiment, the process of bind resolution follows three phases in order wherein a subsequence phase is only started once the previous phase has completed, as follows.

Phase 1

This phase is known as the Origin Selection Phase.

A single collection set (within the conjunctive term) is chosen to be the origin collection set. A set may be chosen arbitrarily, but advantageously, the chosen set can be the smallest set from amongst those that correspond to a collection path included in the query result.

The chosen origin set is assigned visit ordinal 0.

The members of the origin set have their sequence updated in a strict monotonically incrementing sequence, starting at 1 for the first member in the set. If the set above were chosen, it would become

TABLE 27

| Collection Identity | Visit Ordinal | Sequence | Cardinality |
|---|---|---|---|
| 11 | 0 | 1 | 1 |
| 12 | 0 | 2 | 1 |
| 13 | 0 | 3 | 1 |

Phase 2

This phase is known as the Member Propagation phase and involves propagating members across every bind operator.

During this phase, the order of bind operator visits is decided and recorded. Each bind operator is assigned a visit ordinal number which starts at 1 for the first bind operator chosen and increments for each subsequent bind operator chosen.

Each bind operator couples two collection sets and of those two, the collection set without a visit ordinal assigned or with the lowest visit ordinal of the two collection sets is assigned the visit ordinal of that bind operator.

The first bind operator, which is assigned visit ordinal 1, is chosen arbitrarily from one of the bind operators directly attached to the origin set. The collection set on the opposite side of the bind operator to the origin set is assigned the visit ordinal of 1.

In this embodiment, the collection set members are propagated from the originating set (with the lower visit ordinal) to the terminating set (with the higher visit ordinal) attached to the chosen bind operator as follows.

For each non-zero cardinality member in the originating set with a visit ordinal one less than the visit ordinal of the current propagating bind operator, a member is duplicated and appended within the terminating set for each terminating member that has a corresponding bind with the originating member.

For each member appended to the terminating set, the collection identity is assigned to be the same as the terminating member it is copied from; the visit ordinal is assigned the visit ordinal of the propagating bind operator; the sequence is assigned from the originating member; and the cardinality is assigned as 1.

In this embodiment, any member in the originating set which has no corresponding binds in the terminating set has its cardinality assigned to zero. Thereafter, the originating member is considered void and is not propagated any further.

In this embodiment, members are propagated from the originating set in membership order. Other embodiments may choose an alternative order.

The sum of the cardinalities across all of the propagated entries with the current visit ordinal is assigned to the terminating set as its propagation count. If the propagation count for a terminating set is reduced from a previous assignment, then any other bind operators attached to the terminating set with assigned visit ordinals and attached to another collection set with the same visit ordinal as that bind operator has its operator visit ordinal de-assigned.

Thereafter, the next bind operator is chosen from all bind operators without a visit ordinal assigned but directly attached to a set which does have a visit ordinal assigned; and from those, a bind operator which is connected to the collection set with the highest visit ordinal assigned is chosen; if one or more of the bind operators that can be chosen are also attached at the other end to sets with visit ordinals already assigned then the operator attached to the set with the lowest visit ordinal is chosen.

The chosen bind operator and the terminating set on the other side of the operator are assigned the next visit ordinal. If the set on the other side has a visit ordinal already assigned, it is overwritten with the new visit ordinal.

This is repeated until a bind operator without a visit ordinal but attached to a set with a visit ordinal assigned can no longer be found. If at the end of this phase, a set exists without a visit ordinal, the query is considered to be malformed and the query as a whole is aborted.

Consider the following two collection sets wherein the first set is the origin set. In this example, there is assumed to be a bind operator between them with a visit ordinal of 1 and for clarity it is assumed that only members with the corresponding suffix letter in their terminating identities have corresponding binds across the bind operator.

Collection Path 1 (Before Member Propagation)

TABLE 28

| Collection Identity | Visit Ordinal | Sequence | Cardinality |
|---|---|---|---|
| 11B | 0 | 1 | 1 |
| 12A | 0 | 2 | 1 |
| 13C | 0 | 3 | 1 |

Collection Path 2 (Before Member Propagation)

TABLE 29

| Collection Identity | Visit Ordinal | Sequence | Cardinality |
|---|---|---|---|
| 21C | 0 | 0 | 1 |
| 22B | 0 | 0 | 1 |
| 23B | 0 | 0 | 1 |

Propagating member 11B results in the following terminating collection set.

Collection Path 2 (after Propagating Member 11B Via Operator 1)

TABLE 30

| Collection Identity | Visit Ordinal | Sequence | Cardinality |
|---|---|---|---|
| 21C | 0 | 0 | 1 |
| 22B | 0 | 0 | 1 |
| 23B | 0 | 0 | 1 |
| 22B | 1 | 1 | 1 |
| 23B | 1 | 1 | 1 |

Member 12A has no corresponding bind and therefore no member is created in the terminating set, but the cardinality of this entry is set to zero in the originating set. This yields the following for the originating set.

Collection Path 1 (after Propagating Member 12a)

TABLE 31

| Collection Identity | Visit Ordinal | Sequence | Cardinality |
|---|---|---|---|
| 11B | 0 | 1 | 1 |
| 12A | 0 | 2 | 0 |
| 13C | 0 | 3 | 1 |

Propagating member 13C results in the following terminating set,

Collection Path 2 (after Propagating all Members Via Operator 1)

TABLE 32

| Collection Identity | Visit Ordinal | Sequence | Cardinality |
|---|---|---|---|
| 21C | 0 | 0 | 1 |
| 22B | 0 | 0 | 1 |
| 23B | 0 | 0 | 1 |
| 22B | 1 | 1 | 1 |
| 23B | 1 | 1 | 1 |
| 21C | 1 | 3 | 1 |

Note that the terminating set above may then be propagated by another bind operator into another set, but only the members with visit ordinal 1 would be propagated.

Phase 3

This phase is known as the Cardinality Reflection Phase wherein each bind operator is visited in strict reverse visit ordinal order. The bind operator visited is known as the reflecting operator.

At each reflecting operator, the cardinality of each member in the originating set with a visit ordinal one less that the reflecting operator is multiplied by the sum of the cardinalities for all terminating members with the same sequence as the originating member and the same visit ordinal as the reflecting operator.

In the above example, the cardinalities of the originating set would be updated as follows Collection Path 1 (after Cardinality Reflection)

TABLE 33

| Collection Identity | Visit Ordinal | Sequence | Cardinality |
|---|---|---|---|
| 11B | 0 | 1 | 2 |
| 12A | 0 | 2 | 0 |
| 13C | 0 | 3 | 1 |

Collection Path 2 (after cardinality reflection)

TABLE 34

| Collection Identity | Visit Ordinal | Sequence | Cardinality |
|---|---|---|---|
| 21C | 0 | 0 | 1 |
| 22B | 0 | 0 | 1 |
| 23B | 0 | 0 | 1 |
| 22B | 1 | 1 | 1 |
| 23B | 1 | 1 | 1 |
| 21C | 1 | 3 | 1 |

The following provides an example of the how four collection sets may be visited and have their visit ordinals assigned during the second phase of the bind process. The rectangles represent collection sets and the lines represent bind operators between them.

Figure 9:
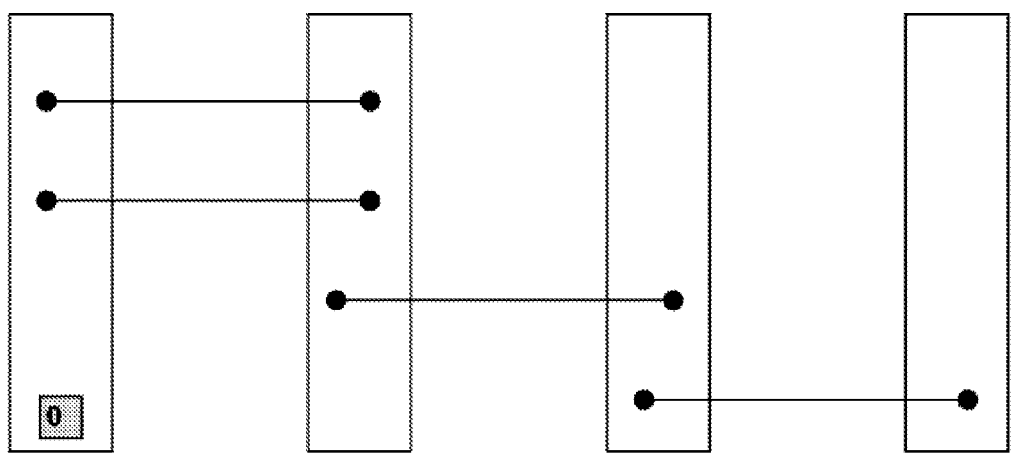
FIGS. 9-14 provide an example of the how collection sets can be visited and have their visit ordinals assigned during the second phase of the bind process in a system according to one practice of the invention.

FIG. 9: The origin set is chosen and assigned visit ordinal 0.

Figure 10:
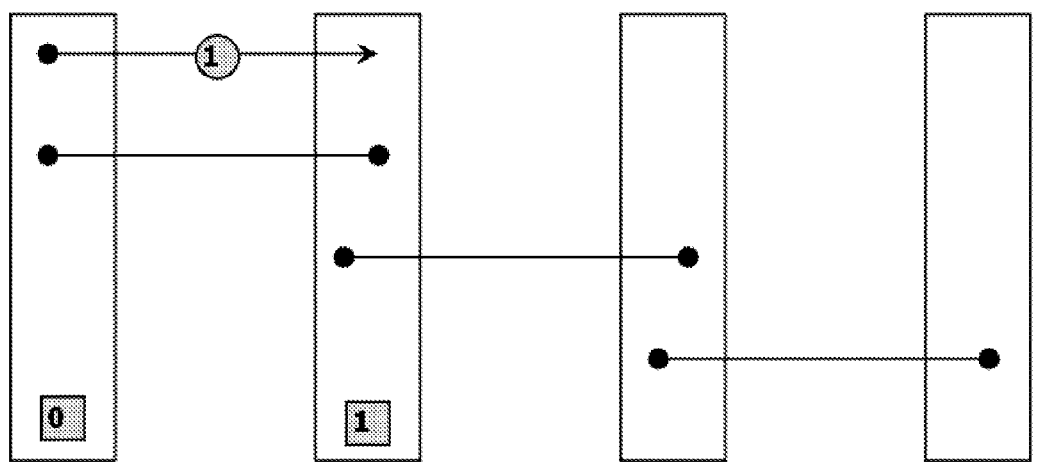

FIG. 10: The first bind operator is chosen from those attached to the origin set and the chosen bind operator is assigned visit ordinal 1. The terminating set on the other side of the chosen bind operator is assigned the same visit ordinal as that of the bind operator.

Figure 11:
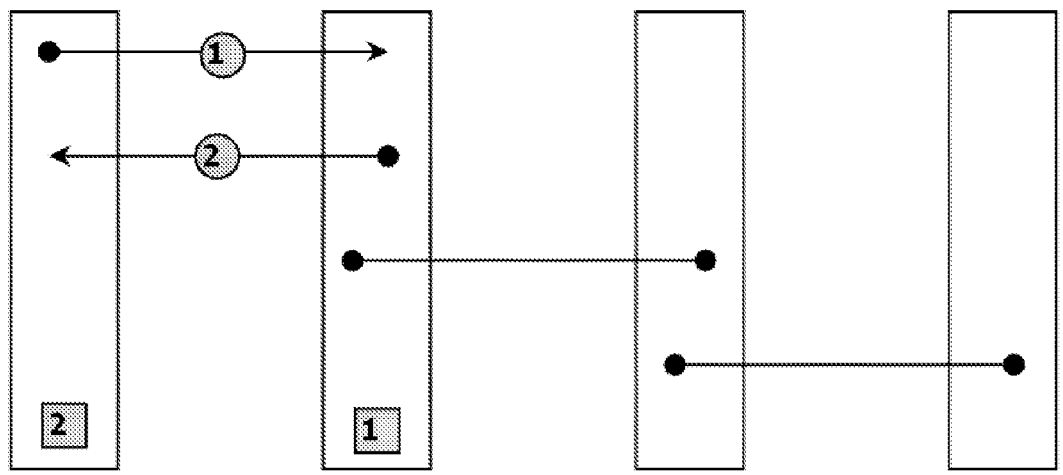

FIG. 11: The second bind operator is chosen from those without a visit ordinal assigned and attached to the collection set with the highest visit ordinal.

Figure 12:
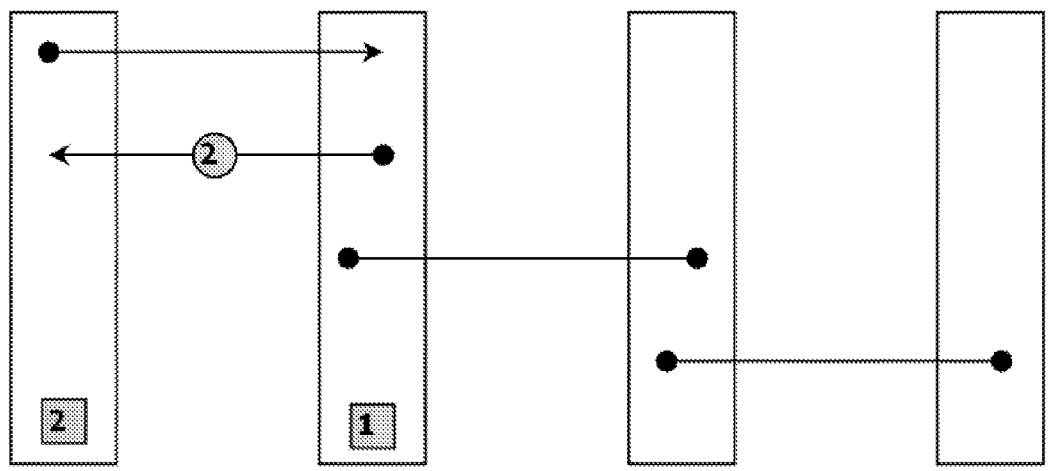

FIG. 12: If the propagation count of the terminating set for operator 2 is reduced, then any other operators attached to that collection set and with a with an operator visit ordinal the same as the collection set visit ordinal at the other end has its operator visit ordinal de-assigned.

Figure 13:
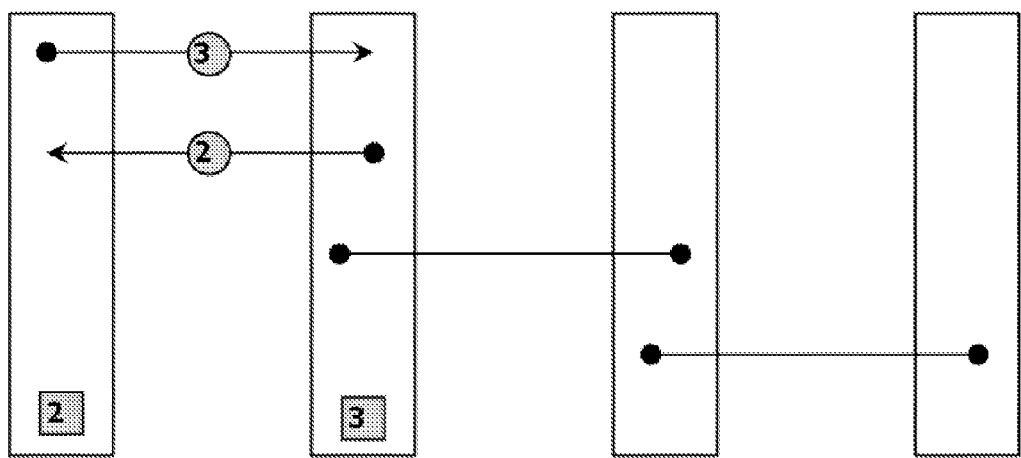

FIG. 13: The next bind operator is chosen from those without a visit ordinal assigned and attached to the collection set with the highest visit ordinal.

Figure 14:
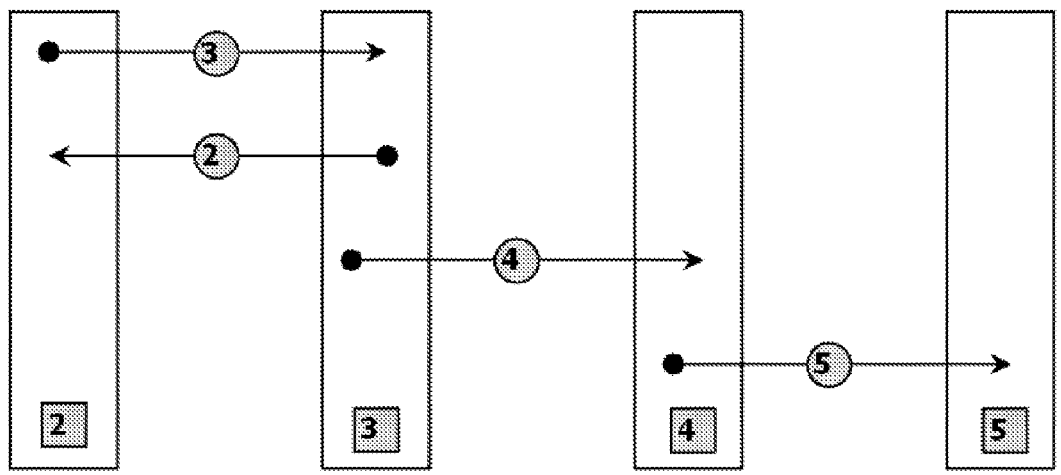

FIG. 14: If the propagation count of set 3 is not reduced by operator 3 then the subsequent operators will be assigned as shown.

No more operators without an assigned visit ordinal can be found and this phase of the bind process completes. All sets have an assigned ordinal and therefore the bind is considered well formed and can proceed to the next phase.

In this embodiment, once all three bind phases have completed, collection instances for each collection set can be retrieved independently for query materialisation and their independent results merged. Collection instances are retrieved only for members with the same visit ordinal as the visit ordinal assigned to the collection set itself as follows.

Each member in the collection set with a cardinality of zero is ignored; each entry with a cardinality of 1 is retrieved once; each entry with cardinality greater than 1 is retrieved once but duplicated to respect the cardinality of the bind.

In one embodiment, each set member is retrieved in sequence order and entries with identical sequence numbers are fetched in collection identity order.

In an alternative embodiment, members are retrieved in collection instance identifier order first (rather than sequence order) and results sorted in memory in sequence order just prior to merging.

In an alternative embodiment, consecutive collection instances or nearly consecutive collection instances within a common storage area may be may be retrieved from storage in a single storage read request.

It will be appreciated that the temporary structures manipulated by the bind process can reside within physical memory to assist rapid resolution of a conjunctive term.

It will be appreciated that the bind process can operate and complete within physical memory prior to materialising any results required by the query.

It will be appreciated that after a conjunctive term has been fully resolved the storage engine can retrieve each collection set independently and in parallel to yield the results required by the query.

Results for collection paths marked for an outer join are resolved by retrieving any collection instances from that collection set that have a zero cardinality and including them in the final result.

Cross joins are resolved by forcing every member in an originating collection set to correlate with every member in a terminating collection set across a bind operator marked for a cross join.

In one useful embodiment, the collection set of a true( ) operator is lazily evaluated by the first bind( ) operator which attempts to bind it wherein the collection set of the true( ) operator is created from the corresponding binds of the originating collection set. In this embodiment, the collection set of a true( ) operator is never chosen as the origin set. It will be appreciated that in this embodiment with lazy evaluation, the size of the collection set of a true( ) operator is likely to be much reduced compared to an eager evaluation.

Storage Structure

The following describes the storage structure which is used to efficiently persist and retrieve data in support of the access model described above.

The storage is structured as a multitude of linear tunnels wherein each tunnel is aligned with storage address space and contains information about collection instances which is relevant to one collection path and/or one element path, one operator and a subset of operands.

A single element path tunnel provides partial information about every element instance for a large population of element instances within an element path. A collection path tunnel provides complete information about a single collection instance within a collection path.

The structure of a tunnel varies according to the access model operator and the operations it is required to support. Each tunnel contains the minimum information required to support its corresponding operator such that every tunnel is optimally aligned with the storage address dimension and each operator can traverse its relevant tunnels in an efficient manner.

The minimal information contained within a cell may only be sufficient for the related access model operator to indicate either the likely possibility or the impossibility of an entity instance being relevant to given operands.

A different tunnel family is provided for each operator within the access model. Connective tunnels provide information to support the access model IS operator; characteristic tunnels provide information to support the access model HAS operator; combinative tunnels provide information to support the access model IN operator; each of these families provides a tunnel to support the EXISTS operator; while collective tunnels provide information to support efficient collection retrieval.

Figure 15:
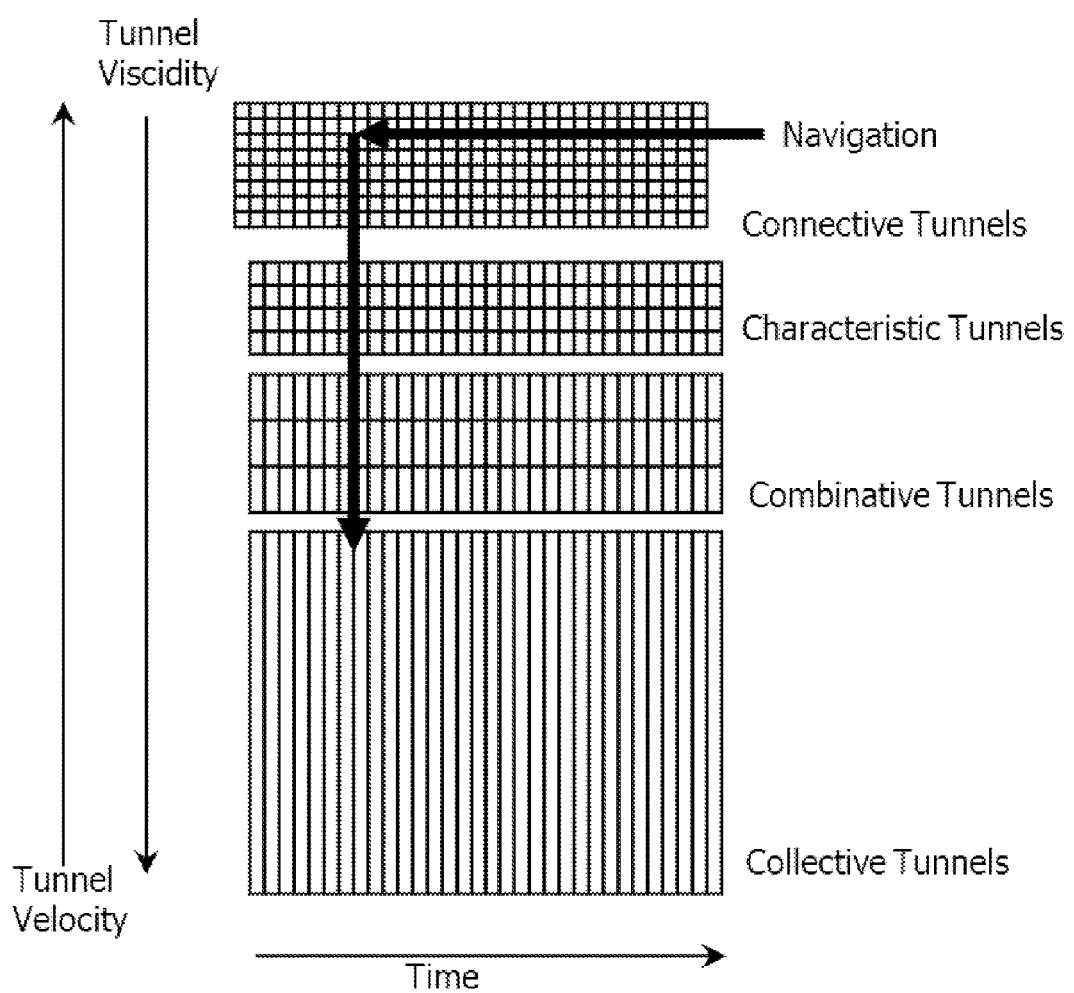
FIG. 15 illustrates that tunnels and cells can be arranged such that cells between tunnels correspond so that traversal can move between tunnels as required in a system according to one practice of the invention.

Each tunnel is arranged as a linear sequence of cells whereby new tunnels and new cells are appended in chronological order while tunnels are traversed in reverse chronological order. Tunnels and cells are arranged whereby cells between tunnels correspond so that traversal can move between tunnels as required. This is illustrated in FIG. 15.

Each tunnel family is considered to have both viscidity and velocity characteristics. The viscidity indicates how much information is held locally about a collection instance within a tunnel. The velocity of a tunnel indicates the size of the collection instance population held locally within a tunnel. These characteristics are inverse of each other, such that a highly viscid tunnel that contains much information locally about specific collection instances also contains little information about the population as a whole.

Tunnels that relate to access model predicate and bind operators exhibit high velocity and low viscidity. Tunnels used for collection instance retrieval exhibit high viscidity and low velocity.

Collective Tunnels group element instances into collection instances. Every collection path contains a separate tunnel for every collection instance and an entire collection instance can be retrieved by traversing its collection tunnel allowing a collection instance to be rapidly retrieved. These tunnels are considered to have a very low velocity across collection instances because of their high element instance viscidity within each collection instance.

Connective Tunnels group identification element instances by their equivalence similarity. These tunnels support the IS and BIND access model operators; allowing the IS operator to generate a collection set for collection instances that contain an identification element instance which is equivalent to the operator operand; while allowing the BIND operator to efficiently resolve correlated binds between collection sets created by other access model operators. There are multiple connective tunnels for each identification element path. These tunnels are considered to have very high velocity across collection instances.

Characteristic Tunnels group enumeration element instances by the properties they contain. These tunnels support the HAS access model operator allowing it to generate a collection set for collection instances that have an enumeration element instance which contains one or more properties which are equivalent to the operator operands. There are multiple characteristic tunnels for each identification element path. These tunnels are considered to have a high velocity across collection instances.

Combinative Tunnels group the partial magnitude of measurement element instances relative to the radix point. These tunnels support the IN access model operator allowing it to generate a collection set for collection instances that have a measurement element instance which is bounded by the operator operands. These tunnels also support aggregate operations allowing measurement element instances to be accumulated and classified without the need to refer back to the full collection instance. There are multiple combinative tunnels for each identification element path. These tunnels are considered to have moderate velocity across collection instances.

Every element path has a corresponding existence tunnel to support the EXISTS access model operator. There is one existence tunnel for each element path. These tunnels are considered to have a high velocity across collection instances.

Therefore, in this embodiment, there is a comprehensive tunnel family maintained for every element path with a predicate operator.

The predicate operator used in a query determines the tunnel family to be traversed while its operands determine the collection path, element path and tunnel number(s).

In view of the above, it will be appreciated that any predicate operator can efficiently traverse the population of collection instances without the need for separate index structures and without the need for a multitude of optimisation strategies to cater for index structures that might or might not exist.

It will be appreciated that the homogenous cell structure of tunnels are apt for processing by CPUs that provide vector instructions that operate on multiple items of data simultaneously.

When an operator is evaluated it creates a memory based collection set wherein each member of the set provides information about each collection instance included in the evaluation. As previously mentioned, an operator may only be able to provide an indication of likely possibility or impossibility of relevance of a collection instance to the operator operands; but an operator may also have complete certainty of relevance. Therefore, each collection set member contains an indicator of certainty such that later query materialisation can determine the need for additional materialisation for the purposes of element inspection and verification.

Usefully, the process of binding collection sets whereby collection sets are combined and correlated will serve to increase certainty by discarding uncertain collection set members.

Time is sub-divided into absolute time frames whereby every frame covers a fixed and predefined time interval relative to a predefined epoch date such that any given time is assigned a frame number derived from the number of time frame intervals that have occurred since the epoch date such that the epoch date occurs at the start of time frame 0.

The epoch date and frame duration are chosen so that frame numbers are positive and their magnitude can be contained within reasonable precision.

In one useful embodiment, the epoch date is chosen to be the start of the current century and a frame duration is chosen to be 1 hour.

All tunnels are sub-divided into absolute time frames such that any given time frame corresponds across all tunnels. The alignment of frames across tunnels allows retrieval operations to switch between tunnel families at frame boundaries and choose the optimal tunnel family for the direction of navigation required. For example, a search for a specific collection instance may use a connective tunnel initially and switch to the collective family in a corresponding frame when a likely element instance cell has been found.

Figure 16:
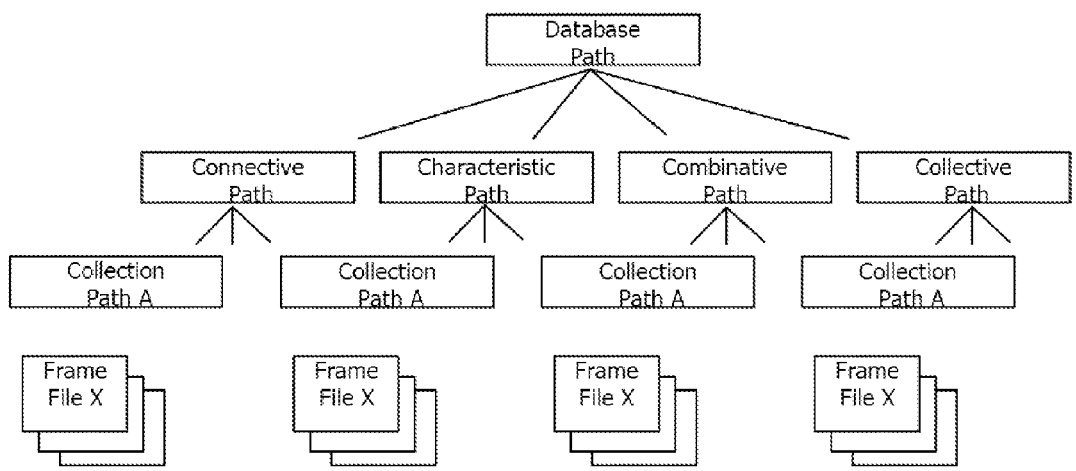
FIG. 16 illustrates that a file sequence can be located in a directory path which is determined from a tunnel family and a collection path identity, and that a file can contain the frame number within its name in a system according to one practice of the invention.

In this embodiment, tunnels are stored as contiguous cell sequences within one or more files; whereby each tunnel family (collective, connective, characteristic, combinative) has multiple sequences of files; whereby there is one file sequence for each collection path; and where each file sequence has a separate file for each time frame. Each file sequence is located in a directory path which is determined from the tunnel family and collection path identity; and each file contains the frame number within its name. This arrangement is illustrated in FIG. 16.

Where multiple distinct databases exists, the directory structure for each database will reside under a separate database path.

In an alternative embodiment, the tunnel family (connective, characteristic, combinative, collective) are placed at the top of the hierarchy with each database path immediately below them. This allows tunnel families to be easily located on different storage systems with performance characteristics most appropriate for each tunnel family.

Therefore, in this embodiment each file contains a separate contiguous sequence of cells for a tunnel within a frame and each tunnel relates to a specific collection path, element path, operator and its operands allowing an access model operator to read the relevant tunnel(s) from storage with minimal read requests and navigate the tunnel with minimal cache pollution.

Therefore, in this embodiment, populations of collection instances with similar creation times are localised within common frame files.

In view of the above, it will be appreciated that large populations of collection instances of similar age can be deleted by removing the frame files in which they reside.

In an alternative embodiment, frames boundaries are determined by a defined threshold for the number of collection instances for which they are respective, whereby a frame is closed once the threshold is reached within each collection path.

In view of the above, it will be appreciated that the size of an individual collection path population can be precisely managed by removing one or more of the oldest frame files.

Operational (OLTP) queries are selective in nature and will predominantly use the IS and BIND access model operators and therefore navigation for an operational query is likely to be along one or more connective (very high velocity) tunnels to rapidly identify the collection instances relevant followed by navigation along one or more collective tunnels (low velocity) to retrieve the specific collection instance data. The majority of the bind resolution work will occur within physical memory and will yield a small number of specific collection instance addresses allowing the query result to be returned quickly through a small number of random storage read operations.

Analytical (OLAP) queries are broad ranging and unlikely to use collective tunnels at all and will be entirely contained within connective (very high velocity), characteristic (high velocity) and combinative tunnels (moderate velocity) allowing OLAP queries to traverse populations of collection instances rapidly. The majority of any aggregation work can be performed directly on rank tunnels which can be read into memory through a small number of large sequential storage read operations.

Advantageously, the separation of file sequences by collection path and tunnel family allows different tunnel families to be located on different file storage areas with different performance characteristics. Collective tunnels are predominantly used for operational access and contain short collective tunnels. These files can be located on storage media most suitable for smaller random read requests; while other tunnel families can be located on storage media most suitable for larger sequential read requests.

In view of the above, it will be appreciated that both selective and collective queries can be efficiently supported for both operational and analytical workloads.

In this embodiment, tunnels are appended to in forward chronological order and use collection append and collection inversion semantics to create, delete and update collection instances. The deletion of a collection involves appending a collection inversion to all the tunnels relevant to the original collection instance such that all operations concerning the original collection instance are aware of any subsequent inversion.

Therefore, in this embodiment, there are no update-in-place operations and all updates to a tunnel family within a collection path are localised.

In view of the above, it will be appreciated that all updates to any given tunnel or any given tunnel family within a collection path can be efficiently applied using a single or minimal number of storage write requests.

In view of the above, it will be appreciated that all updates to any given tunnel or any given tunnel family can exploit the high transfer rates exhibited by contemporary storage systems.

In view of the above, it will be appreciated that a complete life-cycle history is maintained for every collection instance.

In view of the above, it will be appreciated that the data necessary to resolve queries arising from compliance and auditing investigations is retained.

In view of the above, it will be appreciated that predicate operators can include an optional temporal operand such that predicate operators can start their queries from a historic time frame usefully providing historic point-in-time queries.

A collection instance can only be inverted after it has first been created. In this embodiment, tunnels are traversed in reverse chronological order to allow collection inversions to be detected prior to their corresponding earlier collection append operations so that the existence of a collection instance can be efficiently determined and inverted collection instances can be efficaciously discarded.

In view of the above, it will be appreciated that a predicate operator will not encounter cells that have been created since the operator navigation began and advantageously does not need to account for them.

In one alternative embodiment, all frames in each tunnel family prior to a specified frame in a specified collection path may optionally be consolidated whereby the contents of each prior frame file is scanned and copied into a new version of the frame file but where all discovered inverting collection instances and their corresponding inverted collection instances are discarded. A consolidated frame file will not contain a full collection instance history but will be more compact than the frame file it replaces.

Each element path contains a frame map with every frame that imparts partial information about all element instances within a single or multiple of frames that precede the current frame. Each frame map allows an access model operator to determine which preceding frames are relevant to its operands and allows the operator to exclude frames that contain no relevant information.

In this embodiment, the frame map for an element path of identification intent contains information about which bits within an identity byte sequence contain common values for all element instances within the frame interval.

Therefore, in this embodiment, where element instances within an identification element path exhibit a consistently monotonically increasing or decreasing sequence in one part or multiple parts of the identification byte sequence such that some parts of all element instances are common across a frame interval; then one or more frame intervals can be usefully eliminated where the common aspects of all element instances within those frame intervals do not conform to the identifier sought.

In this embodiment, the frame map for an element path of measurement intent contains information about the minima and maxima for all element instances within the frame interval.

Therefore, in this embodiment, where measurement element instances within an element path exhibit a consistently monotonically increasing or decreasing value; then one or more frame intervals can be usefully eliminated where the minima and maxima for those frame intervals do not enclose the measurement sought.

In this embodiment, the frame map for an element path of enumeration intent contains information about which properties exist in at least one element instance within the frame interval.

Therefore, in this embodiment, where enumeration element instances within an element path exhibit a sparse distribution of properties; then one or more frame intervals can be usefully eliminated where an enumeration sought contains properties that do not exist within those frame intervals.

In view of the above, it will be appreciated that an access model operator is able to efficiently navigate tunnels by avoiding frames that do not contain data relevant to the operator and its operands.

In view of the above, it will be appreciated that access model operators are able to efficiently traverse the tunnels for both selective and collective query access without any need for any additional navigation structures, such as indexes, to support specific query requirements and therefore removing the design, administration and maintenance effort and resource investment typically required for such structures.

In view of the above, it will be appreciated that the access model operators are able to navigate tunnels such that neither the separate gathering of statistics for cost-based query optimisation nor multiple optimisation strategies are required.

Tunnel and map structures within historic frames (that occur prior to the current time frame) are stored in contiguous storage arrangements so that complete structures can be read with a single storage read request.

Advantageously, non collective tunnels from multiple frames can be accumulated from prior frames and written contiguously to subsequent files for new frames to minimise the number of frame files that must be consulted when traversing a given tunnel. This minimises the number of storage read requests required to traverse a given tunnel and better exploits the transfer rates possible from storage systems.

In this embodiment, for a predefined interval V, for frame number N, where N is an exact multiple of V, each tunnel in frame N is accumulated by reading the tunnel from frames N−1 . . . N−V and then appending the tunnel content for frame N and storing the accumulation in frame N. This continues in subsequent frames until insufficient memory is available to accumulate tunnels efficiently; whereupon tunnels in frame N only contain content for frame N.

Therefore an access operator navigating a frame is able to navigate multiple prior frames and the avoid the need to visit the frame files that have been accumulated in the current frame file and is able to read a tunnel spanning multiple frames in a single large read request.

In view of the above, it will be appreciated that the access model operators can navigate tunnels efficiently by exploiting the high transfer rates common to contemporary hardware environments and navigate tunnels with minimal cache pollution.

In one useful embodiment, the value of V above is 1 such that every frame accumulates as much content as possible from immediately prior frames. In this embodiment, the efficiency of operator navigation is optimised.

In another useful embodiment, the value of V above is infinity such that no frame accumulates any content other than its own frame. In this embodiment, the efficiency of updates is optimised and the utilisation of storage is maximised.

In view of the above, it will be appreciated that the value of V above can be set to optimise specific performance aspects. It will also be appreciated that the value of V can be dynamically altered to optimise specific performance aspects in response to particular performance demands at any point in time.

Advantageously, each file sequence can be truncated such that the oldest frame files are removed as and when desired. This can be performed for each collection path separately allowing the database to precisely manage the life-cycle of data retained for each collection path individually.

In view of the above, it will be appreciated that data life-cycles can be managed precisely by collection path and time frame granularity.

In one embodiment, it is possible to securely encrypt collective tunnels individually so that the whole information relating to any single collection instance is not available in a single file location. Advantageously, each collective tunnel can be encrypted and decrypted individually allowing the best possible performance when a single collective tunnel is addressed. Advantageously, the encryption key for a collective tunnel can be based on a private seed, collection path, frame number and the tunnel number to ensure each collection instance has a unique encryption key. Methods for two way encryption/decryption are extensively covered elsewhere and are not considered further here.

In an alternative embodiment, it is possible to securely encrypt and decrypt collective cells within a collective data tunnel separately and individually.

In view of the above, it will be appreciated that collection instance data can be efficiently encrypted and decrypted individually to prevent unauthorised access to whole collection data without the need to encrypt and decrypt whole files.

In this embodiment, active transactions are accumulated in a heap file for the current time frame. There will be one heap file relating to the current time frame and zero or more heap files relating to recently closed time frames. The name of each heap file contains the number of the time frame in which it was created.

The heap file is structured as a heap of fixed sized segments whereby each segment relates to a specific transaction, specific collective tunnel within a specific collection path. Once closed, the content of a heap file is migrated to multiple frame files corresponding to the same time frame. Each frame file is composed in memory by coalescing segments that correspond to the same collection path, element path and tunnel number.

In this embodiment, the current time frame is arranged as a single heap of interleaved segments of collective tunnel information for currently and recently active transactions allowing active transactions to remain isolated from each other. The entire heap can be written in a single large storage write request containing all segments thus allowing multiple transactions to persist their state within a single sequential storage write request; enabling large numbers of transactions to operate concurrently.

In view of the above, it will be appreciated that a large number of transactions can remain isolated and operate concurrently and be persisted in storage with minimal storage write requests.

In view of the above, it will be appreciated that the separation of heap files and frame files allows heap files to be located on storage media with minimum write latency such that transactions are able to persist their state in the shortest possible time.

Each heap file corresponds to a single time frame and new heaps are opened as and when time moves across absolute time frame boundaries. When this occurs, the previous heap is deemed closed and can no longer be appended to.

When a transaction is closed all of the segments relating to the transaction are considered to exist within the time frame that corresponds to the transaction closure, regardless of when the segments were created or when the transaction was first opened.

In one embodiment, a heap file is closed once its time frame has expired and segments in the closed heap file which pertain to closed transactions are immediately migrated to corresponding frame files.

In another embodiment, a heap file is closed once its time frame has expired and heap files are retained until sufficient transactions segments have been accumulated; whereupon the segments in all closed heap files which pertain to closed transactions are migrated to corresponding frame files.

Transaction segments within a heap file are created and assigned to a transaction that has been opened. Within an open transaction any number of collection instances across any number of collection paths may be arbitrarily created or inverted. Thereafter the transaction may be abandoned or applied.

When a transaction is abandoned, all of the transaction segments created within the context of the transaction are logically discarded by marking their assigned transaction as abandoned. When a transaction is applied, the transaction is marked as such and all transaction segments within the current heap file are persisted to storage, regardless of their transaction status.

Only transaction segments that relate to applied transactions are migrated to frame files. Therefore all frame files contain only applied transaction cells and can be considered available to all query operators.

In view of the above, it will be appreciated that operators navigating the frame files do not to be involved in transaction isolation or read-consistency synchronisation activities as the transactional context of all frame files is static and transaction isolation need only be accounted for during heap file navigation.

In this embodiment, all collection paths; element paths within collection paths; and tunnels within paths and frames are uniquely identified by ordinal numbers which are never re-used and are assigned sequentially to avoid missing ordinals. These ordinals are used throughout to address paths and tunnels to allow access structures to be both dense and contiguous.

In this embodiment, ordinal numbers for collection and element paths are used within directory and file names rather than their corresponding path names to allow for path names to be arbitrarily changed within meta data and without undue impact on the storage system.

The storage structure is required to persist definitions of ordinals, collection paths, element paths and element intent. In this embodiment, these definitions are maintained in memory and the complete set of path definitions is also persisted on storage within a new and separate meta-data file as and when a definition is changed. Each meta-data file name includes a strictly monotonically increasing version number and the time frame number at the time of the update. These identifiers also appear within the content of the file.

A data definition command cannot complete until the new meta-data file has been successfully written and synchronised to storage.

Advantageously, in this embodiment, a process failure is recovered by finding the meta-data file with the highest version number in its name and a consistent version number within it.

In view of the above, it will be appreciated that meta-data files may be deleted where they correspond to frames that precede the oldest frames retained in all collection paths.

In view of the above, it will be appreciated that if the content of the database need to be reverted back to a previous time frame, then all frame, heap and meta-data files that contain subsequent frame numbers can simply be deleted.

In view of the above, it will be appreciated that collection paths and element paths may be dynamically and arbitrarily introduced at any point in time and that their corresponding definitions are retained indefinitely.

Frame File Structure

Each closed frame is arranged as hierarchy of storage sectors where each sector relates to a particular entity path (collection or element) and is composed of multiple sub-sectors and where each sub-sector relates to a specific tunnel.

Figure 17:
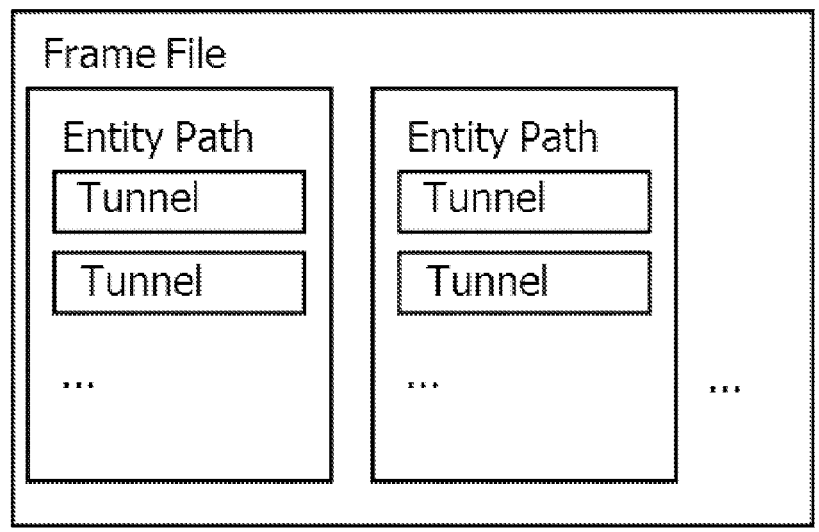
FIG. 17 illustrates that a closed frame can be arranged as a hierarchy of storage sectors where a sector relates to a particular entity path (collection or element) and can be composed of multiple sub-sectors and where a sub-sector relates to a specific tunnel in a system according to one practice of the invention.

The hierarchy is arranged as shown in FIG. 17.

Every sector is stored contiguously and each higher level sector contains a sector map to the enclosed sub-sectors at the next level down in the hierarchy. The sector map for sub-sectors is located at the start of the super-sector.

Figure 18:
FIG. 18 illustrates that sector maps can arranged as a one dimension array of fixed sized entries that contain the starting address of the sub-sector for a sub-sector ordinal in a system according to one practice of the invention.

These sector maps are arranged a one dimension array of fixed sized entries that contain the starting address of the sub-sector for each sub-sector ordinal—as shown in FIG. 18.

The address of sub-sector N is found by looking at the offset N. The size of sub-sector N can be determined from the subsequent entry as sectors are stored contiguously.

To reach tunnel T in element path E requires navigation via the element path sector map and the tunnel sector map.

Figure 19:
FIG. 19 illustrates that a tunnel can be arranged with a fixed sized frame number and a fixed sized tunnel address which identify the frame and the address within the frame file respectively in a system according to one practice of the invention.

Each tunnel contains a tunnel link at its start to link the tunnel to its corresponding tunnel in the preceding frame. The tunnel link allows navigation along a tunnel across frames without the need to visit sector maps in each frame. Therefore, each tunnel is arranged as shown in FIG. 19 with a fixed sized frame number and fixed sized tunnel address which identify the frame and the address within the frame file respectively where the tunnel continues.

Heap File Structure

Transaction segments are accumulated within a heap file. The heap file has a watermark which is extended when more space is required. The contents of the heap file are synchronised back to storage (up to the watermark) whenever one or more transactions are applied.

The heap space up to the watermark is arranged as discrete fixed length collective tunnel segments where segments are interlinked to create segment chains within a transaction. The heap watermark is extended by adding one or more segments.

Each transaction segment belongs to one transaction. As the transaction adds collective tunnel cells it adds one or more segments to the chain.

Figure 20:
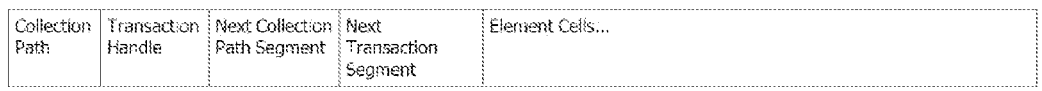
FIG. 20 illustrates that a segment can contain a header that identifies a collection path and transaction it belongs to and a segment can contain a pointer to the next transaction segment in the chain and a pointer to the next segment in the same collection path in a system according to one practice of the invention.

Each segment contains a header that identifies the collection path and transaction it belongs to. It also contains a pointer to the next transaction segment in the chain and a pointer to the next segment in the same collection path as shown in FIG. 20.

Figure 21:
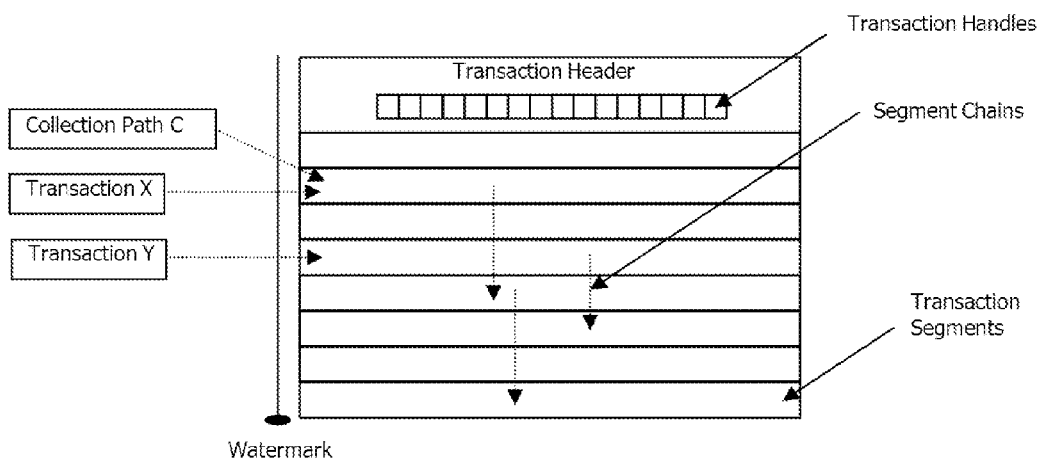
FIG. 21 illustrates that transaction information pertaining to transaction segments can be stored within a header of a heap file in a system according to one practice of the invention.

The transaction information pertaining to the transaction segments is stored within the header of the heap file. FIG. 21 illustrates the structure of a single heap file.

The head of every collection path chain and transaction chain is maintained in memory. Therefore, it is possible to find all segments relating to a specific transaction or all segments relating to a specific collection path.

Both the chain headers and segment pointers contain a frame number and a segment number wherein the frame identifies the frame number of the heap file in which the segment belongs and the segment number identifies the ordinal position of the segment within the heap file. In this embodiment, chains of transaction segments are able to extend across heap files to allow segments that belong to a single collection path or transaction to be located by following a single chain.

In view of the above, it will be appreciated that the structure of the heap file allows predicate operators to swiftly navigate the heap storage in search of information relevant to it.

In view of the above, it will be appreciated that the segments contain sufficient information to be able to reconstruct the in-memory chain headers should the database need to recover from a process failure.

Segments relating to applied transactions are migrated to frame files after a heap file has been closed. A heap file must be retained until all applied transaction segments within it have been migrated; thereafter it may be deleted.

When an operator scans both heap files and frame files, it ignores any frame files with a number corresponding to a previously scanned heap file.

In view of the above, it will be appreciated that frame files can be created and safely synchronised to storage before a heap file is removed to ensure that every collection instance safely exists in one or other or both heap file and frame file at any given time.

Long running transactions may contain transaction segments in multiple heap files. When the transaction is finally closed, heap files between the open and closure frame must be visited to migrate the transaction segments into a frame file.

Transaction Management

There is an upper limit to the number of concurrently open transactions and there is a fixed set of unique transaction handles which get re-cycled. A transaction handle remains active until the transaction has been closed (abandoned or applied) and the heap file has been closed. The heap file is closed when the current frame expires or when transaction handles need to be reclaimed.

A pool of transaction handles is maintained in memory to allow rapid transaction inspection and allocation of free handles.

A useful upper limit for transaction handles is 65535.

Any open transactions when the database system is stopped—for whatever reason—are considered to be abandoned. When the database system is started or restarted a new heap file is created and all transaction handles are reclaimed and made available for reuse. An open transaction cannot last beyond a storage engine shut down.

Each predicate operator navigates segments within the context of an open transaction and operators scanning segments need to be aware of foreign transaction state and skip or include the content of segments that correspond to foreign transactions depending on the precise transaction semantics being obeyed.

Prior to inverting one or more collection instances, a transaction must identify which collection instances may be inverted and acquire an exclusive inversion lock on each one. A transaction that is not granted an inversion lock immediately must wait for the lock to be acquired and if the lock has not been granted within a defined time period, the transaction must release all of the inversion locks it has acquired to resolve potential deadlocks. Thereafter, the transaction must either be abandoned or repeat the attempt to identify and lock the collection instances that may be inverted.

In large concurrent user environments where many transactions are active and short lived resulting in frequent transaction applications, it is useful to provide a cycle whereby transactions apply at predefined intervals. Any transaction wishing to apply waits for the next available apply cycle and cannot continue until the apply cycle has completed. While this may delay an individual transaction, it does not degrade throughput as very many transactions can complete at the same time.

A useful interval for an apply cycle is 10 ms. This reasonably limits the number write requests to storage and provides a negligible delay to transactions waiting to apply.

An apply cycle is skipped if no transactions are waiting to apply.

In one embodiment, the duration of the apply cycle is decided by the number of currently active transactions, such that this duration is zero if there exists only one active transaction and this duration increases with the number of open transactions up to a defined maximum time.

In view of the above, it will be appreciated that multiple transactions can be applied and synchronised to storage using a single or minimal number of large storage write requests thereby providing good transaction throughput by exploiting the high data transfer rates provided by contemporary storage systems.

Each open transaction is assigned a serialisation number when it is first opened wherein this number is one greater than the largest serialisation number of all currently open transactions. This serialisation number is 1 when no other transactions are open. The transaction serialisation number is used to ensure that operators respect the transaction semantics required by a query.

When a query requires no isolation from other open transactions it can include all open transactions encountered.

When a query requires no isolation from other applied transactions it can include all applied transactions encountered.

When a query requires isolation from transactions applied since the query began, it can ignore transactions that have a serialisation number higher that the highest serialisation number at the start of the query.

When a query requires isolation from transactions applied since the query transaction began, it can ignore transactions that have a serialisation number higher that the highest serialisation number at the start of the query transaction.

In view of the above, it will be appreciated that multiple transaction isolation modes can be provided and that multiple transaction isolation modes can be supported simultaneously.

In view of the above, it will be appreciated that there is no need for any additional mechanisms to resolve separate transaction states within the context of multiple concurrent open transactions.

Frame Maps

Each element path within a frame contains a frame map that summaries the population of element instances for the element path over preceding frames. This map is arranged as a two dimensional array addressed by scales in one dimension and intervals in another dimension. Each entry in the array contains summary information for the path which varies according to path type.

The number of scales S and the number of intervals I in a frame map is fixed across all element paths.

At scale s where s<S, each entry relates to a frame interval of size I^s.

For example, with a scale of 4 and an interval of 8;

At scale 0, each interval covers 1 frame;
At scale 1, each interval covers 8 frames;
At scale 2, each interval covers 64 frames;
At scale 3, each interval covers 512 frames;

Overall, this map can cover 4096 frames (8×512).

The number of scales and intervals is chosen such that I^S is larger than the number of time frames to be retained. Advantageous values are 4 and 256 for scales and intervals respectively. This allows for the retention of over 4 billion time frames of data.

The interval number i in a frame map for scale s and time frame F is derived as follows:

i=(F/(I^s) modulo I), for s in 0 ... (S−1); where S is the number of scales and I is the number of intervals.

As each frame boundary is crossed,

The frame map entry for the current frame F is set for interval i at every scale s in 0 ... S−1.

If the interval i=0 at scale s where s>0 and s<(S−1), then the map entries for every interval (0 ... I) are reset for all scales less than s.

The frame map for the new frame is initialised to be the same as the immediately prior frame.

Frame maps operate as accumulators and are copied from the prior frame into each new frame.

Frame maps are used to navigate across frames by eliminating frames that are deemed irrelevant.

Within each visited frame an operator consults the frame map to determine the next relevant frame. The map intervals are consulted by decreasing interval number (from the currently visited frame number) and increasing scales as each scale is exhausted (when the number of inspected intervals at a scale reaches the maximum number of intervals). When a relevant interval is found, the first frame number within that interval and scale is visited next.

The following example shows the coverage for a frame map with a scale of 4 and an interval of 4 at frames 191 and 192. Each intersection of scale and interval shows the frame coverage provided at that intersection. The cells that change between frame 191 and 192 have been highlighted.

Frame map with S=4;I=4 at frame 191

TABLE 35

| Scale | Interval 0 | 1 | 2 | 3 |
|---|---|---|---|---|
| 0 | 188 | 189 | 190 | 191 |
| 1 | 176->179 | 180->183 | 184->187 | 188->191 |
| 2 | 128->143 | 144->159 | 160->175 | 176->191 |
| 3 | 1->63 | 64->127 | 128->191 | — |

Frame map with S=4;I=4 at frame 192

TABLE 36

| Scale | Interval 0 | 1 | 2 | 3 |
|---|---|---|---|---|
| 0 | 192 | 189 | 190 | 191 |
| 1 | 192 | 180->183 | 184->187 | 188->191 |
| 2 | 192 | 144->159 | 160->175 | 176->191 |
| 3 | 1->63 | 64->127 | 128->191 | 192 |

Identification Element Frame Map

Each frame map entry for an identification element path contains information about which bits within the element instance values are common to all element instances within the frame interval. A frame interval is discounted from a connective tunnel search if the common bits in the frame interval do not correspond with the bits in the value of the identity being searched for.

Each entry in the frame map comprises of two bit sequences as long as the longest possible identification element instance, A commonality mask M
A commonality sequence B Mask M contains a set bit where the corresponding bit in all element instances within the interval is either always set or always clear. The corresponding bit in B indicates if that bit is always set or always clear. For example, if the maximum number of bits in the element path is 8 then M=0 implies all bits differ while M=1 and B=1 implies that the least significant bit is always set for the element instances in that interval.

As each element instance E is added to the frame, the bit patterns M and B are updated as follows, If this is the first element instance of the frame then B becomes E and all bits are set in M.

Otherwise, if (E AND M)=(B AND M) then do not change M or B;

Otherwise derive the following
Difference D=NOT((E AND M) XOR (B AND M))
M becomes (M AND D)
B becomes (B AND D)

A frame interval is excluded when searching for identification element instances equivalent to a candidate identity C if (C AND M) is not equal to (B AND M).

Measurement Element Frame Map

Each frame map entry for a measurement element path contains information about the minimum and maximum element instance values across the frame interval. A frame interval is discounted from a combinative tunnel search if the frame interval bounds do not overlap with the bounds being searched for.

Each frame map entry contains two values for all element instances in the interval, An element minima N that represents the minimum element instance value across the interval
An element maxima X that represents the maximum element instance value across the interval As each element instance E is added to the frame, the values N and X updated as follows, If this is the first element in the frame then N and X are both set to E Otherwise if E>X then X is set to E Otherwise if E<N then N is set to E.

A frame interval is excluded when searching for measurement element instances within a bounded range of minimum A and maximum B if (B<N) OR (A>X).

Enumeration Element Frame Map

Each frame map entry in an enumeration element path contains a sequence of T bits wherein there is one bit corresponding to each property tunnel.

As each element instance E is added to the frame, the bit sequence is updated as follows, If this is the first element in the frame then all bits are cleared first The bit that corresponds to tunnel t is set for each tunnel t that contains a TRUE cell for this element instance.

A frame interval is excluded when searching for enumeration element instances that contain a property P if bit P is clear in T.

Collection Path Frame Map

Frame maps are also maintained for each collection path within collective tunnel frames.

Each frame map entry for a collection path contains two numbers,

A count of collection tunnels C

A count of collection inversions D

These are maintained as follows,

If this is the first instance being added to the frame then they are set to C=1;D=0 for a non inverted collection and C=1;D=1 for an inverted collection.

Otherwise, C is incremented for each collection added; and both are incremented for each inversion.

These counts are used to assess whether inversions will need to be resolved within the frame interval and for inferring the frame boundaries in accumulated tunnels within element path tunnels.

Cells

Each tunnel comprises of a sequence of cells. The structure of a cell varies according to the tunnel family in which it appears and the operator it supports. The following describes the cell types that are used.

Identification Cell

This represents a whole instance of an identification element for a single collection instance within a collective tunnel. It is a sequence of bytes with a preceding cell size, path and domain—as shown in FIG. 22.

The path identifies the element path to which the element instance belongs.

The domain denotes the number system or character set used to encode the identifier.

An identification element cell is considered equivalent to a candidate identifier if and only if it has the same length, encoding domain and byte sequence as the candidate value.

This type of cell is used to store and retrieve the value of an identification element instance from a single collection instance.

Measurement Cell

This represents a whole instance of a measurement element for a single collection instance within a collective tunnel. It holds a cell length, domain, sign indicator, an exponent and a significand that represent the magnitude of the element—as shown in FIG. 23.

The path identifies the element path to which the element instance belongs.

The domain defines the number system or time zone used to encode the native value.

The sign indicates if the magnitude is positive or negative.

The exponent defines how many bits the significand must be shifted to be normalised into a fix radix point.

The significand contains only sufficient bits or bytes to represent the precision of the magnitude of the measurement.

A measurement cell is compared to a candidate measurement by examination of their relative magnitudes. Comparisons must assume a common offset and scale to perform consistent comparisons. For example, time values are represented in standard UTC with the domain denoting the original time zone.

This type of cell is used to store and retrieve the value of a measurement element instance from a single collection instance.

Enumeration Cell

This represents a whole instance of an enumeration element for a single collection instance within a collective tunnel. It is a sequence of property identifiers each preceded by a property size and the enumeration sequence preceded by a cell size, path and domain—as shown in FIG. 24.

The path identifies the element path to which the element instance belongs.

The domain defines the number system or character set used to encode the native property value.

An enumeration cell is considered to contain a candidate property if the domain encodings are the same and the sequence of properties contains a property of the same size and byte sequence.

This type of cell is used to store and retrieve the value of an enumeration element instance from a single collection instance.

Opaque Cell

This represents a link to a whole instance of an opaque element for a single collection instance within a collective tunnel. It contains the cell size, path, domain, opaque element size and the link to where the opaque data is stored—as shown in FIG. 25.

The path identifies the element path to which the element instance belongs.

The domain defines the encoding system used to store the opaque value at the link location.

The element size specifies the size of the opaque object contained at the link location.

The link denotes the location where the contents of the opaque element instance are stored. The opaque element is considered to be a large data object such as a document and is stored at an external location such as a file. Usefully, the link may be a URL.

This type of cell is used to retrieve the value of an opaque element instance from a single collection instance.

Inversion Cell

This represents an inversion of a previously created collection instance within a collective tunnel. This cell contains fixed size frame and tunnel numbers—as shown in FIG. 26.

The inverted frame and inverted tunnel numbers refer to the location of the collection instance that has been inverted. The inverting tunnel number refers to the tunnel location of the inverting cell in the current frame.

This type of cell is used to indicate the inversion of a collection instance within a collective tunnel.

Digest Cell

This represents a partial instance of an identification element within a connective tunnel. Each cell contains a cell size, digest and fixed size tunnel number—as shown in FIG. 27.

The digest is computed from the domain and byte sequence of an identification element instance and the tunnel number refers to the collective tunnel that contains the respective collection instance for which the digest was computed.

This type of cell appears in a connective tunnel for each element instance in an identification element path and is used by the IS operator to evaluate the likelihood of equivalence between the element instance and the operator operand; whereby a cell digest that is equivalent to the digest of the operator operand is considered to be a likely equivalence; or impossible otherwise.

The digest calculated is the value of the identification element itself for identification element instances below a certain size. In this case, the equivalence of element instances are considered as certain rather than just likely.

For element instances at or above the size threshold, the digest can be calculated from an industry standard digest algorithm such as MD5.

In each case, the digest is derived from the combined domain and identification byte sequence.

Rank Cell

This contains a single unsigned byte from a measurement of fixed precision and fixed radix point and without sign. For example, a measurement may be normalised into 2048 bits of precision with a fixed radix point immediately after the $1024^{th}$ bit. This is divided into 256 rank cells of rank 1 . . . 256 with rank 1 being the most significant rank.

This type of cell appears in a combinative tunnel for each element instance in a measurement element path and is used by the IN operator to evaluate the likelihood of the element instance being bounded by the operator operands. It is also used by aggregation operations to accumulate part of the element instance value.

Boolean Cell

This is a fixed size cell that contains an indicator of TRUE or FALSE. In its most effective form this cell is a single bit that indicates TRUE when set. This type of cell is used by HAS and EXISTS operators to determine the existence of a property or element instance respectively. It appears in multiple tunnel types described below.

Tunnels

The following describes the tunnels created within each tunnel family.

Collective Tunnels

The following collective tunnels are created for each collection path.

There is one collection tunnel created for every collection instance created. This tunnel contains one cell per element instance within the collection instance. Each cell is one of the identification cell, measurement cell, enumeration cell or opaque cell type.

There is one collection tunnel created for every collection instance logically removed. This contains one inversion cell followed by one cell per element instance copied from the collection instance that has been deemed removed.

The order in which these tunnels are created reflects the order which collection instances are created and removed and the number of these tunnels in each frame will vary. The tunnel numbers for collection tunnels are assigned in strict incremental order starting at 1 for a new frame.

There is exactly one inversion tunnel per frame. This contains one inversion cell for every inverting collection tunnel. This tunnel is always assigned tunnel number 0.

Connective Tunnels

The following connective tunnels are created for each identification element path.

There is a fixed number (N) of digest tunnels per frame where each digest tunnel contains zero or more digest cells.

For every identification element instance in this element path in this frame, a digest cell is created where the digest is computed from the domain and byte sequence of the element value and the tunnel number of the corresponding collective tunnel is assigned to this digest cell. The digest cell is assigned to the digest tunnel given by a hash function which maps to 1 . . . N and is computed from the domain and byte sequence of the element value.

Each digest tunnel is arranged as shown in FIG. 28 with the cells appended in strict chronological order within each tunnel.

Connective tunnels are traversed by the IS operator to evaluate the likelihood or impossibility of equivalence of an element instance to an operator operand. Where a cell has the same digest as the digest of the operator operand, then equivalence is deemed likely; otherwise it is deemed impossible.

Where the digest cell is sufficiently small and comprised of the element instance then equivalence is deemed as certain rather than likely.

There is exactly one existence tunnel per frame. This contains one boolean cell for every collection tunnel in the corresponding frame and indicates if the element instance for this element path exists in the corresponding collection tunnel. This tunnel is always assigned tunnel number 0.

Each frame contains the count of boolean cells that are TRUE in the existence tunnel.

Each frame also contains a cell count per digest tunnel number. This is a one-dimensional array addressed by tunnel number (1 . . . N) to yield the count of cells in that tunnel—as shown in FIG. 29.

Each collection instance appears in one digest tunnel only. Therefore, there is a digest tunnel map within each frame for an identification element. This map is a one-dimensional array addressed by collection tunnel number to yield a corresponding digest tunnel number—as shown in FIG. 30.

The digest tunnel map contains one entry per collection tunnel in the frame. Where a corresponding element instance does not exist within a collection tunnel, the digest tunnel number set as 0.

To find the digest cell for a collection instance requires inspection of the digest tunnel map by collection tunnel number to find the digest tunnel and then inspection of digest cells in that digest tunnel to find the corresponding collection tunnel number.

To find collection instances that correspond to an identification value requires a calculation of the digest and digest tunnel number to retrieve all matching digest cells for the calculated digest.

An effective number for N is 65535.

Combinative Tunnels

The following combinative tunnels are created for each measurement element path.

There is a fixed number (N) of rank tunnels per frame where each rank tunnel contains zero or more rank cells.

For every element instance in this element path in this frame, N rank cells are created where the cell in rank tunnel N represents rank N in the normalised measurement representation. The position of each cell in a rank tunnel corresponds with the collective tunnel number that contains the element instance for this cell.

Each rank tunnel is arranged as shown in FIG. 31 with the cells appended in strict chronological order within each tunnel.

There is exactly one sign tunnel per frame. This contains one boolean cell for every collection tunnel in the corresponding frame and indicates if the element instance for this element path has a negative magnitude in the corresponding collection tunnel. This tunnel is always assigned tunnel number N+1.

Combinative tunnels are traversed by the IN operator to evaluate the likelihood or impossibility of an element instance being bounded by the operator operands. Where a sign cell or rank cell has a value that cannot fall within the operator bounds then the bounding is deemed impossible; otherwise it is deemed likely. For a likely bounding the IN operator may inspect further rank cells for the same element instance to further determine impossibility or certainty.

There is exactly one existence tunnel per frame. This contains one boolean cell for every collection tunnel in the corresponding frame and indicates if the element instance for this element path exists in the corresponding collection tunnel. This tunnel is always assigned tunnel number 0.

Each collection instance appears once in every combinative tunnel.

Each frame contains the count of boolean cells that are TRUE in the existence tunnel.

Each also frame contains a cell count per possible unsigned cell value per rank tunnel. This is a one-dimensional array per rank tunnel addressed by byte value (0 . . . 255) to yield the count of cells in that rank tunnel that contain the corresponding cell value—as shown in FIG. 32.

The cell counts are used directly for the purposes of summation where there are is a common sign and no inversions across the frame and no predicate operators. In these circumstance, each byte value is multiplied by corresponding cell count and these are combined with respect to rank.

In other circumstances aggregation works on each rank tunnel in turn to minimise cache churn. For summation, each rank is summed (with the corresponding sign cell) separately and these sums are combined for the accumulated result. Minima and maxima use the sign tunnel to determine which sign and whether minimum or maximum magnitude are sought; then scans the highest rank tunnel which contains non-zero cell values first, to find candidate cells; thereafter the candidates are reduced by consulting corresponding lower rank tunnels directly in candidate order and then descending rank order.

To find collection instances that correspond to a measurement value requires a scan of the sign and rank tunnels that are relevant. The position of each cell found corresponds to the collection tunnel number.

To find the value of a byte at rank R for a collection instance C requires that the cell in tunnel R at position C be inspected.

When searching for a measurement within a bounded range, the rank bytes of the low and high bounds are compared to determine the highest rank where the bounds differ. This is the determinant rank and rank tunnels below the determinant rank need only be inspected for specific collection instances identified as of possible relevance by scanning the ranks higher than determinant rank first.

In view of the above, it will be appreciated that many cells may be deemed as of impossible relevance without the need to examine all rank tunnels.

The cell counts for ranks above the determinant rank values are consulted prior to a scan to quickly determine if the required rank value exists in the corresponding rank tunnel or not. If not, the entire frame is discounted.

An effective number for N is 256, which provides a precision of 2048 bits.

Characteristic Tunnels

The following characteristic tunnels are created for each enumeration element path.

There is a fixed number (N) of property tunnels per frame where each property tunnel contains zero or more boolean cells.

For every element instance in this element path in this frame, an enumeration cell is appended to every property tunnel.

A hash function which maps to 1 . . . N from a property domain and byte sequence is calculated for each property within the enumeration element and for each property tunnel number returned by the property hash calculation the cell in that tunnel is set otherwise the cell is cleared.

In a useful alternative embodiment, a monotonically increasing ordinal is assigned to each unique property identifier. The tunnel number is derived by applying a modulo of N to the property ordinal.

In another useful alternative embodiment, a monotonically increasing ordinal is assigned to each unique property identifier within each element path. The tunnel number is derived by applying a modulo of N to the property ordinal.

Characteristic tunnels are traversed by the HAS operator to evaluate the likelihood or impossibility of possession of a property by an element instance. Where a cell indicates possession then possession is deemed likely; otherwise it is deemed impossible.

Where the tunnel number is derived from a property ordinal, possession is deemed as certain rather than likely if (M−N)<P<2N where P is the ordinal of the property identifier, M is the maximum ordinal assigned and N is the number of tunnels.

The position of each cell in a property tunnel corresponds with the tunnel number of the collection tunnel that contains the corresponding element instance.

There is exactly one existence tunnel per frame. This contains one boolean cell for every collection tunnel in the corresponding frame and indicates if the element instance for this element path exists in the corresponding collection tunnel. This tunnel is always assigned tunnel number 0.

Each collection instance appears once in every tunnel.

Each frame contains the count of boolean cells that are TRUE in the existence tunnel.

Each frame also contains a count of true cells per enumeration tunnel. This is a one-dimensional array addressed by property tunnel number (1 . . . N) to yield the count of TRUE cells in that tunnel—as shown in FIG. 33.

An effective number for N is 65535.

Tunnel Example

The following provides an example of a storage layout for cells and tunnels for the Employee table described earlier. Cells are illustrated as enclosed in square brackets; cell sizes are shown as S and domains are shown as D. For clarity, it is assumed that all employee collection instances exist within the same time frame and that no employee instances have been deleted.

TABLE 37

Employees Table

| Name | Employee Number | Salary | Commission Rate | Department Number |
|---|---|---|---|---|
| Simon Smith | 10 | 10000 | | 100 |
| John Jones | 20 | 20000 | 10.00% | 200 |
| Bob Brown | 30 | 30000 | 15.00% | 200 |

TABLE 38

| Collection Path | Collection Path # |
|---|---|
| Employees | 1 |
| Department | 2 |
| Region | 3 |

TABLE 39

| Element Path | Element Path # | Collection Path # | Intent |
|---|---|---|---|
| Name | 1 | 1 | Enumeration |
| Employee Number | 2 | 1 | Identification |
| Salary | 3 | 1 | Measurement |
| Commission Rate | 4 | 1 | Measurement |
| Department Number | 5 | 1 | Identification |

TABLE 40

Collection Path 1

| Collective Tunnel # | Collective Tunnel |
|---|---|
| 0 (inversion) | (empty) |
| 1 | [S, 1, D, 5, 'Simon', 5, 'Smith'][S, 2, D, 10][S, 3, D, +, 0, 10000][S, 5, D, 100] |
| 2 | [S, 1, D, 4, 'John', 5, 'Jones'][S, 2, D, 20][S, 3, D, +, 0, 20000][S, 4, D, +, −2, 1000][S, 5, D, 200] |
| 3 | [S, 1, D, 3, 'Bob', 5, 'Brown'][S, 2, D, 30][S, 3, D, +, 0, 30000][S, 4, D, +, −2, 1500][S, 5, D, 200] |

TABLE 41

Element Path 1

| Characteristic Tunnel # | Characteristic Tunnel |
|---|---|
| 0 (existence) | [1][1][1] |
| ... | |
| hash('Simon') | [1][0][0] |
| hash('Smith') | [1][0][0] |
| hash('John') | [0][1][0] |
| hash('Jones') | [0][1][0] |
| hash('Bob') | [0][0][1] |
| hash('Brown') | [0][0][1] |
| ... | |
| 65535 | |

TABLE 42

Element Path 2

| Connective Tunnel # | Connective Tunnel |
|---|---|
| 0 (existence) | [1][1][1] |
| ... | |
| hash(10) | [S, digest(10), 1] |
| hash(20) | [S, digest(20), 2] |
| hash(30) | [S, digest(30), 3] |
| ... | |
| 65535 | |

TABLE 43

Element Path 3

| Combinative Tunnel # | Combinative Tunnel |
|---|---|
| 0 (existence) | [1][1][1] |
| 1 (rank 1) | [1][2][3] |
| 2 (rank 2) | [0][0][0] |
| 3 (rank 3) | [0][0][0] |
| 4 (rank 4) | [0][0][0] |
| 5 (rank 5) (radix point) | [0][0][0] |
| 6 (rank 6) | [0][0][0] |
| 7 (rank 7) | [0][0][0] |
| 8 (rank 8) | [0][0][0] |
| 9 (rank 9) | [0][0][0] |
| 10 (rank 10) | [0][0][0] |
| 11 (sign) | [+][+][+] |

TABLE 44

Element Path 4

| Combinative Tunnel # | Combinative Tunnel |
|---|---|
| 0 (existence) | [0][1][1] |
| 1 (rank 1) | [0][0][0] |
| 2 (rank 2) | [0][0][0] |
| 3 (rank 3) | [0][0][0] |
| 4 (rank 4) | [0][1][1] |
| 5 (rank 5) (radix point) | [0][0][5] |
| 6 (rank 6) | [0][0][0] |
| 7 (rank 7) | [0][0][0] |
| 8 (rank 8) | [0][0][0] |
| 9 (rank 9) | [0][0][0] |
| 10 (rank 10) | [0][0][0] |
| 11 (sign) | [+][+][+] |

TABLE 45

Element Path 5

| Connective Tunnel # | Connective Tunnel |
|---|---|
| 0 (existence) | [1][1][1] |
| ... | |
| hash(100) | [S, digest(100), 1] |
| hash(200) | [S, digest(200), 2] |
| hash(300) | [S, digest(200), 3] |
| ... | |
| 65535 | |

The following provides example operator navigation routes

EXISTS('Employees.Commission')—Follow existence tunnel 0 in element path 4. This yields collection tunnel numbers 2 and 3.

IS('Employees.EmployeeNumber',10)—Follow digest tunnel given by hash (10) in element path 2. This yields collection tunnel number 1.

IN('Employee.Salary',0,10000)—Follow sign tunnel 11 and rank tunnel 1 in element path 3. This yields collection tunnel 1.

HAS('Employees.Name','Simon','Jones')—Follow and combine property tunnels given by hash ('Simon') and hash ('Jones') in element path 1. This yields no collection tunnels.

Tunnel Compression

Many of the tunnels described are usefully compressed using conventional lossless run length encoding to reduce tunnel size and to make the scanning of a tunnel faster. Methods of run length encoding is exhaustively covered elsewhere and so is not discussed any further here.

Existence and property tunnels are effectively bit sequences where contiguous sub-sequences of set or clear bits are likely. Therefore these tunnels are usefully run length encoded.

Within rank tunnels for a measurement element, bytes values at a given rank are likely to be similar—especially at extreme distances from the radix point where there will be large populations of zero byte values. Therefore rank tunnels are usefully run length encoded.

Collection Sets

Each of the predicate and bind operators defined generate and manipulate collection sets of collection instance members.

Each collection set is generated by a predicate operator evaluation and contains the following information for each collection instance considered relevant to the operator evaluation, The Collection Frame and Collective Tunnel Number that uniquely identifies the collection instance considered relevant to the predicate operator evaluation;

The Certainty of the predicate operator evaluation. A boolean indicator assigned by the predicate operator evaluation to indicate either certainty or likely possibility of the relevance of the collection instance to the predicate operator evaluation;

The Visit Ordinal assigned during bind operations and assigned as zero by the predicate operator evaluation;

The Sequence number assigned during bind operations and assigned as zero by the predicate operator evaluation;

The Cardinality assigned during bind operation and assigned to be one by the predicate operator evaluation;

The Digest Tunnel number for the binding element instance assigned during bind operations and assigned as zero by the predicate operator evaluation;

The Member's Ordinal position within the collection set and incrementally assigned by predicate operator evaluation;

The Digest value for the digest cell for the binding element instance for the collection instance. Assigned during bind operations and assigned as zero by the predicate operator evaluation.

After being generated by a predicate operator, each collection set will exhibit good frame locality and collection instances will be ordered within each frame.

Figure 34:
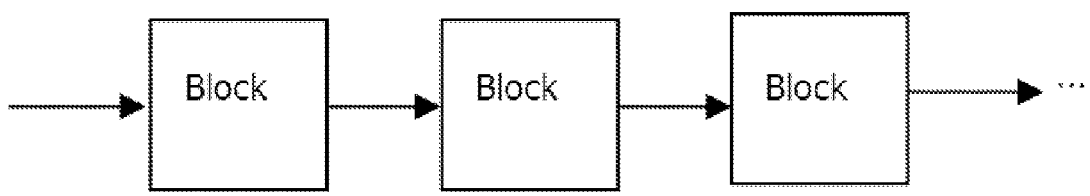
FIG. 34 illustrates that, advantageously, collection sets can be hosted in memory to assist rapid access and an advantageous structure for a collection set is a list of fixed-sized memory blocks in a system according to one practice of the invention.

Advantageously, collection sets are hosted in memory to assist rapid access and an advantageous structure for a collection set is a list of fixed-sized memory blocks. This is illustrated in FIG. 34.

Advantageously, unused memory blocks are pooled to allow rapid construction of collection sets without a need to make calls to low level memory allocation services at the operating system level.

Advantageously, as the bind operation progresses, any block that only contains members irrelevant to the current and subsequent stages of the bind process are removed from the list and returned to the pool of unused memory blocks.

A collection sets are used to materialise the query result by accessing combinative and/or collective tunnels. The certainty indicator for each collection member is used by query materialisation to determine if it is necessary to retrieve an element instance to resolve uncertainty.

Database Processes

Figure 35:
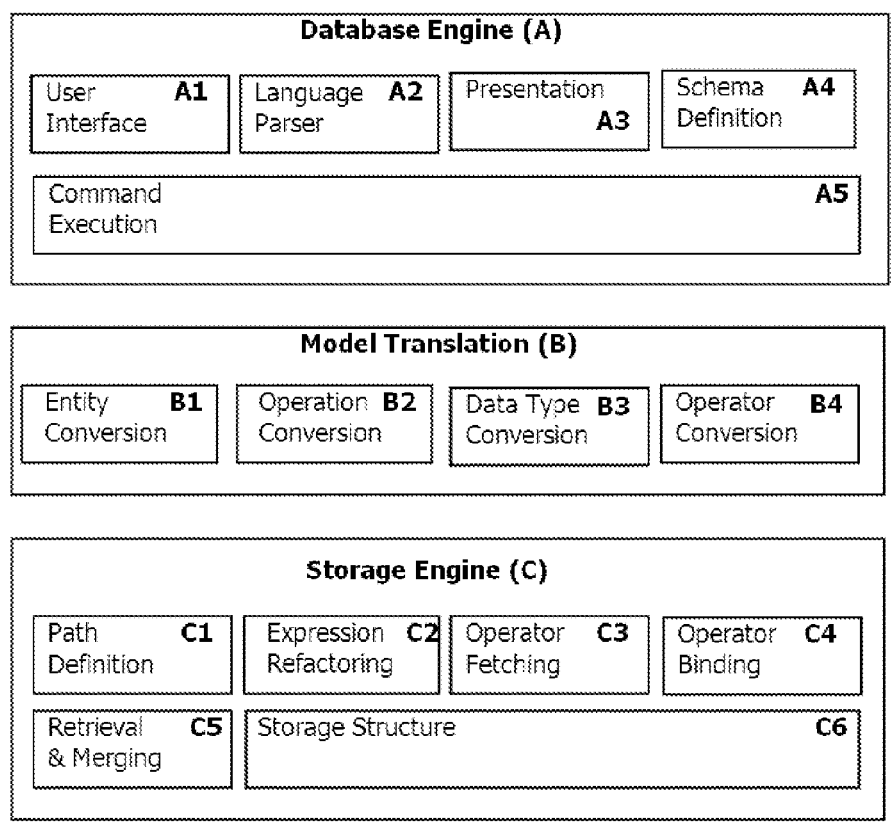
FIG. 35 illustrates layers and components of an architecture of a database in a system according to one practice of the invention.

The access model and storage structures defined above are used to persist data within storage and retrieve query results from storage within a database. The architecture of that database consists of the layers and components illustrated in FIG. 35.

The three major layers consist of the Database Engine A which is responsible for the overall coordination of user commands within the context of a native data model, such as a relational model, and a native command language, such as SQL. A Model Translation Layer B is responsible for conversion between the native data model and the access model used by the Storage Engine C. The Storage Engine C is responsible for persisting changes path definitions and persisting changes to collection instances and for the retrieval of collection and element instances required by queries.

The interface provided by Model Translation B to the Database Engine A depends on the native data model supported by the Database Engine A. For a relational data model, in one useful embodiment, this interface is as follows Model Translation Interface

TABLE 46

| Method | Notes |
| --- | --- |
| createDatabase(d, p) | Creates a new database instance with identity d and storage location path p. This creates a new storage structure and meta data path. |
| dropDatabase(d) | Drops an existing database instance with identity d. |
| createTable(d, t) | Creates table t within database instance d |
| createColumn(d, t, c, l) | Creates column c with constraint l within an existing table t in database instance d |
| renameTable(d, o, n) | Renames an existing table o to new name n within database instance d |
| renameColumn(d, t, o, n) | Renames an existing column o to new name n in an existing table t within database instance d |
| dropTable(d, t) | Drops an existing table t in database instance d |
| dropColumn(d, t, c) | Drops an existing column c in existing table t in database instance d |
| truncateTable(d, t) | Truncates existing table t in database instance d |
| openSession(d) return s | Opens a transactional session s in database instance d |
| closeSession(s) | Closes the transactional session s |
| openTransaction(s, i) return n | Opens a new transaction n within session s (potentially within the context of an existing open transaction) using transaction isolation semantics i |
| commitTransaction(s) | Commits and close all currently open transactions in session s |
| rollbackTransaction(s) | Rollback and close all transactions open in session s |

TABLE 46-continued

| Method | Notes |
| --- | --- |
| rollbackTransaction(s, n) | Rollback and close all open transactions in session s up to transaction n |
| openRow(s, t) return r | Returns a row context r for inserts into table t within the current transaction in session s. |
| setNull(r) | Sets all columns as null in row context r |
| setNull(r, c) | Sets column c as null in row context r |
| setColumn(r, c, v) | Sets column c to value v in row context r |
| insert(r) | Inserts row context within the current transaction |
| closeRow(r) | Closes row context r. |
| openUpdateCursor(s, t) returns u | Opens a cursor u for row updates against table t within the current transaction of session s. |
| setWhereClause(u, w) | Sets the where clause w in cursor u |
| execute(u) | Executes the cursor u for the current where clause |
| setFirstRow(u) | Sets the first row context for cursor u |
| setNextRow(u) | Advances the row context for cursor u |
| isNull(u, c) | Indicates if the value for column c in the current row context of cursor u is null |
| getColumnValue(u, c, v) | Returns the column value into v for column c from the current row context of cursor u. |
| setColumnValue(u, c, v) | Sets the value v for column c in the current row context of cursor u. |
| getRowIdentity(u) | Returns the row identity of the current row context of cursor u. |
| update(u) | Updates the current row context within the table |
| delete(u) | Deletes the current row context from the table |
| close(u) | Closes the cursor u |
| openQueryCursor(s) returns q | Opens a query cursor q for query within the current transaction of session s. |
| setWhereClause(q, w) | Sets the where clause w in cursor q |
| addSelectExpression(q, x) | Adds an expression x to the query select clause in cursor q |
| addGroupExpression(q, x) | Adds a group by expression for aggregation |
| execute(q) | Executes the cursor q for the current where clause, select expression and group expression |
| setFirstRow(q) | Sets the first row context for cursor q |
| setNextRow(q) | Advances the row context for cursor q |
| isNull(q, x) | Indicates if select expression x of the current row is null |
| getExpression(q, x, v) | Gets the value of select expression x into v for the current row context of cursor q |
| close(q) | Closes the cursor q |

The interface provided by Storage Engine C to the Model Translation Layer B supports the access model operations and operators. In one useful embodiment, this interface is as follows Storage Engine Interface

TABLE 47

| Method | Notes |
| --- | --- |
| createDatabase(d, p) | Creates a new database instance with identity d at storage location path p. This creates a new storage structure and meta data path. |
| dropDatabase(d) | Drops an existing database instance with identity d. |
| defineCollectionPath(d, c) | Defines collection path c within database instance d |
| defineElementPath(d, c, e, i) | Defines element path e with intent i within collection path c within database instance d |
| redefineCollectionPath(d, o, n) | Renames existing collection path o to new name n within database instance d |
| redefineElementPath(d, c, o, n) | Renames existing element path o within collection path c to new name n within database instance d |
| undefineCollectionPath(d, c) | Removes existing collection path c in database instance d |
| undefineElementPath(d, c) | Removes existing element path e within collection path c in database instance d |
| truncateCollectionPath(d, c, f) | Truncates existing collection path c in database instance d, removing all frames prior to f |
| openSesion(d) return s | Opens a transactional session s in database instance d |
| closeSession(s) | Closes the transactional session s |
| openTransaction(s, i) return n | Opens a new transaction n within session s (potentially within the context of an existing open transaction) using transaction isolation semantics i |
| applyTransaction(s) | Applies and closes all currently open transactions in session s |
| abandonTransaction(s) | Abandons and closes all transactions open in session s |
| abandonTransaction(s, n) | Abandon and close all open transactions in session s up to transaction n |

TABLE 47-continued

| Method | Notes |
|---|---|
| openCollectionInstance(s, c) return c | Returns a collection context c for appending to collection path c within the current transaction in session s. |
| setNotExists(c) | Sets all element instances as non existent for all element paths in collection instance context c |
| setNotExists(c, e) | Sets element instance as non existent for element path e in collection instance context c |
| setElementInstance(c, e, v) | Sets element instance to value v for element path e in collection instance context c |
| append(c) | Appends collection instance context c in the current transaction |
| closeCollectionInstance(c) | Closes collection instance context c. |
| openUpdateCursor(s, c) returns u | Opens a cursor u for collection instance updates against collection path c within the current transaction of session s. |
| setUpdateCriteria(u , b) | Sets the update criteria for update cursor u to boolean expression b of predicate operators |
| execute(u) | Executes the cursor u for the current update criteria |
| setFirstInstance(u) | Sets the first collection instance context for cursor u |
| setNextInstance(u) | Advances the collection instance context for cursor u |
| exists(u, e) | Indicates if the instance for element path e exists in the current context of cursor u |
| getInstanceValue(u, e, v) | Gets the instance value into v for element path e from the current context of cursor u. |
| setInstanceValue(u, e, v) | Sets the instance value for element path e from v for the current context of cursor u. |
| getCollectionIdentity(u) | Returns the collection identity of the current context of cursor u. |
| replace(u) | Inverts the existing collection instance for the current cursor context and appends the current context |
| invert(u) | Inverts the existing collection instance for the current cursor context |
| close(u) | Closes the cursor u |
| openQueryCursor(s) returns q | Opens a query cursor q for query within the current transaction of session s. |
| setQueryCriteria(q, b) | Sets the query criteria for query cursor q to boolean expression b of predicate and bind operators |
| addElementPath(q, c, e) | Adds element path e in collection path c to the result path in query cursor q |
| execute(q) | Executes the cursor q for the current query criteria and result paths |
| setFirstInstance(q) | Sets the first collection instance context for cursor q |
| setNextInstance(q) | Advances the collection instance context for cursor q |
| Exists(q, c, e) | Indicates if an instance exists for element path e in collection path c in the context of cursor q |
| getElementInstance(q, c, e, v) | Gets the value of the element inatnce into v for element path e in collection path c in the current context of cursor q |
| close(q) | Closes the cursor q |

Commands are accepted in a native language by the User Interface A1 and parsed by a native Language Parser A2.

Commands that involve changes to the native schema update the Schema Definition A4 and are passed through Model Translation B into Entity Conversion B1 for conversion from native entities into access model entities. Schema changes that involve changes to collection path and/or element path definitions are passed into the Storage Engine C for persistence by Path Definition C1. Any declared schema constraints are passed into Entity Conversion B1 to allow it to ascertain the intent of each element path defined.

Commands that involve transactional updates pass through Command Execution A5 and through Model Translation B into the Storage Engine C via Entity Conversion B1, Operation Conversion B2, and Data Type Conversion B3 into the Storage Structure C6 via Path Definition C1. During the pass though, Entity Conversion B1 converts native data model entities into collection and element path entities; Path Definition C1 resolves collection and element path identities; Operation Conversion B2 converts any collection instance updates into access model collection instance inversion and creation operations; Data Type Conversion B3 converts native data types into access model data types for identification, measurement, enumeration and opaque element instances.

Commands that involve queries pass through Command Execution A5 and through Model Translation B into the Storage Engine C via Entity Conversion B1, Operation Conversion B2, Data Type Conversion B3, Operator Conversion B4, Path Definition C1, Expression Re-factoring C2, Operator Fetching C3 and Operation Binding C4, Retrieval and Merging C5. During the pass though, Entity Conversion B1 converts native data model entities into collection and element path entities; Operation Conversion B2 converts any compound query statements into its component queries; Data Type Conversion B3 converts native data types into access model data types for identification, measurement, enumeration element and opaque instances; Operator Conversion B4 converts all native language operators into the access model operators (IS, IN, HAS, EXISTS and BIND). The Storage Engine C uses Path Definition C1 to resolve collection path names and element path names; Expression Re-factoring C2 to converts composite boolean expressions into Disjunctive Normal Form form; with Operator Fetching C3 from the Storage Structure C6 to generate collection sets for each operator; with Operator Binding C4 binding collection sets from operators in conjunctive terms; with Retrieval and Merging C5 retrieving and merge all results from all bound collection sets and conjunctions via the Storage Structure C6. Query results pass back through Operation Conversion B2 for any aggregation and expression evaluation operations and then through Data Type Conversion B3 for the conversion of access model data types into native model data types. These results are ultimately pass back to Presentation A3 for final rendering for the user who initiated the query. Presentation A3 is responsible for the final sorting and ordering of the results presented.

During query execution, Operator Conversion B4 indicates any potentially lossy predicate operator translation to Operation Execution B2 which can elect to request the predicated element instances as well as the result set sought so that it can verify the results returned by applying the original operator criteria and filter results that arise from a lossy translation.

Constraints, such as domain definitions, are defined within the native Schema Definition A4 and enforced within the Database Engine A by Command Execution A5. Command Execution A5 will issue queries as described above to determine the existence or otherwise of entities when enforcing uniqueness and logical relationship constraints.

The following is described with the context of a relational database but applies similarly to any other data models supported by the access model described.

When a user submits a command using the SQL language via A1 to create a new database instance, the SQL statement is parsed into its language components by A2 wherein the database name and database location are extracted. The database engine will verify that it is a valid command and update the schema definition accordingly via A4. The database and location names are passed through B1 for derivation of the storage location path into the Storage Engine C wherein a new file system directory is created for the new database instance and subdirectories and meta data files are created within C6.

When a user submits a command using the SQL language via A1 to create a open an existing database instance, the SQL statement is parsed into its language components by A2 wherein the database name is extracted. The database engine will verify that it is a valid command using its schema definition in A4. The location associated with the database name in A4 is passed through B1 for derivation of the storage location path into the Storage Engine C wherein the file system directory is assigned to the user and the latest meta-data file is loaded into memory from C6.

When a user submits a command using the SQL language via A1 to drop an existing database instance, the SQL statement is parsed into its language components by A2 wherein the database name is extracted. The database engine will verify that it is a valid command using its schema definition in A4. The location associated with the database name in A4 is passed through B1 for derivation of the storage location path into the Storage Engine C wherein the file system directory, its sub-directories and files contained within are deleted from within C6.

When a user submits a command using the SQL language via A1 to create a table structure, the SQL statement is parsed into its language components by A2 wherein the table and column names are extracted. The database engine will verify that it is a valid command and update the schema definition accordingly via A4. The table and column names are passed along with the column data types and constraints into Model Translation B. Therein, the table name (including any schema and database qualifiers) is interpreted as a collection path; each column name is interpreted as an element path; each constraint is used to determine element path intent by B1. The collection path, element paths and element path intents are passed to C1 wherein the collection path is assigned a unique collection path ordinal and each element path is assigned a unique ordinal within the collection path. File system directories for the new collection path are created within each tunnel family directory by C6. The database meta data is persisted within C6.

When a user submits a command using the SQL language via A1 to add one or more columns to an existing table structure, the SQL statement is parsed into its language components by A2 wherein the table and column names are extracted. The database engine will verify that it is a valid command and update the schema definition accordingly via A4. The table/column identifiers are resolved into collection path and element paths respectively by B1 and element path intent derived from the column data type and constraints. The collection path, element path and element path intent are passed to C1 wherein the element path is assigned a unique ordinal within the collection path. The database meta data is persisted within C6.

When a user submits a command using the SQL language via A1 to drop a table structure, the SQL statement is parsed into its language components by A2 wherein the table name is extracted. The database engine will verify that it is a valid command and update the schema definition accordingly via A4. The table name is passed into the Model Translation Layer B where the collection path is identified via B1. The directories specifically relating to the collection path and all files within are deleted from the file system within C6. Then the collection path is marked as deleted and the database meta data is persisted within C6.

When a user submits a command using the SQL language via A1 to drop one or more columns from a table structure, the SQL statement is parsed into its language components by A2 wherein the table and column names are extracted. The database engine will verify that it is a valid command and update the schema definition accordingly in A4. The table name and column names are passed into the Model Translation Layer B wherein the collection path and element paths are identified by B1. Then the element path is marked as deleted and the database meta data is persisted within C6.

When a user submits a command using the SQL language via A1 to rename a table structure, the SQL statement is parsed into its language components by A2 wherein the old and new table names are extracted. The database engine will verify that it is a valid command and update the schema definition accordingly in A4. The table names are passed into the Model Translation Layer B wherein the collection path is identified from the old table name by B1. Therein, the collection path for the old name is assigned the new collection path name in C1 and the database meta data is persisted within C6.

When a user submits a command using the SQL language via A1 to rename a column within a table structure, the SQL statement is parsed into its language components by A2 wherein the table and column names are extracted. The database engine will verify that it is a valid command and update the schema definition accordingly in A4. The table name and column names are passed into the Model Translation Layer B wherein the collection path and element path for the old column name are identified by B1. The element path is assigned the new column name in C1 and the database meta data is persisted within C6.

When a user submits a command using the SQL language via A1 to truncate a table structure, the SQL statement is parsed into its language components by A2 wherein the table name is extracted. The database engine will verify that it is a valid command using A4. The table name is passed into the Model Translation Layer B wherein the collection path is identified by B1. Within C6, all frame files relating to the collection path are deleted; all transaction segments for the truncated collection path that belong to closed transactions are deassigned from the collection path.

When a user submits a command using the SQL language via A1 to insert an explicit row into a table structure, the SQL statement is parsed into its language components by A2. The database engine will verify that it is a valid command via A4 and associate column values with column names. The table name, column names and column values are passed into the Model Translation Layer B wherein, the collection path and element paths are identified by B1 and C1. Each column value supplied is converted into an element cell (identification, measurement, enumeration or opaque cell) according to the element path intent by B3. Within C6, one or more transaction segments are created in the current heap file and the element cells are added to them.

When a user submits a command using the SQL language via A1 to query rows from one or more table structures, the SQL select statement is parsed into its language components by A2 which will create a hierarchical expression tree for each select clause and a hierarchical SQL operator tree for each where clause. These are passed into the Model Translation Layer B. Therein, the collection path and element paths in the expression trees and the operator trees are identified by B1. Any compound SQL query statements are decomposed into distinct queries by B2 which submits them as separate queries. For each query, the SQL operators in an operator tree are converted to the predicate and bind operators of the access model by B4 and passed together with a list of collection and element path names from the expression tree into the Storage Layer C wherein the operator tree is refactored into disjunctive normal form by C2. Thereafter, separate collection sets are generated for each predicate operator by C3; then collection sets within conjunctive terms of the operator tree are bound by bind operators in C4. Instances for the required collection paths and element paths are fetched from C6 via each collection set in each conjunctive term of the operator tree via C5 and de-duplicated between conjunctive terms in the operator tree in C5 and returned to the Model Translation Layer B. Wherein B2 will perform any required filtering, aggregation or recombination of component queries. These results are converted back to SQL data types from the access model data types and the results handed back to the Database Engine A for presentation by A3.

When a user submits a command using the SQL language via A1 to query rows from a table structure for the purpose of updating or deleting rows, the SQL select statement is parsed into its language components by A2 which will create a hierarchical SQL operator tree that defines the predicate conditions for the query. The name of the table and the operator tree are passed into the Model Translation Layer B. Therein, the collection path and element paths are identified by B1; the SQL operators in the operator tree are converted to the predicate operators of the access model by B4. The collection path and operator tree passed into the Storage Engine C wherein the operator tree is re-factored into a disjunctive normal form by C2. Thereafter, separate collection sets are generated for each predicate operator by C3 and merged within each conjunctive term within the operator tree. Collection sets are de-duplicated between conjunctive terms in the operator tree by C5. An exclusive inversion lock is requested for ever member of the final collection set prior to processing that result. Where the user has chosen to delete rows, each collection instance in the result set is retrieved from its collective tunnel by and copied to create a collection instance inversion by C5 wherein one or more transaction segments are created and appended with an inversion cell and the collection instance element cells. Where the user has chosen to update rows, each original collection instance is inverted as described above and then a new collection instance is inserted with the modified element cells where one or more transaction segments are created in the heap file and the element cells are added to them.

The following operations occur in the Storage Engine C independently of the native data model used.

When a transaction is opened an available transaction handle is assigned from the pool of available transaction handles and the heap file transaction header is updated with the transaction status (open) but is not written back to storage.

When a transaction is applied, the heap file transaction header is updated with the transaction status (applied) but is not written back to storage. The transaction then waits for the next apply cycle to complete. Any inversion locks held by the transaction are relinquished.

When a transaction is abandoned, the heap file transaction header is updated with the transaction status (abandoned) but is not written back to storage. Any update lock held by the transaction are relinquished.

When an apply cycle completes, all new and updated content in the heap file is written and synchronised back to storage.

When a collection instance is appended to a heap file by a transaction, a collective tunnel is created for the transaction. The tunnel number used is one greater than the last collective tunnel number for the same collection path within this heap file. One or more transaction segments are created for the collective tunnel and a cell corresponding to each element instance value is appended to transaction segments created.

When a collection instance inversion is appended to a heap file by a transaction, a collective tunnel is created for the transaction. The tunnel number used is one greater than the last collective tunnel number for the same collection path within this heap file. One or more transaction segments are created for the collective tunnel. One inversion cell is appended to the created segments followed by a cell corresponding to each element instance value from the original collection instance.

When a DNF expression is being evaluated within the context of a query within an open transaction, For each conjunctive term within the DNF a collection set is created for each predicate operator literal in that conjunctive term as described below. Each operator can generate its own collection set simultaneously with other operators across the DNF.

All collection sets for the same collection path alias are merged together within each conjunctive term such that only set members that occur with the same frame number and collective tunnel number in every collection set in that collection path are retained.

The collection sets within each conjunctive term are bound by the bind operators appearing within the same conjunctive term as described below. The binding of a conjunctive terms can happen simultaneously with the binding of other conjunctive terms.

Each collection set is sorted by sequence order. Collection sets may be sorted simultaneously across the DNF.

Each collection set is used to retrieve data from corresponding collective tunnels and/or combinative cells identified in those collection sets and retrieved in sequence order. The entries for each collection set are retrieved entry by entry synchronously across all collection sets in the conjunctive term and merged entry by entry. Retrieval occurs sequentially across conjunctive terms in the DNF and results de-duplicated so that the same result produced by two conjunctive terms is not repeated.

Where a query only requires measurement element instances to be returned, for each member retrieved, the corresponding combinative tunnels are read from frame files using the collection set frame number; and the collective tunnel numbers are used to address specific rank cells in the rank tunnels; otherwise collective tunnels are read from the frame files using the collection set frame number and collective tunnel numbers.

When a DNF expression (for a single collection path) is being evaluated within the context of an update within an open transaction, For each conjunctive term within the DNF a collection set is created for each predicate operator literal in that conjunctive term as described below. Each operator can generate its own collection set simultaneously with other operators across the DNF.

All collection sets are merged together within each conjunctive term such that only entries that occur with the same frame number and collective tunnel number in every collection set are retained. Thereafter, there will only be one collection set per conjunctive term.

Each collection set is used to directly return the frame number and collective tunnel number. Retrieval occurs sequentially across conjunctive terms and results de-duplicated so that the same result produced by two conjunctive terms is not repeated.

As each result is retrieved, an exclusive lock is requested against the combined frame number and tunnel number. If the lock is not granted immediately, the process must wait until it is granted. A transaction that already owns a lock is granted the lock immediately.

If after a configurable time-out period, the lock has still not been granted, the process relinquishes all collection set resources and locks acquired so far and continues to wait for the lock to be granted. Once the lock has been granted the lock is retained and the DNF evaluation as described here is re-started When binding collection sets within the context of a conjunctive term within a DNF, The collection sets and bind operators are visited in the order as described previously.

As each collection set is visited, the digest tunnel number for each member is populated directly from the digest tunnel map for the binding element path which is accessed by corresponding collection tunnel number; the member ordinal position is populated with the ordinal position of the member within the set.

The digest tunnel and ordinal position are then sorted and re-arranged into ascending frame and digest tunnel and position order; then the digest entries are populated for all entries in tunnel number order in each frame.

As each bind operator is visited, the terminating collection set is attenuated whereby any members that have no corresponding digest tunnel numbers in the originating set have their cardinality reset to zero. This is determined from the cell counts associated with the originating digest tunnels.

The correlated originating members are propagated through the bind operator as described previously. Any two correlating entries across collection sets must have an equivalent digest tunnel number and equivalent digests. If either the tunnel number or digest differs, the members are discounted from potential correlation; otherwise the entries are correlated.

The bind cardinalities are reflected back through the bind operator into the origination collection set as described previously.

As the bind process proceeds, all members relating a previous propagation sequence—that is with a visit ordinal less than the set visit ordinal are discarded.

When generating a collection set for the exists( ) operator in the context of an open transaction, For each heap file in reverse frame order, the transaction segments for this collection path and relevant to this transaction or any closed transaction are navigated in reverse chronological order. For each cell that contains an inversion add the combined frame number and collective tunnel number to a memory based set of inversions. Any cells that contain an element cell for the required element path are included in the collection set provided its combined frame number and collective tunnel number is not included in the memory based set of inversions.

The memory resident frame map for the element path is examined in ascending scale order and within that in descending frame order from the current frame number.

Where a matching frame interval is found (where there exists at least one element) then the frame number that starts that interval is chosen. Ignore frame numbers that relate to heap files already scanned.

If the chosen frame number is not the frame number of the currently open frame file, then the frame file for the collection path collective tunnels and the frame file for the element path tunnel family with the chosen frame number are opened.

The inversion tunnel for the collection path and the existence tunnel for the required element path are read from the opened frame files. A bit map of inversions is created with a clear bit for each collection tunnel in the current frame.

The inversion tunnel is scanned for inversion cells and for each cell found, the combined inverted frame and inverted tunnel number are added to the memory based set of inversions and a bit corresponding to the inverting tunnel is set in the bit map of inversions.

The existence tunnel is scanned for cells that indicate element existence. Any cell that has a corresponding entry in the memory based set of inversions is ignored; otherwise each cell that has a corresponding bit set in the bit map of inversions is ignored; otherwise the frame number and collective tunnel number are added to the collection set.

A collection set entry is always marked as certain.

The element path frame map is read from the currently open frame file related to the element path to determine the next relevant frame and continues as described above until no more frames can be found.

When generating a collection set for the is( ) operator in the context of an open transaction, The connective tunnel number and digest number is derived from the operator operand.

For each heap file in reverse frame order, the transaction segments for this collection path and relevant to this transaction or any closed transaction are navigated in reverse chronological order. For each cell that contains an inversion add the combined frame number and collective tunnel number to a memory based set of inversions. Any cells that contain an identification element cell for the required element path with an equivalent value to the operator operand are included in the collection set provided its combined frame number and collective tunnel number is not included in the memory based set of inversions.

The memory resident frame map for the element path is examined in ascending scale order and within that in descending frame order from the current frame number.

Where a matching frame interval is found (where no common bits in the interval differ from the operator operand) then the frame number that starts that interval is chosen. Ignore frame numbers that relate to heap files already scanned.

If the chosen frame number is not the frame number of the currently open frame file, then the frame files for the collective tunnels and connective tunnels for the collection path with the chosen frame number are opened.

The inversion tunnel for the collection path and the digest tunnel derived from the operator operand are read from the opened frame files. A bit map of inversions is created with a clear bit for each collection tunnel in the current frame.

The inversion tunnel is scanned for inversion cells and for each cell found, the combined inverted frame and inverted tunnel number are added to the memory based set of inversions and a bit corresponding to the inverting tunnel is set in the bit map of inversions.

The digest tunnel is scanned for matching digest cells. Any digest cell that has a corresponding entry in the memory based set of inversions is ignored; otherwise each cell that has a corresponding bit set in the bit map of inversions is ignored; otherwise the frame number and collective tunnel number are added to the collection set.

A collection set entry is marked as certain if the digest cell is sufficiently otherwise it is marked as uncertain where the entry arises from a frame file; whereas entries arising from heap files are always marked as certain.

The element path frame map is read from the currently open frame file related to the element path to determine the next relevant frame and continues as described above until no more frames can be found.

When generating a collection set for the in( ) operator in the context of an open transaction, If both operator operands are positive then let the required sign be positive and let the required range be between the low and high absolute magnitude of the operator operands; otherwise if both operands are negative then let the required sign be negative and the required range be between the low and high absolute magnitude of the operator operands; otherwise divide the search into two with a required range between the minimum operator operand and zero and a required sign of negative and a range between zero and the maximum operator operand and zero and a required sign of positive.

Both bounds of the required range are normalised into a fixed number of significand bytes around a fixed radix point. The determinant rank is determined from the normalised bounds where the pivot rank is the lowest rank with a common significand byte in both normalised bounds. Refer to the common byte value at the pivot rank as the pivot value.

For each heap file in reverse frame order, the heap segments for the collection path and relevant to this transaction or any closed transaction are navigated in reverse chronological order. For each cell that contains an inversion add the combined frame number and collective tunnel number to a memory based set of inversions. Any cells that contain a measurement element cell for the required element path with a value within the required range and required sign are included in the collection set provided its combined frame number and collective tunnel number is not included in the memory based set of inversions.

The memory resident frame map for the element path is examined in ascending scale order and descending frame order from the current frame number.

Where a matching frame interval is found (where the frame interval range overlaps the operator operand range) then the frame number that starts that interval is chosen. Ignore frame numbers that relate to heap files already scanned.

If the chosen frame number is not the frame number of the currently open frame file, then the frame files for collective tunnels and combinative tunnels for the collection path with the chosen frame number are opened.

The existence tunnel, sign tunnel and all combinative tunnels for the element path are read from the element path frame file and the inversion tunnel is read from the collection path frame file. A bit map of inversions is created with a clear bit for each collection tunnel in the current frame.

The inversion tunnel is scanned for inversion cells and for each cell found, the combined inverted frame and inverted tunnel number are added to the memory based set of inversions and a bit corresponding to the inverting tunnel is set in the bit map of inversions.

The cell counts for the combinative tunnel for the pivot rank are examined to see if any relevant cells exist for the pivot value. If not, move on to the prior frame in the current frame map and continue as above.

For each rank from the highest rank down to the pivot rank, use the cell counts to find the lowest rank where all cells are zero in the tunnels above that rank and where the corresponding rank value in both operands is zero. Refer to this rank as the high rank.

For each rank from the lowest rank up to the pivot rank, use the cell counts to find the highest rank where all cells are zero in the tunnels below that rank and where the corresponding rank value in both operands is zero. Refer to this rank as the low rank.

The combinative tunnel for the pivot rank is scanned for rank cells that match the pivot byte. A rank cell that does not have a corresponding existence cell is ignored; otherwise a rank cell that has a corresponding entry in the memory based set of inversions is ignored; otherwise each cell that has a corresponding bit set in the bit map of inversions is ignored; otherwise consult the corresponding sign cell and rank cells between the high rank and low rank to ensure that the sign is the required sign and combined tunnel rank magnitude is within the required range and if so, the frame number and collective tunnel number are added to the collection set.

A collection set entry is marked as certain.

The element path frame map is read from the currently open frame file related to the element path to determine the next relevant frame and continues as described above until no more frames can be found.

When generating a collection set for the has( ) operator in the context of an open transaction, The characteristic tunnel numbers are derived from the operator operands.

For each heap file in reverse frame order, the heap segments for the collection path and relevant to this transaction or any closed transaction are navigated in reverse chronological order. For each cell that contains an inversion add the combined frame number and collective tunnel number to a memory based set of inversions. Any cells that contain an enumeration element cell for the required element path which contain all of the operator property operands are included in the collection set provided its combined frame number and collective tunnel number is not included in the memory based set of inversions.

The memory resident frame map for the element path is examined in ascending scale order and then in descending frame order from the current frame number.

Where a matching frame interval is found (where all required characteristic tunnel numbers have their bits set) then the frame number that starts that interval is chosen. Ignore frame numbers that relate to heap files already scanned.

If the chosen frame number is not the frame number of the currently open frame file, then the frame files for collective tunnels and characteristic tunnels for the collection path with the chosen frame number are opened.

The existence tunnel and the required characteristic tunnels derived from the operator operands are read from the element path frame file and the inversion tunnel is read from the collection path frame file. A bit map of inversions is created with a clear bit for each collection tunnel in the current frame.

The inversion tunnel is scanned for inversion cells and for each cell found, the combined inverted frame and inverted tunnel number are added to the memory based set of inversions and a bit corresponding to the inverting tunnel is set in the bit map of inversions.

The required characteristic tunnels are conjunctively combined as a bit map wherein only bit positions that have a bit set at corresponding collection instances in all required characteristic tunnels are set. The combined bit map is scanned for set bits and any set bit that does not have a corresponding existence cell is ignored and any set bit that has a corresponding entry in the memory based set of inversions is ignored; otherwise each cell that has a corresponding bit set in the bit map of inversions is ignored; otherwise the frame number and collective tunnel number are added to the collection set.

A collection set entry is marked as certain where the property tunnel number is derived from a unique property ordinal and (M−N)<P<2N where P is the property ordinal, M is the maximum ordinal assigned and N is the number of property tunnels where the entry arises from a frame file; whereas entries arising from heap files are always marked as certain.

The element path frame map is read from the currently open frame file related to the element path to determine the next relevant frame and continues as described above until no more frames can be found.

When generating a collection set for the true( ) operator in the context of an open transaction, For each heap file in reverse frame order, the transaction segments for this collection path and relevant to this transaction or any closed transaction are navigated in reverse chronological order. For each cell that contains an inversion add the combined frame number and collective tunnel number to a memory based set of inversions. Any collection instance identities for the required collection path are included in the collection set provided its combined frame number and collective tunnel number is not included in the memory based set of inversions.

The memory resident frame map for the collection path is examined at the lowest scale in descending frame order from the current frame number. Ignore frame numbers that relate to heap files already scanned.

Where a frame map entry indicates one or more inversions then open the collective frame file and read the inversion tunnel; a bit map of inversions is created with a clear bit for each collection tunnel in the current frame; scan the inversion tunnel and for each inversion cell found add the combined inverted frame and inverted tunnel numbers to the memory based set of inversions for each inversion found and the bit corresponding to the inverting tunnel is set in the bit map of inversions.

Append a contiguous sequence of collection instance tunnels starting at tunnel 1 and finishing at the number of collection instances specified by the frame map but excluding those that either have an bit set in the bit map of inversions or have a corresponding entry in the memory based set of inversions. The frame number of these entries is the frame number used to inspect the frame map entry.

A collection set entry is always marked as certain.

The collection path frame map is read from the currently open frame file continues as described above with the preceding frame. This continues as described above until no more frames can be found.

When materialising a conjunctive term in the context of an open transaction,

For each uncertain entry in a collection set the corresponding collective tunnel must be read and the corresponding element instance must be inspected to determine certainty or impossibility.

Where an element instance is subsequently deemed impossible, its cardinality is marked as zero and the entry is treated as void in the collection set and voids all corresponding entries during the merge of collection sets within a conjunctive term.

When migrating segments from a heap file into a frame file,

Only segments that that relate to applied transactions which have not yet been migrated are migrated. Segments that relate to abandoned transactions are ignored. Segments that relate to open transactions are counted.

Migrate each collection path individually in turn.

Create a memory sector map and tunnels for each tunnel family and each element path within the collection path. Initialise the tunnel link at the start of each tunnel as the prior frame.

Prior to migrating a collection path, read the frame maps for the collection path and its related element paths into memory from the frame files that precede the frame being migrated.

Prior to migrating a collection path, read the storage maps; the inversion tunnel for the collection path and the tunnels for all related element path tunnels into memory from any frame files that are required to be accumulated into the frame being migrated.

For each segment being migrated, create a new collective tunnel in memory and copy the segment cells into the collective tunnel. For an inversion, append an inversion cell to the inversion tunnel. Update the collection path frame map as described previously. Then migrate each element cell within the segment and update the collection path storage map.

For each identification element construct a digest cell, as described previously, and append it to the related digest tunnel. Append the digest tunnel number to the tunnel map. Append an existence cell to the element path existence tunnel. Update the element path frame map from the element value as described previously and update the element path storage map.

For each measurement element construct a rank cell for each rank tunnel, as described previously, and append them to the related rank tunnels. Append an existence cell to the element path existence tunnel. Update the element path frame map from the element value as described previously and update the element path storage map.

For each enumeration element construct a property cell for each property tunnel, as described previously, and append them to the related property tunnels. Append an existence cell to the element path existence tunnel. Update the element path frame map from the element value as described previously and update the element path storage map.

After migrating every element cell in a segment, append a non-existence cell to the existence tunnel for every element path not included in the segment; append zero rank cells to every rank tunnel in all non-existent element paths in the segment; append non-existent property cells to every property tunnel in all non-existent element paths in the segment.

After migrating all segments, create frame files using the highest heap file frame number and overwrite any such frame files that might already exist. Write the sector maps, frame maps and tunnels to each frame file.

Mark all migrated transaction handles in the heap file as migrated and synchronise the heap file back to storage.

Make each migrated transaction handle available for re-use.

If the heap file contains any segments relating to open transactions then retain the heap file otherwise delete it.

Described above are apparatus, systems, and methods meeting the objects set forth previously, among others. It will be appreciated that the embodiments discussed and shown herein are merely examples of the invention and that other embodiments, incorporating changes to that shown and described here, fall within the scope of the invention, of which I claim:

The invention claimed is:

1. A data storage and/or retrieval system implemented on one or more digital data processing systems, comprising:
    storage media comprising a plurality of data tunnels, one or more of said plurality of data tunnels having a plurality of data cells, wherein the plurality of data tunnels include a plurality of entity type data tunnels for each of a plurality of entity types and a plurality of attribute data tunnels for each of a plurality of attributes, wherein a number of data tunnels for each attribute is fixed for a given attribute,
    wherein each of the data cells contain data associated with a respective instance of an attribute for a respective and distinct instance of an entity type,
    wherein each of the data cells of the plurality of attribute data tunnels has data for which a respective operator evaluates to a boolean result indicating either the likely possibility or the impossibility of the attribute instance corresponding to said data cell being characterised by said operator for a given set of one or more operands, and
    a storage engine that is in communications coupling with the storage media and that accesses one or more of the plurality of data tunnels based on one or more of said operators and a given set of one or more operands.

2. The data storage and/or retrieval system of claim 1,
    wherein plurality of entity type data tunnels comprise a plurality of connective data tunnels, the plurality of attribute data tunnels comprise a plurality of connective data tunnels, and the plurality of data cells of said connective data tunnels are connective data cells,
    wherein each respective instance of an attribute has one respective connective data cell in only one respective connective data tunnel,
    wherein each of the connective data cells has data for which a respective equivalence operator evaluates to a boolean result which indicates either the likely possibility or the impossibility of the attribute instance corresponding to said connective data cell being equivalent for a given set of one or more operands, and
    wherein the storage engine accesses one or more of the plurality of connective data tunnels based on one or more of said equivalence operators and a given set of one or more operands.

3. The data storage and/or retrieval system of claim 2, wherein:
    the majority of the connective data cells yield a like result for a given set of one or more operands.

4. The data storage and/or retrieval system of claim 3, wherein:
    each of the connective data cells contains a digest of the attribute instance corresponding to said connective data cell, and
    the respective connective data tunnel for each instance of an attribute is chosen from a defined hash encoding of the respective instance of the attribute and by applying a modulo of the number of the plurality of connective data tunnels to said hash encoding.

5. The data storage and/or retrieval system of claim 4, wherein the digest is the value of the attribute instance corresponding to said connective data cell when the size of said attribute instance is sufficiently small, whereby the equivalence operator can be certain of equivalence.

6. The data storage and/or retrieval system of claim 1,
    wherein the plurality of entity type data tunnels comprise a plurality of combinative data tunnels, the plurality of attribute data tunnels comprise a plurality of combinative data tunnels, and the plurality of data cells of said combinative data tunnels are combinative data cells,
    wherein each respective instance of an attribute has one respective combinative data cell in all respective combinative data tunnels,
    wherein each of the combinative data cells has data for which a respective bounding operator evaluates to a boolean result which indicates either the likely possibility or the impossibility of the attribute instance corresponding to said combinative data cell being bounded for a given set of one or more operands, and
    wherein the storage engine accesses one or more of the plurality of combinative data tunnels based on one or more of said bounding operator and a given set of one or more operands.

7. The data storage and/or retrieval system of claim 6, wherein
    each instance of a respective attribute is expressed in unitary scale and as a significand with respect to a fixed radix point,
    each of the combinative data tunnels is respective to part of the significand,
    all of the combinative data tunnels are mutually exclusive in respect of the signficand, and
    all of the combinative data tunnels enclose the whole of the signficand.

8. The data storage and/or retrieval system of claim 1,
    wherein the plurality of entity type data tunnels comprise a plurality of characteristic data tunnels, the plurality of attribute data tunnels comprise a plurality of characteristic data tunnels, and the plurality of data cells of said characteristic data tunnels are characteristic data cells,
    wherein each respective instance of an attribute has one respective characteristic data cell in all respective characteristic data tunnels,
    wherein each of the characteristic data cells has data for which a respective possessive operator evaluates to a boolean result which indicates either the likely possibility or the impossibility of the attribute instance corresponding to said characteristic data cell possessing a property for a given set of one or more operands, and
    wherein the storage engine accesses one or more of the plurality of characteristic data tunnels based on one or more of said possessive operator and a given set of one or more operands.

9. The data storage and/or retrieval system of claim 8, wherein:
    each of the characteristic data tunnels is respective of one or more properties, and
    each of the characteristic data cells contains a boolean indication of possession of a respective property by the attribute instance corresponding to said characteristic data cell.

10. The data storage and/or retrieval system of claim 9, wherein each of the characteristic data tunnels is chosen to be respective of a property by hash encoding the property identity and applying a modulo of the number of the plurality of characteristic data tunnels to said hash encoding.

11. The data storage and/or retrieval system of claim 9, wherein each of the characteristic data tunnels is chosen to be respective of a property by assigning a strictly monotonically increasing ordinal to each unique property identity and applying a modulo of the number of the plurality of characteristic data tunnels to said ordinal; whereby the possessive operator can be certain of possession if $(M-T)<P\leq 2T$ where P is the ordinal of the property; M is the maximum ordinal assigned; and T is the number of characteristic data tunnels.

12. The data storage and/or retrieval system of claim 9, wherein each of the characteristic data tunnels is chosen to be respective of a property by assigning a strictly monotonically increasing ordinal to each unique property identity for the respective attribute and applying a modulo of the number of the plurality of characteristic data tunnels to said ordinal; whereby the possessive operator can be certain of possession if $(M-T)<P\leq 2T$ where P is the ordinal of the property; M is the maximum ordinal assigned for the respective attribute: and T is the number of characteristic data tunnels.

13. The data storage and/or retrieval system of claim 1, wherein the plurality of entity type data tunnels comprise a plurality of collective data tunnels, the plurality of attribute data tunnels comprise a plurality of collective data tunnels, and the plurality of data cells of said collective data tunnels are collective data cells,
wherein each of the collective data cells contain data which is characterised as one of identity, measurement, enumeration or opacity.

14. The data storage and/or retrieval of claim 13, wherein a collective data cell characterised as one of identity comprises a sequence of bits that denote an identity such that certainty of equivalence of identity for the attribute instance corresponding to said collective data cell can be determined by comparison of said bits in like sequence order.

15. The data storage and/or retrieval system of claim 13, wherein a collective data cell characterised as one of measurement comprises a sign bit, a plurality of significand bits and a plurality of exponent bits such that certainty of the attribute instance corresponding to said collective data cell being bounded by a range can be determined by comparison of the respective sign, significand and exponent bits.

16. The data storage and/or retrieval system of claim 13, wherein a collective data cell characterised as one of enumeration comprises a plurality of properties, wherein each property comprises a sequence of bits such that certainty of possession of a property by the attribute instance corresponding two said collective data cell can be determined by a comparison of said bits in like sequence order for one or more respective properties.

17. The data storage and/or retrieval system of claim 13, wherein each of the plurality of data tunnels is individually encrypted during write access to the storage media and individually decrypted during read access from the storage media.

18. The data storage and/or retrieval system of claim 13, wherein each of the plurality of data cells is individually encrypted during write access to the storage media and individually decrypted during read access from the storage media.

19. A data storage and/or retrieval system implemented on one or more digital data processing systems, comprising:

storage media comprising a plurality of connective data tunnels, one or more of said plurality of connective data tunnels having a plurality of connective data cells, wherein the plurality of connective data tunnels include a plurality of entity type data tunnels for each of a plurality of entity types and a plurality of attribute data tunnels for each of a plurality of attributes, wherein a number of connective data tunnels for each attribute is fixed for a given attribute,
wherein each of the connective data cells contain data associated with a respective instance of an attribute for a respective and distinct instance of an entity type,
wherein each respective instance of an attribute has one respective connective data cell in only one respective connective data tunnel,
wherein each of the connective data cell of the attribute tunnels has data for which a respective equivalence operator evaluates to a boolean result which indicates either the likely possibility or the impossibility of the attribute instance corresponding to said data cell being equivalent for a given set of one or more operands, and
a storage engine that is in communications coupling with the storage media and that accesses one or more of the plurality of connective data tunnels based on one or more of said equivalence operators and a given set of one or more operands.

20. The data storage and/or retrieval system of claim 1, wherein a specific set of one or more data tunnels are accessed for each of the said operators and their respective operands, that comprise a query.

21. The data storage and/or retrieval system of claim 20, wherein one or more data tunnels are accessed independently and simultaneously for the evaluation of each said operators and their respective operands.

22. The data storage and/or retrieval system of claim 20, wherein each of a plurality of operator evaluations includes a boolean indication of certainty or uncertainty for each respective attribute instance deemed likely possible.

23. The data storage and/or retrieval system of claim 22, wherein operator evaluations are combined conjunctively for a common respective entity type such that some uncertain respective entity instances may be discarded from operator evaluations.

24. The data storage and/or retrieval system of claim 22, wherein subsequent materialisation of an operator evaluation can resolve any uncertainty by inspecting a respective collective data cell for a respective instance of an attribute deemed uncertain.

25. The data storage and/or retrieval system of claim 22, wherein data tunnels are read accessed in bulk from the storage media for the evaluation of each of said operators and their respective operands.

26. The data storage and/or retrieval system of claim 1, wherein distinct attributes may be correlated by the equivalence of their respective instances by comparison of their respective data cells in corresponding data tunnels.

27. The data storage and/or retrieval system of claim 1, wherein distinct attributes may be correlated by the equivalence of their respective instances by comparison of their respective connective data cells in corresponding connective data tunnels.

28. The data storage and/or retrieval system of claim 1, wherein the plurality of data tunnels and respective operators relate to —instances of entities of arbitrary structure.

29. The data storage and/or retrieval system of claim 28, wherein a plurality of the data tunnels are connective data tunnels, and the plurality of connective data tunnels and respective operators relate to instances of entities of arbitrary structure.

30. The data storage and/or retrieval system of claim 28, wherein a plurality of the data tunnels are combinative data tunnels, and the plurality of combinative data tunnels and respective operators relate to instances of entities of arbitrary structure.

31. The data storage and/or retrieval system of claim 28, wherein a plurality of the data tunnels are characteristic data tunnels, and the plurality of characteristic data tunnels and respective operators relate to instances of entities of arbitrary structure.

32. The data storage and/or retrieval system of claim 28, wherein the plurality of data tunnels and respective operators relate to instances of an entity type wherein distinct instances of said entity type differ in structure.

33. The data storage and/or retrieval system of claim 32, wherein a plurality of the data tunnels are connective data tunnels, and the plurality of connective data tunnels and respective operators relate to instances of an entity type wherein distinct instances of said entity type differ in structure.

34. The data storage and/or retrieval system of claim 32, wherein a plurality of the data tunnels are combinative data tunnels, and the plurality of combinative data tunnels and respective operators relate to instances of an entity type wherein distinct instances of said entity type differ in structure.

35. The data storage and/or retrieval system of claim 32, wherein a plurality of the data tunnels are characteristic data tunnels, and the plurality of characteristic data tunnels and respective operators relate to instances of an entity type wherein distinct instances of said entity type differ in structure.

36. The data storage and/or retrieval system of claim 1, wherein the plurality of data cells of the plurality of attribute data tunnels consist of data independent of the domain and the encoding for their respective attribute whereby distinct instances of said attribute may differ in domain or encoding.

37. The data storage and/or retrieval system of claim 36, wherein the plurality of data cells of the plurality of attribute data tunnels are connective data cells, and the connective data cells consist of data independent of the domain and the encoding for their respective attribute whereby distinct instances of said attribute may differ in domain or encoding.

38. The data storage and/or retrieval system of claim 36, wherein the plurality of data cells of the plurality of attribute data tunnels are combinative data cells, and the combinative data cells consist of data independent of the domain and the encoding for their respective attribute whereby distinct instances of said attribute may differ in domain or encoding.

39. The data storage and/or retrieval system of claim 36, wherein the plurality of data cells of the plurality of attribute data tunnels are characteristic data cells, and the characteristic data cells consist of data independent of the domain and the encoding for their respective attribute whereby distinct instances of said attribute may differ in domain or encoding.

40. The data storage and/or retrieval system of claim 1, wherein
the plurality of data tunnels are connective data tunnels and the plurality of data cells are connective data cells,
each of the connective data cells of the plurality of attribute data tunnels has data for which a respective equivalence operator evaluates to a boolean result which indicates either the likely possibility or impossibility of the attribute instance corresponding to said data cell being equivalent for a given set of one or more operands and where the majority of connective data cells yield a like result for a given set of one or more operands, and
the storage engine accesses one or more of the plurality of connective data tunnels based on one or more of said equivalence operator and a given set of one or more operands.

41. A method of data storage and/or retrieval implemented on one or more digital data processing systems, comprising:
providing storage media comprising a plurality of data tunnels, one or more of said plurality of data tunnels having a plurality of data cells, wherein the plurality of data tunnels include a plurality of entity type data tunnels for each of a plurality of entity types and a plurality of attribute data tunnels for each of a plurality of attributes wherein a number of data tunnels for each attribute is fixed for a given attribute,
wherein each of the data cells contain data associated with a respective instance of an attribute for a respective and distinct instance of an entity type,
wherein each of the data cells of the plurality of attribute data tunnels has data for which a respective operator evaluates to a boolean result indicating either the likely possibility or the impossibility of the attribute instance corresponding to said data cell being characterised by said operator for a given set of one or more operands, and
accessing, with a storage engine that is in communications coupling with the storage media, one or more of the plurality of data tunnels based on one or more of said operators and a given set of one or more operands.

42. The method of claim 41, wherein
the plurality of data cells include a connective data cell that contains a digest of the attribute instance corresponding said connective data cell,
the plurality of data tunnels include a plurality of connective data tunnels, which include a respective connective data tunnel that is chosen from a defined hash encoding of the attribute instance corresponding to said connective data cell and by applying a modulo of the number of the plurality of connective data tunnels to said hash encoding.

43. The method of claim 42, wherein the digest of the attribute instance corresponding to said connective data cell is the value of the attribute instance itself when the size of the attribute instance is sufficiently small, whereby the equivalence operator can be certain of equivalence.

44. The method of claim 41, wherein
each instance of a respective attribute is expressed in unitary scale and as a significand with respect to a fixed radix point,
each of a plurality of combinative data tunnels is respective to part of the significand,
all of the combinative data tunnels are mutually exclusive in respect of the significand
all of he combinative data tunnels enclose the whole of the significand.

45. The method of claim 44, further comprising, for the evaluation of a bounding operator during read access of said combinative data tunnels, the steps of:
converting each respective boundary operand in the bounding operator to a significand of unitary scale with a fixed radix point;
comparing the significand bits of respective boundary operands in descending significance order to find the first significant bit that differs between said operands and taking all prior common bits as a determinant data value;

finding the combinative data tunnel of lowest significance that comprises a strict subset of the significance of said determinant value and taking said combinative data tunnel as the determinant data tunnel;

accessing the determinant data tunnel first before other combinative data tunnels respective of said attribute;

inspecting all combinative data cells of said determinant data tunnel and deeming the relevance of each respective entity instance as impossible for said bounding operator where said combinative data cell is not equal to the said determinant data value; whereby only combinative data cells, respective of entity instances not deemed of impossible relevance, in combinative data tunnels other than said determinant data tunnel need be inspected for the purposes of determining relevance of respective entity instances to the respective bounding operator and its respective operands.

46. The method of claim 41, wherein
each of a plurality of characteristic data tunnels is respective of one or more properties, and
a characteristic data cell of said characteristic data tunnels contains a boolean indication of possession of a respective property by the attribute instance corresponding to said characteristic data cell.

47. The method of claim 46, wherein each of the characteristic data tunnels is chosen to be respective of a property by hash encoding the property identity and applying a modulo of the number of the plurality of characteristic data tunnels to said hash encoding.

48. The method of claim 46, wherein each of the characteristic data tunnels is chosen to be respective of a property by assigning a strictly monotonically increasing ordinal to each unique property identity and applying a modulo of the number of the plurality of characteristic data tunnels to said ordinal; whereby the possessive operator can be certain of possession if $(M-T)<P<2T$ where P is the ordinal of the property; M is the maximum ordinal assigned; and T is the number of characteristic data tunnels.

49. The method of claim 46, wherein each of the characteristic data tunnels is chosen to be respective of a property by assigning a strictly monotonically increasing ordinal to each unique property identity for the respective attribute and applying a modulo of the number of the plurality of characteristic data tunnels to said ordinal; whereby the possessive operator can be certain of possession if $(M-T)<P<2T$ where P is the ordinal of the property; M is the maximum ordinal assigned for the respective attribute; and T is the number of characteristic data tunnels.

50. The method of claim 41, wherein the plurality of data cells include a plurality of collective data cells, and wherein a collective data cell characterised as one of identity comprises a sequence of bits that denote an identity such that certainty of equivalence of identity for the attribute instance corresponding to said collective data cell can be determined by comparison of said bits in like sequence order.

51. The method of claim 41, wherein the plurality of data cells include a plurality of collective data cells, and wherein a collective data cell characterised as one of measurement comprises a sign bit, a plurality of significand bits and a plurality of exponent bits such that certainty of the attribute instance corresponding to said collective data cell bounded by a range can be determined by comparison of the respective sign, significand and exponent bits.

52. The method of claim 41, wherein the plurality of data cells include a plurality of collective data cells, and wherein a collective data cell characterised as one of enumeration comprises a plurality of properties, wherein each property comprises a sequence of bits such that certainty of possession of a property by the attribute instance corresponding to said collective data cell can be determined by a comparison of said bits in like sequence order for one or more respective properties.

53. The method of claim 41, wherein each of the plurality of data tunnels is individually encrypted during write access to the storage media and individually decrypted during read access from the storage media.

54. The method of claim 41, wherein each of the plurality of data cells is individually encrypted during write access to the storage media and individually decrypted during read access from the storage media.

55. The method of claim 41, wherein a specific set of one or more data tunnels are accessed for each of the said operators and their respective operands, that comprise a query.

56. The method of claim 55, wherein one or more data tunnels are accessed independently and simultaneously for the evaluation of each said operators and their respective operands.

57. The method of claim 55, wherein each of a plurality of operator evaluations includes a boolean indication of certainty or uncertainty for each respective attribute instance deemed likely possible.

58. The method of claim 57, wherein operator evaluations are combined conjunctively for a common respective entity type such that some uncertain respective entity instances may be discarded from operator evaluations.

59. The method of claim 57, wherein subsequent materialisation of an operator evaluation can resolve any uncertainty by inspecting a respective collective data cell for a respective instance of an attribute deemed uncertain.

60. The method of claim 55, wherein data tunnels are read accessed in bulk from the storage media for the evaluation of each of said operators and their respective operands.

61. The method of claim 41, wherein distinct attributes may be correlated by the equivalence of their respective instances by comparison of their respective data cells in corresponding data tunnels.

62. The method of claim 41, wherein distinct attributes may be correlated by the equivalence of their respective instances by comparison of their respective connective data cells in corresponding connective data tunnels.

63. The method of claim 41, wherein the plurality of data tunnels and respective operators relate to —instances of entities of arbitrary structure.

64. The method of claim 63, wherein a plurality of the data tunnels are connective data tunnels, and the plurality of connective data tunnels and respective operators relate to instances of entities of arbitrary structure.

65. The method of claim 63, wherein a plurality of the data tunnels are combinative data tunnels, and the plurality of combinative data tunnels and respective operators relate to instances of entities of arbitrary structure.

66. The method of claim 63, wherein a plurality of the data tunnels are characteristic data tunnels, and the plurality of characteristic data tunnels and respective operators relate to instances of entities of arbitrary structure.

67. The method of claim 63, wherein the plurality of data tunnels and respective operators relate to instances of an entity type wherein distinct instances of said entity type differ in structure.

68. The method of claim 67, wherein a plurality of the data tunnels are connective data tunnels, and the plurality of connective data tunnels and respective operators relate to instances of an entity type wherein distinct instances of said entity type differ in structure.

69. The method of claim 67, wherein a plurality of the data tunnels are combinative data tunnels, and the plurality of combinative data tunnels and respective operators relate to instances of an entity type wherein distinct instances of said entity type differ in structure.

70. The method of claim 67, wherein a plurality of the data tunnels are characteristic data tunnels, and the plurality of characteristic data tunnels and respective operators relate to instances of an entity type wherein distinct instances of said entity type differ in structure.

71. The method of claim 41, wherein the plurality of data cells of the plurality of attribute data tunnels consist of data independent of the domain and the encoding for their respective attribute whereby distinct instances of said attribute may differ in domain or encoding.

72. The method of claim 71, wherein the plurality of data cells of the plurality of attribute data tunnels are connective data cells, and the connective data cells consist of data independent of the domain and the encoding for their respective attribute whereby distinct instances of said attribute may differ in domain or encoding.

73. The method of claim 71, wherein the plurality of data cells of the plurality of attribute data tunnels are combinative data cells, and the combinative data cells consist of data independent of the domain and the encoding for their respective attribute whereby distinct instances of said attribute may differ in domain or encoding.

74. The method of claim 71, wherein the plurality of data cells of the plurality of attribute data tunnels are characteristic data cells, and the characteristic data cells consist of data independent of the domain and the encoding for their respective attribute whereby distinct instances of said attribute may differ in domain or encoding.

75. The method of claim 41, further comprising, for discerning from a database schema the operators and respective data tunnels that are applicable to a respective attribute, the steps of:
discerning an applicability of an equivalence operator from relationship constraints for said attribute such that data for instances of said attribute are stored in connective data cells within connective data tunnels respective of said attribute;
discerning the applicability of a bounding operator from the numerical or time domain or arithmetic domain constraints for said attribute such that data for instances of said attribute are stored in combinative data cells within combinative data tunnels respective of said attribute;
discerning the applicability of a possessive operator from the character domain or enumeration domain constraints for said attribute such that data for instances of said attribute are stored in characteristic data cells within characteristic data tunnels respective of said attribute; and
discerning the inapplicability of said operators from the object or binary domain or external reference for said attribute such that data for instances of said attribute are not stored in any connective, combinative or characteristic data tunnels respective of said attribute.

76. The method of claim 75, further comprising, for discerning from a relational database schema the operators and respective data tunnels that are applicable to a respective attribute, the steps of:
discerning an applicability of an equivalence operator from primary key and foreign key constraints for said attribute such that data for instances of said attribute are stored in connective data cells within connective data tunnels respective of said attribute;
discerning the applicability of a bounding operator from the numerical or time domain or arithmetic check constraints for said attribute such that data for instances of said attribute are stored in combinative data cells within combinative data tunnels respective of said attribute;
discerning the applicability of a possessive operator from the character domain or enumeration check constraints for said attribute such that data for instances of said attribute are stored in characteristic data cells within characteristic data tunnels respective of said attribute; and
discerning the inapplicability of said operators from the large object domain or external reference for said attribute such that data for instances of said attribute are not stored in any connective, combinative or characteristic data tunnels respective of said attribute.

77. The method of claim 41, further comprising, for accessing data tunnels for the purpose of materialising a query result, the steps of:
re-factoring the query expression to produce a disjunctive normal form expression of operators and their respective operands;
removing each operator and respective operands from each conjunctive term of said disjunctive normal form expression where the outcome of said operator is implied by one or more other operators in the same said conjunctive term;
removing each conjunctive term from said disjunctive normal form expression where said conjunctive term contains an operator and respective operands that is deemed to be always false;
evaluating each operator of said disjunctive normal form expression where said operator is respective of a single entity type to produce a separate relevant set of entity instances for each said operator independently and simultaneously for each said operator, for storage in computer memory;
reducing said relevant sets of entity instances where said sets are respective of a common entity type such that members of said sets not respective to every said set for said entity are discarded to produce a common set of entity instances for said entity type independently and simultaneously for each respective entity type in each conjunctive term of said disjunctive normal form, for storage in computer memory;
correlating said common sets of entity instances for said entity types paired by binding operators in a sequence to produce a correlated set of entity instances for each respective entity type independently and simultaneously for each said conjunctive term, for storage in computer memory;
accessing data tunnels respective to each said correlated set of entity instances to produce a set of query result instances independently and separately for each respective entity type independently and simultaneously for each said conjunctive term, for storage in computer memory;
marking query result instances as void where query result instances conflict with the respective conjunctive term independently and simultaneously for each said conjunctive term, for storage in computer memory; and
merging said sets of query result instances for each said conjunctive term such that respective query result instances from each said set are combined into a single set of query result instances, for storage in computer memory, 78. The method of claim 77, further comprising, for correlating said common sets of entity instances within said conjunctive term for the purpose of producing a correlated set of entity instances, the steps of
- correlating pairs of common sets of entity instances across a mutually respective bind operator in a defined visit sequence of bind operators, for storage in computer memory; and
- updating the cardinality of entity instances in respective correlated sets of entity instances in reverse order of said visit sequence, for storage in computer memory.

79. The method of claim 78, further comprising, for deciding said visit sequence of said bind operators with said conjunctive term, the steps of:
- selecting a common set of entity instances with the least number of respective entity instances within said conjunctive term as the origin set of entity instances;
- selecting one of the said bind operators respective to the said origin set of entity instances as the first bind operator in the said visit sequence;
- selecting a subsequent bind operator from those bind operators respective to the same common set of entity instances as the bind operator most recently visited and which have not appeared in the said visit sequence or which have already appeared in said visit sequence but have been affected by a bind operator subsequently visited; and
- repeating the prior step until no more bind operators are available to be selected; such that correlated sets of entity instances are produced in the said visit sequence for storage in computer memory.

80. A method of data storage and/or retrieval implemented on one or more digital data processing systems, comprising:
- providing storage media comprising a plurality of connective data tunnels, one or more of said plurality of connective data tunnels having a plurality of connective data cells, wherein the plurality of connective data tunnels include a plurality of entity type data tunnels each of a plurality of entity types and a plurality of attribute data tunnels for each of a plurality of attributes, wherein a number of data tunnels for each attribute is fixed for a given attribute,
- wherein each of the connective data cells contain data associated with a respective instance of an attribute for a respective and distinct instance of an entity type,
- wherein each respective instance of an attribute has one respective connective data cell in only one respective connective data tunnel,
- wherein each of the connective data cells of the plurality attribute data tunnels has data for which a respective equivalence operator evaluates to a boolean result which indicates either the likely possibility or impossibility of the attribute instance corresponding to said connective data cell being equivalent for a given set of one or more operands, and
- accessing, with a storage engine that is in communications coupling with the storage media, one or more of the plurality of connective data tunnels based on one or more of said equivalence operators and a given set of one or more operands.

81. A data storage and/or retrieval system, comprising:
- storage media comprising a plurality of combinative data tunnels, one or more of said plurality of combinative data tunnels having a plurality of combinative data cells, wherein the plurality of combinative data tunnels include a plurality of entity type data tunnels for each of a plurality of entity types and a plurality of attribute data tunnels for each of a plurality of attributes, wherein a number of combinative data tunnels for each attribute is fixed for a given attribute,
- wherein each of the combinative data cells contain data associated with a respective instance of an attribute for a respective and distinct instance of an entity type,
- wherein each respective instance of an attribute has one respective combinative data cell in all respective combinative data tunnels,
- wherein each of the combinative data cells of the plurality of attribute data tunnels has data for which a respective bounding operator evaluates to a boolean result which indicates either the likely possibility or the impossibility of the attribute instance corresponding to said combinative data cell being bounded for a given set of one or more operands, and
- a storage engine that is in communications coupling with the storage media and that accesses one or more of the plurality of combinative data tunnels based on one or more of said bounding operator and a given set of one or more operands.

82. A method of data storage and/or retrieval implemented on one or more digital data processing systems, comprising:
- providing storage media comprising a plurality of combinative data tunnels, one or more of said plurality of combinative data tunnels having a plurality of combinative data cells, wherein the plurality of combinative data tunnels include a plurality of entity type data tunnels for each of a plurality of entity types and a plurality of attribute data tunnels for each of a plurality attributes, wherein a number of combinative data tunnels for each attribute is fixed for a given attribute,
- wherein each of the combinative data cells contain data associated with a respective instance of an attribute for a respective and distinct instance of an entity type,
- wherein each respective instance of an attribute has one respective combinative data cell in all respective combinative data tunnels,
- wherein each of the combinative data cells of the plurality of attribute data tunnels has data for which a respective bounding operator evaluates to a boolean result which indicates either the likely possibility or the impossibility of the attribute instance corresponding to said combinative data cell being bounded for a given set of one or more operands, and
- accessing, with a storage engine that is in communications coupling with the storage media, one or more of the plurality of combinative data tunnels based on one or more of said bounding operator and a given set of one or more operands.

83. A data storage and/or retrieval system, comprising:
- providing storage media comprising a plurality of characteristic data tunnels, one or more of said plurality of characteristic data tunnels having a plurality of characteristic data cells, wherein the plurality of characteristic data tunnels include a plurality of entity type data tunnels for each of a plurality of entity types and a plurality of attribute data tunnels for each of plurality of attributes, wherein a number of characteristic data tunnels for each attribute is fixed for a given attribute,
- wherein each of the characteristic data cells contain data associated with a respective instance of an attribute for a respective and distinct instance of an entity type,
- wherein each respective instance of an attribute has one respective characteristic data cell in all respective characteristic data tunnels, wherein each of the characteristic data cells of the plurality of attribute data tunnels has data for which a respective possessive operator evaluates to a boolean result which indicates either the likely possibility or the impossibility of the attribute instance corresponding to said characteristic data cell possessing a property for a given set of one or more operands, and accessing, with a storage engine that is in communications coupling with the storage media one or more of the plurality of characteristic data tunnels based on one or more of said possessive operator and a given set of one or more operands.

84. A method of data storage and/or retrieval implemented on one or more digital data processing systems, comprising providing storage media comprising a plurality of characteristic data tunnels, one or more of said plurality of characteristic data tunnels haying a plurality of characteristic data cells, wherein the plurality of characteristic data tunnels include a plurality of entity type data tunnels for each of a plurality of entity types and a plurality of attribute data tunnels for each of a plurality of attributes, wherein a number of characteristic data tunnels for each attribute is fixed for a given attribute, wherein each of the characteristic data cells contain data associated with a respective instance of an attribute for a respective and distinct instance of an entity type, wherein each respective instance of an attribute has one respective characteristic data cell in all respective characteristic data tunnels, wherein each of the characteristic data cells of the plurality of attribute data tunnels has data for which a respective possessive operator evaluates to a boolean result which indicates either the likely possibility or the impossibility of the attribute instance corresponding to said characteristic data cell possessing a property for a given set of one or more operands, and accessing, with a storage engine that is in communications coupling with the storage media one or more of the plurality of characteristic data tunnels based on one or more of said possessive operator and a given set of one or more operands.

\* \* \* \* \*